(12) United States Patent
Lin et al.

(10) Patent No.: US 12,326,181 B2
(45) Date of Patent: Jun. 10, 2025

(54) INTERNAL-MESHING PLANETARY GEAR DEVICE

(71) Applicants: Midea Group Co., Ltd., Foshan (CN); Guangdong Jiya Precision Machinery Technology Co., Ltd., Foshan (CN); GD Midea Air-Conditioning Equipment Co,. Ltd., Foshan (CN); Guangdong Midea Electric Co., Ltd., Foshan (CN)

(72) Inventors: Wenjie Lin, Foshan (CN); Gang Wang, Foshan (CN); Kiyoji Minegishi, Forshan (CN); Ziming Guo, Foshan (CN); Tsuyoshi Isaji, Foshan (CN)

(73) Assignees: MIDEA GROUP CO., LTD., Foshan (CN); GUANGDONG MIDEA ELECTRIC CO, . LTD., Foshan (CN); GD MIDEA AIR-CONDITIONING EQUIPMENT CO, . LTD., Foshan (CN); GUANGDONG JIYA PRECISION MACHINERY TECHNOLOGY CO, LTD., Foshan (CN)

( * ) Notice: Subject to any disclaimer, the term of this patent is extended or adjusted under 35 U.S.C. 154(b) by 271 days.

(21) Appl. No.: 18/196,407

(22) Filed: May 11, 2023

(65) Prior Publication Data

US 2023/0279926 A1 Sep. 7, 2023

Related U.S. Application Data

(63) Continuation of application No. PCT/CN2021/077117, filed on Feb. 20, 2021.

(30) Foreign Application Priority Data

Dec. 18, 2020 (JP) .................................. 2020-210657

(51) Int. Cl.
*F16H 13/08* (2006.01)
*B60B 27/00* (2006.01)
(Continued)

(52) U.S. Cl.
CPC ......... *F16H 13/08* (2013.01); *B60B 27/0047* (2013.01); *B60K 17/046* (2013.01); *F16H 57/0486* (2013.01); *F16H 2057/085* (2013.01)

(58) Field of Classification Search
CPC ................. F16C 33/60; B60B 27/0047; F16H 2001/325; F16H 1/32
See application file for complete search history.

(56) References Cited

U.S. PATENT DOCUMENTS

| 5,188,572 A * | 2/1993 | Yamaguchi | F16H 1/32 475/168 |
| 11,041,545 B2 * | 6/2021 | Yoshida | F16C 19/28 |
| 2012/0088623 A1 * | 4/2012 | Nagumo | F16H 1/32 475/179 |

FOREIGN PATENT DOCUMENTS

| CN | 1266957 A | 9/2000 |
| CN | 103133523 A | 6/2013 |

(Continued)

OTHER PUBLICATIONS

Midea Group Co., Ltd., Japanese Decision to Grant Patent, JP Patent Application No. 2020-210657, Apr. 5, 2023, 5 pgs.
(Continued)

*Primary Examiner* — Derek D Knight
(74) *Attorney, Agent, or Firm* — Morgan, Lewis & Bockius LLP

(57) ABSTRACT

An internal-meshing planetary gear device includes an internally toothed gear provided with internal teeth and is fixed to an outer ring. A planetary gear is provided with external teeth which partially mesh with the internal teeth. A plurality of internal pins is respectively inserted into a plurality of (Continued)

internal pin holes formed on the planetary gear revolve within the internal pin holes and rotate relative to the internally toothed gear. An inner ring includes a first inner ring and a second inner ring, which are opposite each other in a direction parallel to a rotation axis and have opposite surfaces that come in contact with each other. The first inner ring has a plurality of holding holes, through which the plurality of internal pins respectively penetrate in the direction parallel to the rotation axis. Each of the plurality of internal pins is held in the inner ring and is rotatable.

16 Claims, 20 Drawing Sheets

(51) Int. Cl.
*B60K 17/04* (2006.01)
*F16H 57/04* (2010.01)
*F16H 57/08* (2006.01)

(56) References Cited

FOREIGN PATENT DOCUMENTS

| CN | 103133527 | A | 6/2013 |
|----|-----------|---|--------|
| CN | 105387069 | A | 3/2016 |
| CN | 110005759 | A | 7/2019 |
| JP | 2002372110 | A | 12/2002 |
| JP | 2003074646 | A | 3/2003 |
| JP | 2004316777 | A | 11/2004 |
| JP | 2006046596 | A | 2/2006 |
| JP | 2010107053 | A | 5/2010 |
| JP | 2010190408 | A | 9/2010 |
| JP | 4746907 | B2 | 8/2011 |
| JP | 2020076476 | A | 5/2020 |
| JP | 2020085017 | A | 6/2020 |
| JP | 2021067305 | A | 4/2021 |
| WO | WO 2019221703 | A1 | 11/2019 |

OTHER PUBLICATIONS

Midea Group Co., Ltd., ISRWO, PCT/CN2021/077117, Sep. 26, 2021, 7 pgs.

Midea Group Co., Ltd., IPRP, PCT/CN2021/077117, Jun. 13, 2023, pgs.

Midea Group Co., Ltd., Extended European Search Report and Supplementary Search Report, EP Patent Application No. 21904797. 4, Feb. 20, 2024, 10 pgs.

Midea Group Co., Ltd. Japanese Office Action, JP Patent Application No. 2023-074231, Nov. 13, 2024, 8 pgs.

Midea Group Co., Ltd. Japanese Office Action, JP Patent Application No. 2023-074231, Feb. 26, 2025, 5 pgs.

\* cited by examiner

INTERNAL-MESHING PLANETARY GEAR DEVICE

CROSS-REFERENCE TO RELATED APPLICATIONS

The present application is a continuation application of PCT International Application No. PCT/CN2021/077117, filed on Feb. 20, 2021, which claims the benefit of Japanese Patent Application No. 2020-210657, filed on Dec. 18, 2020, the contents of which are hereby incorporated by reference in their entirety.

TECHNICAL FIELD

Embodiments of the disclosure generally relate to an internal-meshing planetary gear device, and in particular to an internal-meshing planetary gear device in which a planetary gear having external teeth is arranged on an inner side of an internally toothed gear having internal teeth.

BACKGROUND

An eccentric swinging type gear device includes a planetary gear that swings eccentrically while internally meshing with an internally toothed gear. Such an eccentric body may be integrally formed with an input shaft, and the planetary gear is mounted in the eccentric body via an eccentric body bearing. External teeth with an arc tooth shape or the like are formed on periphery of the planetary gear.

The internally toothed gear is composed of mounting multiple pins (roller pins) constituting internal teeth one-by-one into an inner peripheral surface of a gear body (internally toothed gear body) used as a housing in a free rotation manner. In the planetary gear, multiple inner pin holes (inner roller holes) are formed at proper intervals in a circumferential direction, and inner pins and inner rollers are inserted into the inner pin holes. The inner pin is connected to a bracket at an end side in an axial direction thereof, and the bracket is supported on the housing via a cross roller bearing in a free rotation manner. The gear device may be used as a gear device which takes out, from the bracket, rotation of the planetary gear corresponding to a self-rotation component when the internally toothed gear is fixed.

SUMMARY

Long-term use of the gear device may lead to reduction of transmission efficiency of the gear device, or the like, due to a lubricant that may not be fully distributed throughout different parts of the gear device.

The disclosure relates to an internal-meshing planetary gear device that may be less likely to generate conditions such as reduction of transmission efficiency or the like.

An internal-meshing planetary gear device according to an aspect of the embodiments of the disclosure includes a bearing member, an internally toothed gear, a planetary gear, and multiple inner pins. The bearing member has an outer ring, an inner ring arranged on an inner side of the outer ring and supported to be rotatable relative to the outer ring with a rotation axis as a center, and multiple rolling bodies arranged between the outer ring and the inner ring. The internally toothed gear has internal teeth and is fixed to the outer ring. The planetary gear has external teeth partially meshing with the internal teeth. The multiple inner pins are configured to revolve in multiple inner pin holes formed in the planetary gear and rotate relative to the internally toothed gear, wherein the multiple inner pins are inserted into the multiple inner pin holes respectively. The inner ring includes a first inner ring and a second inner ring which are opposite to each other in a direction parallel to the rotation axis and have opposite surfaces in contact with each other respectively. The first inner ring has multiple holding holes through which respective inner pins of the multiple inner pins passes respectively in the direction parallel to the rotation axis. Each of the multiple inner pins is held in the inner ring in a self-rotatable state.

In some embodiments, an internal-meshing planetary gear device that may be less likely to generate conditions such as reduction of transmission efficiency or the like is described.

DETAILED DESCRIPTION

Basic Structure (1) Summary

Figure 1:
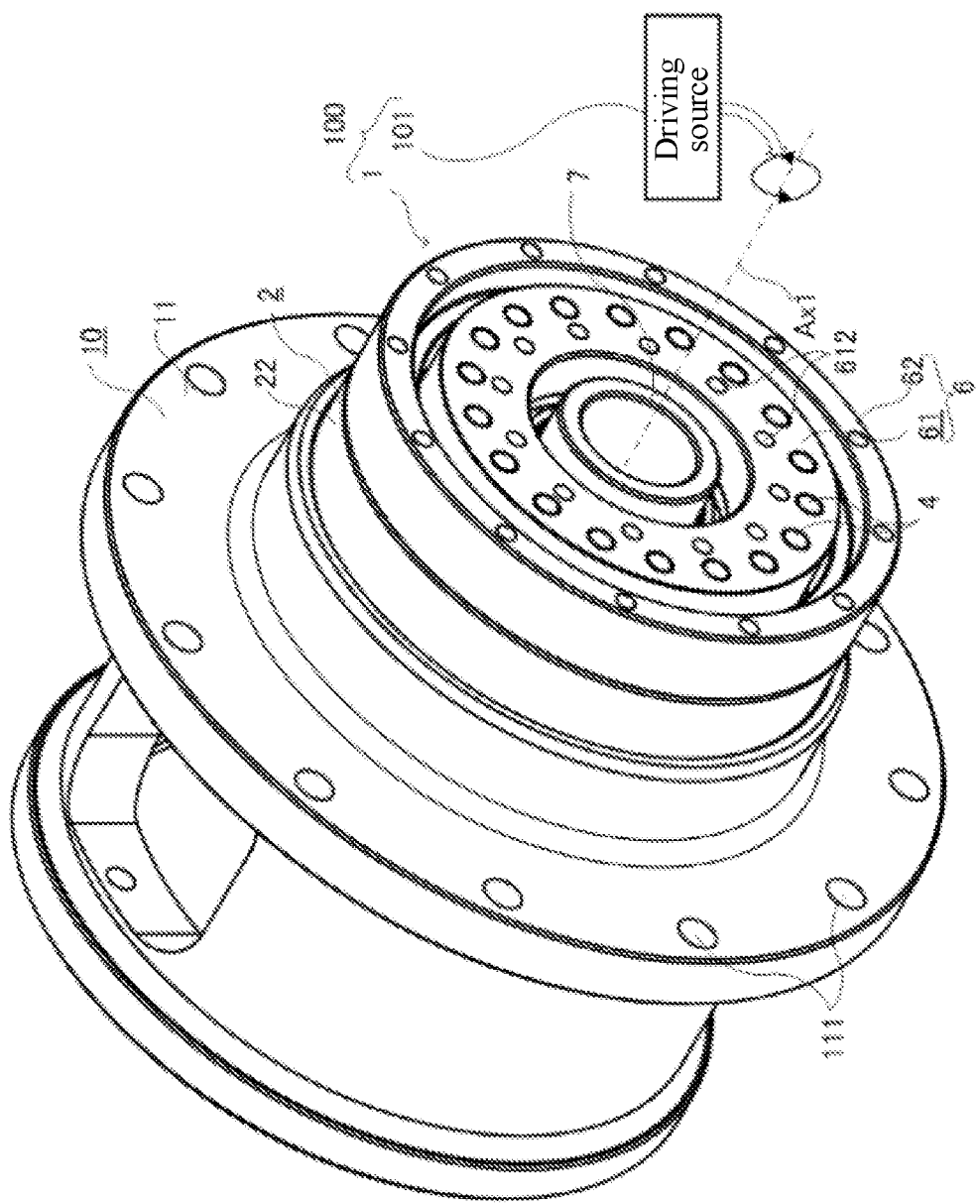
FIG. 1 is a perspective view showing a diagrammatic structure of an actuator including an internal-meshing planetary gear device with a basic structure.
Figure 2:
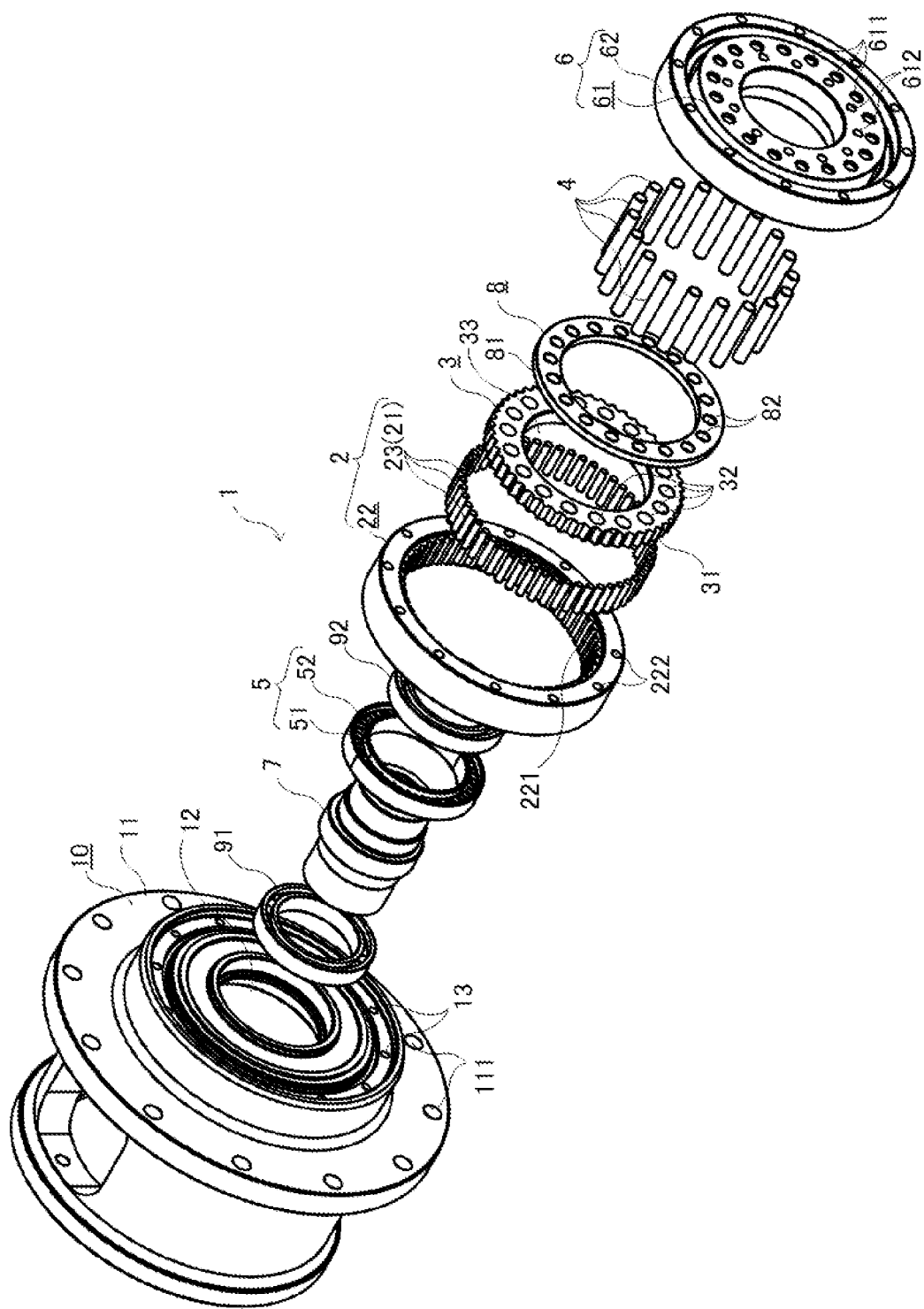
FIG. 2 is a diagrammatic exploded perspective view of the above internal-meshing planetary gear device observed from an output side of a rotation axis.
Figure 3:
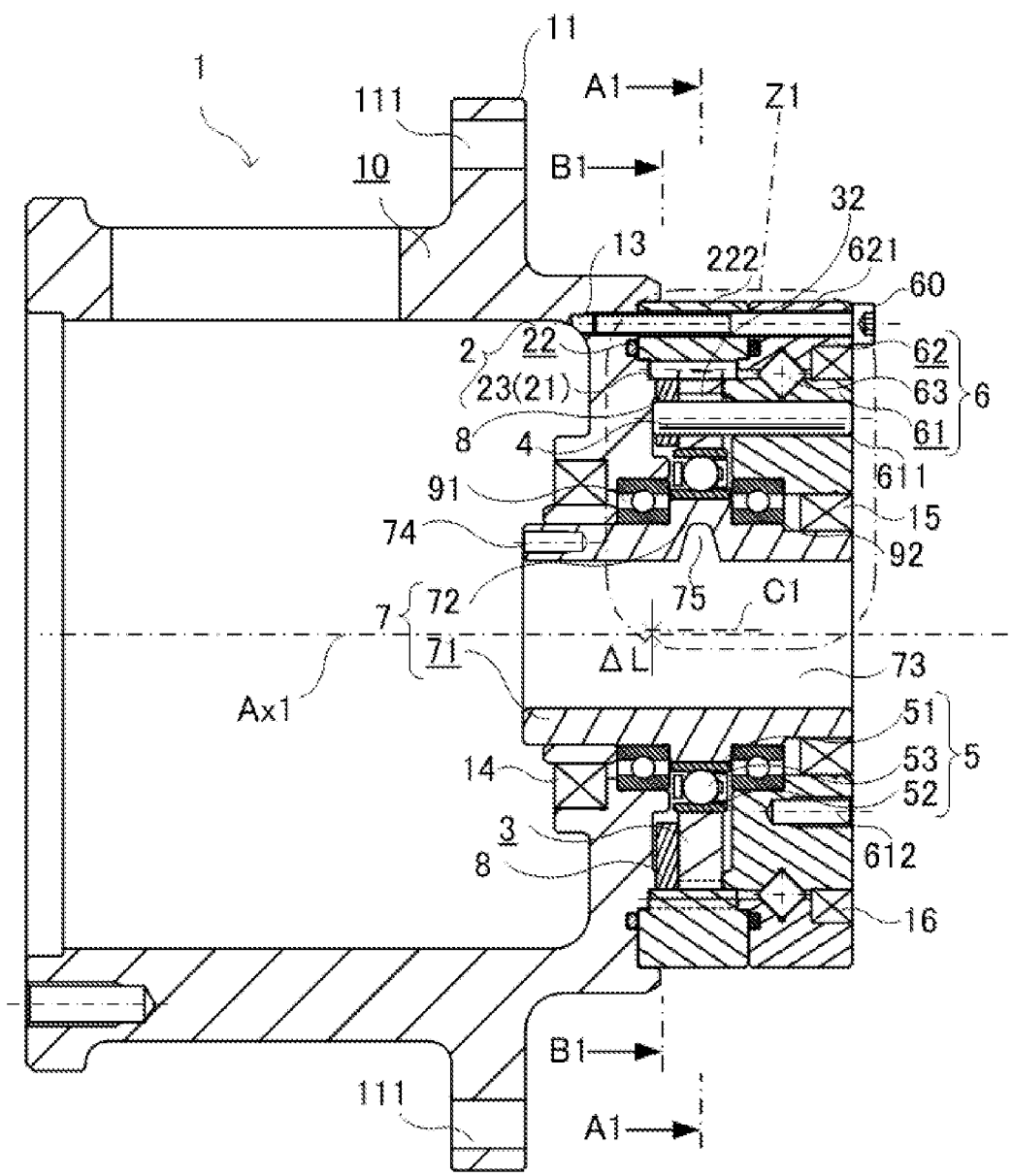
FIG. 3 is a diagrammatic cross-sectional view of the above internal-meshing planetary gear device.

Hereinafter, summary of an internal-meshing planetary gear device 1 with a basic structure is explained with reference to FIG. 1 to FIG. 3. Drawings referred by embodiments of the disclosure are schematic views, and respective ratios of sizes and thicknesses of structural elements in the drawings do not necessarily reflect actual size ratios. For example, tooth shapes, sizes, tooth numbers, or the like of internal teeth 21 and external teeth 31 in FIG. 1 to FIG. 3 are merely shown schematically for illustration, and are not aimed to be limited to the shapes as shown.

The internal-meshing planetary gear device 1 (hereinafter, referred to as "gear device 1" for abbreviation) with the basic structure is a gear device including an internally toothed gear 2, a planetary gear 3, and multiple inner pins 4. In the gear device 1, the planetary gear 3 is arranged on an inner side of the internally toothed gear 2 with an annular shape, and an eccentric body bearing 5 is arranged on an inner side of the planetary gear 3. The eccentric body bearing 5 has an eccentric body inner ring 51 and an eccentric body outer ring 52, and the eccentric body inner ring 51 rotates (eccentric motion) around a rotation axis Ax1 (referring to FIG. 3) offset from center C1 (referring to FIG. 3) of the eccentric body inner ring 51, thereby swinging the planetary gear 3. The eccentric body inner ring 51 rotates (eccentric motion) around the rotation axis Ax1, for example, by rotation of an eccentric shaft 7 inserted into the eccentric body inner ring 51. Furthermore, the internal-meshing planetary gear device 1 further includes a bearing member 6 having an outer ring 62 and an inner ring 61. The inner ring 61 is arranged on an inner side of the outer ring 62 and is supported to be relatively rotatable relative to the outer ring 62.

The internally toothed gear 2 has internal teeth 21 and is fixed to the outer ring 62. Especially in the basic structure, the internally toothed gear 2 has a gear body 22 with an annular shape and multiple pins 23. Multiple pins 23 are held in an inner peripheral surface 221 of the gear body 22 in a self-rotatable state, and constitute the internal teeth 21. The planetary gear 3 has external teeth 31 partially meshing with the internal teeth 21. That is, on the inner side of the internally toothed gear 2, the planetary gear 3 is internally tangent to the internally toothed gear 2 to form a state in which a part of the external teeth 31 is meshed with a part of the internal teeth 21. In this state, the planetary gear 3 swings when the eccentric shaft 7 rotates, a meshing position of the internal tooth 21 and the external tooth 31 moves in a circumferential direction of the internally toothed gear 2, and relative rotation corresponding to a difference between tooth numbers of the planetary gear 3 and the internally toothed gear 2 is generated between the two gears (the internally toothed gear 2 and the planetary gear 3). Here, when the internally toothed gear 2 is fixed, the planetary gear 3 rotates (self-rotation) along with the relative rotation of the two gears. As a result, a rotational output which is decelerated at a relatively high reduction ratio corresponding to the difference between tooth numbers of the two gears, is obtained from the planetary gear 3.

Such gear device 1 is used in such a way that rotation of the planetary gear 3 corresponding to a self-rotation component is taken out, as for example rotation of an output shaft integrated with the inner ring 61 of the bearing member 6. Therefore, the gear device 1 takes the eccentric shaft 7 as an input side and takes the output shaft as an output side, to achieve a function of a gear device with a relatively high reduction ratio. Therefore, in the gear device 1 with the basic structure, in order to transmit rotation of the planetary gear 3 corresponding to a self-rotation component to the inner ring 61 of the bearing member 6, multiple inner pins 4 are used to connect the planetary gear 3 to the inner ring 61. Multiple inner pins 4 revolve in multiple inner pin holes 32 formed in the planetary gear 3 and relatively rotate relative to the internally toothed gear 2, in a state where multiple inner pins are inserted into multiple inner pin holes 32 respectively. That is, diameter of the inner pin hole 32 is greater than that of the inner pin 4, and the inner pin 4 may move by revolving in the inner pin hole 32, in a state where it is inserted into the inner pin hole 32. Furthermore, a swinging component of the planetary gear 3, i.e., a revolution component of the planetary gear 3, is absorbed by play-embedding of the inner pin 4 to the inner pin hole 32 of the planetary gear 3. In other words, multiple inner pins 4 move by revolving in multiple inner pin holes 32 respectively, thereby absorbing the swinging component of the planetary gear 3. Therefore, rotation (self-rotation component) of the planetary gear 3, except the swinging component (revolution component) of the planetary gear 3, is transmitted to the inner ring 61 of the bearing member 6 through multiple inner pins 4.

However, in such gear device 1, the inner pin 4 is revolved in the inner pin bore 32 of the planetary gear 3, while rotation of the planetary gear 3 is transmitted to multiple inner pins 4. Therefore, as a first related art, a technique of using an inner roller which is assembled in the inner pin 4 to be rotatable with the inner pin 4 as an shaft is known. That is, in the first related art, the inner pin 4 is kept in a state where it is pressed into the inner ring 61 (or a bracket integrated with the inner ring 61), and when the inner pin 4 revolves in the inner pin hole 32, the inner pin 4 slides relative to an inner peripheral surface 321 of the inner pin hole 32. Therefore, as the first related art, the inner roller is used to reduce loss caused by a frictional resistance between the inner peripheral surface 321 of the inner pin hole 32 and the inner pin 4. However, when a structure including the inner roller is used like the first related art, the inner pin hole 32 may have a diameter that allows the inner pin 4 with the inner roller to revolve, and the inner pin hole 32 is difficult to be miniaturized. When the inner pin hole 32 is difficult to be miniaturized, miniaturization of the planetary gear 3 (especially to have a small diameter) is hindered, and even miniaturization of the whole gear device 1 is hindered. The gear device 1 with the basic structure may provide an internal-meshing planetary gear device 1 which is easy to be miniaturized through the following structures.

That is, as shown in FIG. 1 to FIG. 3, the gear device 1 with the basic structure includes a bearing member 6, an internally toothed gear 2, a planetary gear 3 and multiple inner pins 4. The bearing member 6 has an outer ring 62 and an inner ring 61 arranged on an inner side of the outer ring 62. The inner ring 61 is supported to be rotatable relative to the outer ring 62. The internally toothed gear 2 has internal teeth 21 and is fixed to the outer ring 62. The planetary gear 3 has external teeth 31 partially meshing with the internal teeth 21. Multiple inner pins 4 revolve in multiple inner pin holes 32 formed in the planetary gear 3 and relatively rotate relative to the internally toothed gear 2, in a state where multiple inner pins are inserted into multiple inner pin holes 32 respectively. Here each of multiple inner pins 4 is held in the inner ring 61 in a self-rotatable state. Furthermore, at least a part of each of multiple inner pins 4 is arranged at the same position as the bearing member 6 in an axial direction of the bearing member 6.

According to this configuration, each of multiple inner pins 4 is held in the inner ring 61 in a self-rotatable state, therefore, the inner pin 4 itself may self-rotate when the inner pin 4 revolves in the inner pin hole 32. Therefore, loss caused by a frictional resistance between the inner peripheral surface 321 of the inner pin hole 32 and the inner pin 4 may be reduced even without using the inner roller assembled on the inner pin 4 and rotatable with the inner pin 4 as a shaft. Therefore, in the gear device 1 with the basic structure, it is unnecessary to provide an inner roller, so that the gear device has an advantage of being easy to be miniaturized. Furthermore, at least a part of each of multiple inner pins 4 is arranged at the same position as the bearing member 6 in an axial direction of the bearing member 6, so that size of the gear device 1 in the axial direction of the bearing member 6 may be suppressed to be small. That is, compared with a structure where the bearing member 6 is in parallel with (opposite to) the inner pin 4 along the axial direction of the bearing member 6, in the gear device 1 with the basic structure, size of the gear device 1 in the axial direction may be reduced, thereby contributing to further miniaturization (thinning) of the gear device 1.

Furthermore, when size of the planetary gear 3 is the same as that of the first related art, compared with the first related art for example, the number (amount) of inner pins 4 may be increased to smooth transmission of the rotation, or the inner pin 4 becomes thicker to improve strength.

Furthermore, in such gear device 1, the inner pin 4 is required to revolve in the inner pin bore 32 of the planetary gear 3. Therefore, as a second related art, there is a situation where multiple inner pins 4 are held by the inner ring 61 (or a bracket integrated with the inner ring 61) only. According to the second related art, it is difficult to improve centering precision of multiple inner pins 4, and bad conditions such as generation of vibration, reduction of transmission efficiency, or the like may occur due to poor centering. That is, multiple inner pins 4 revolve in the inner pin holes 32 respectively and relatively rotate relative to the internally toothed gear 2, thereby transmitting the self-rotation component of the planetary gear 3 to the inner ring 61 of the bearing member 6. At this time, when centering precision of multiple inner pins 4 is not enough so that rotation axes of multiple inner pins 4 deviate or incline relative to a rotation axis of the inner ring 61, multiple inner pins 4 generate a poor centering state, which may result in bad conditions such as generation of vibration, reduction of transmission efficiency, or the like. The gear device 1 with the basic structure may provide an internal-meshing planetary gear device 1 which is difficult to generate bad conditions due to poor centering of multiple inner pins 4, through the following structures.

That is, as shown in FIG. 1 to FIG. 3, the gear device 1 with the basic structure includes an internally toothed gear 2, a planetary gear 3, multiple inner pins 4, and a support body 8. The internally toothed gear 2 has a gear body 22 with an annular shape and multiple pins 23. Multiple pins 23 are held in an inner peripheral surface 221 of the gear body 22 in a self-rotatable state, and constitute the internal teeth 21. The planetary gear 3 has external teeth 31 partially meshing with the internal teeth 21. Multiple inner pins 4 revolve in multiple inner pin holes 32 formed in the planetary gear 3 and relatively rotate relative to the gear body 22, in a state where multiple inner pins are inserted into multiple inner pin holes 32 respectively. The support body 8 has an annular shape and supports multiple inner pins 4. Here position of the support body 8 is limited by contacting an outer peripheral surface 81 thereof with multiple pins 23.

According to this configuration, multiple inner pins 4 are supported by the support body 8 with an annular shape, therefore multiple inner pins 4 are constrained by the support body 8, which may suppress relative deviation and inclination of multiple inner pins 4. Furthermore, the outer peripheral surface 81 of the support body 8 is in contact with multiple pins 23, thereby limiting position of the support body 8. In summary, centering of the support body 8 is performed by multiple pins 23, as a result, centering of multiple inner pins 4 supported by the support body 8 is also performed by multiple pins 23. Therefore, according to the gear device 1 with the basic structure, it is easy to improve centering precision of multiple inner pins 4, and the gear device has an advantage of being difficult to generate bad conditions due to poor centering of multiple inner pins 4.

Furthermore, as shown in FIG. 1, the gear device 1 with the basic structure constitutes an actuator 100 together with a driving source 101. In other words, the actuator 100 with a basic structure includes the gear device 1 and the driving source 101. The driving source 101 generates a driving force to swing the planetary gear 3. Specifically, the driving source 101 rotates the eccentric shaft 7 with the rotation axis Ax1 as the center, thereby swinging the planetary gear 3.

(2) Definition

"annular shape" stated in the embodiments of the disclosure refers to a shape such as a ring (circle) which forms an enclosed space (area) on an inner side when it is observed at least in a top view, and is not limited to a circular shape (circular ring shape) which is a perfect circle when it is observed in a top view, for example, may also be an elliptical shape, a polygonal shape, or the like. Furthermore, even though a shape has a bottom such as a cup shape, it is contained within "annular shape" as long as its peripheral wall has an annular shape.

"play-embedding" in the embodiments of the disclosure refers to a state of embedding with a clearance (gap), and the inner pin hole 32 is a hole for play-embedding the inner pin 4. That is, the inner pin 4 is inserted into the inner pin hole 32 in a state of ensuring a margin of space (gap) between the inner pin and the inner peripheral surface 321 of the inner pin hole 32. In other words, diameter of a part of the inner pin 4 at least inserted into the inner pin hole 32 is smaller (thinner) than that of the inner pin hole 32. Therefore, when the inner pin 4 is inserted into the inner pin hole 32, the inner pin 4 may move in the inner pin hole 32, that is, the inner pin 4 may relatively move relative to center of the inner pin hole 32. Therefore, the inner pin 4 may revolve in the inner pin bore 32. However, it is unnecessary to ensure a gap between the inner peripheral surface 321 of the inner pin hole 32 and the inner pin 4 to be used as a cavity, for example, fluid such as a liquid or the like may also be filled into the gap.

"revolve" stated in the embodiments of the disclosure means that an object rotates around a rotation axis other than a central axis passing through center (center of gravity) of the object, and when the object revolves, center of the object moves along a revolution orbit with the rotation axis as the center. Therefore, for example, in case that an object rotates with an eccentric axis parallel to a central axis passing through center (center of gravity) of the object as the center, the object revolves with the eccentric axis as a rotation axis. As an example, the inner pin 4 revolves in the inner pin hole 32 by rotating around a rotation axis passing through center of the inner pin hole 32.

Furthermore, in the embodiments of the disclosure, sometimes one side (left side of FIG. 3) of the rotation axis Ax1 is referred to as an "input side", and the other side (right side of FIG. 3) of the rotation axis Ax1 is referred to as an "output side". In the example of FIG. 3, rotation is given to a rotation body (the eccentric body inner ring 51) from "input side" of the rotation axis Ax1, and rotation of multiple inner pins 4 (the inner ring 61) is taken out from "output side" of the rotation axis Ax1. However, "input side" and "output side" are merely labels assigned for illustration, and are not aimed to limit a positional relationship between input and output observed from the gear device 1.

"rotation axis" stated in the embodiments of the disclosure refers to a virtual axis (straight line) which is center of a rotational motion of a rotation body. That is, the rotation axis Ax1 is a virtual axis without an entity. The eccentric body inner ring 51 rotates with the rotation axis Ax1 as the center.

Each of "internal teeth" and "external teeth" stated in the embodiments of the disclosure refers to a set (group) of multiple "teeth" rather than a "tooth" as a single body. That is, the internal teeth 21 of the internally toothed gear 2 are composed of a set of teeth arranged on the inner peripheral surface 221 of the internally toothed gear 2 (the gear body 22). Similarly, the external teeth 31 of the planetary gear 3 are composed of a set of teeth arranged on an outer peripheral surface of the planetary gear 3.

(3) Structure

A detailed structure of the internal-meshing planetary gear device 1 with the basic structure is described below with reference to FIG. 1 to FIG. 8B.

Figure 4:
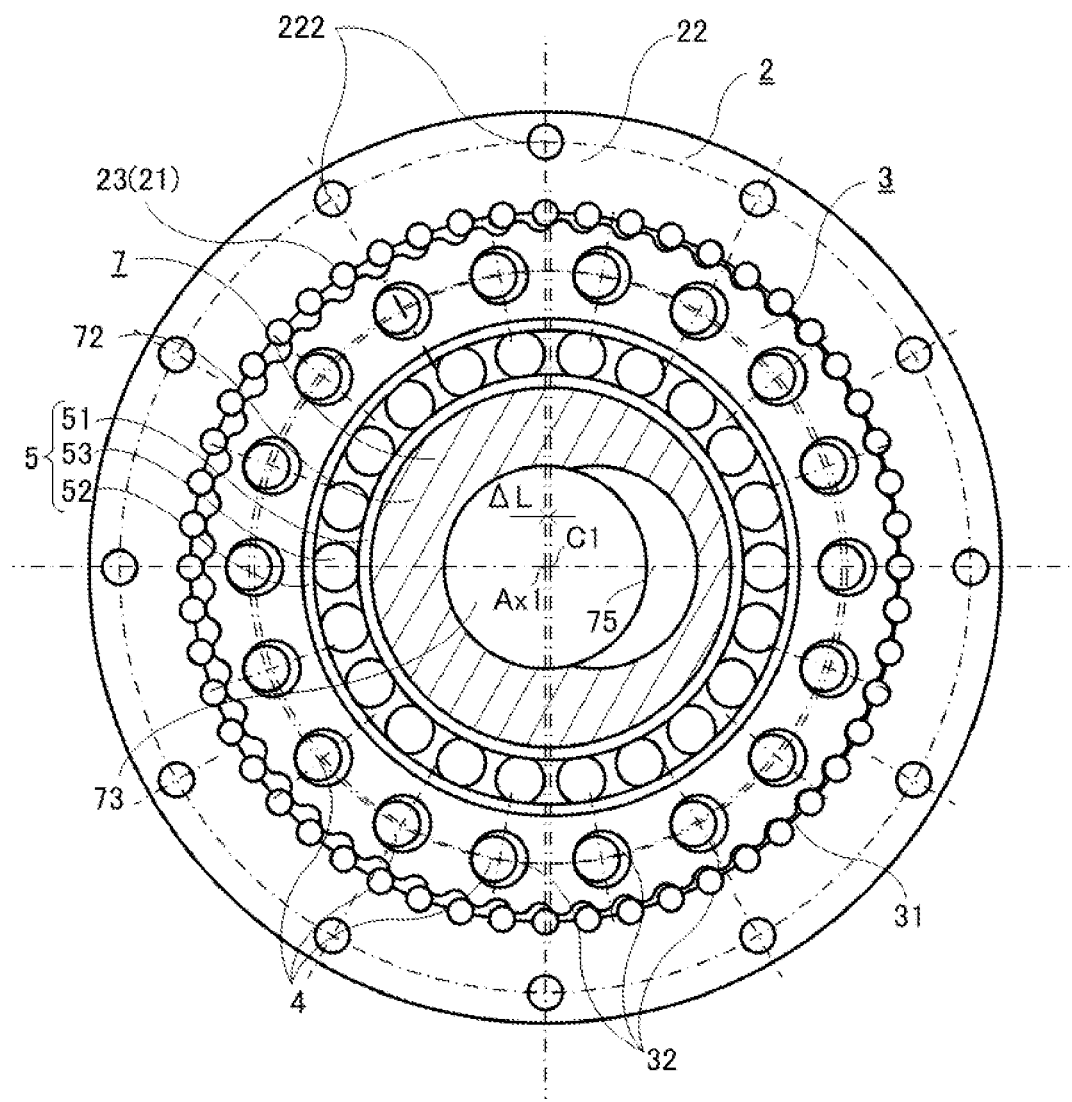
FIG. 4 is a cross-sectional view of a line A1-A1 of FIG. 3, showing the above internal-meshing planetary gear device.
Figure 5A:
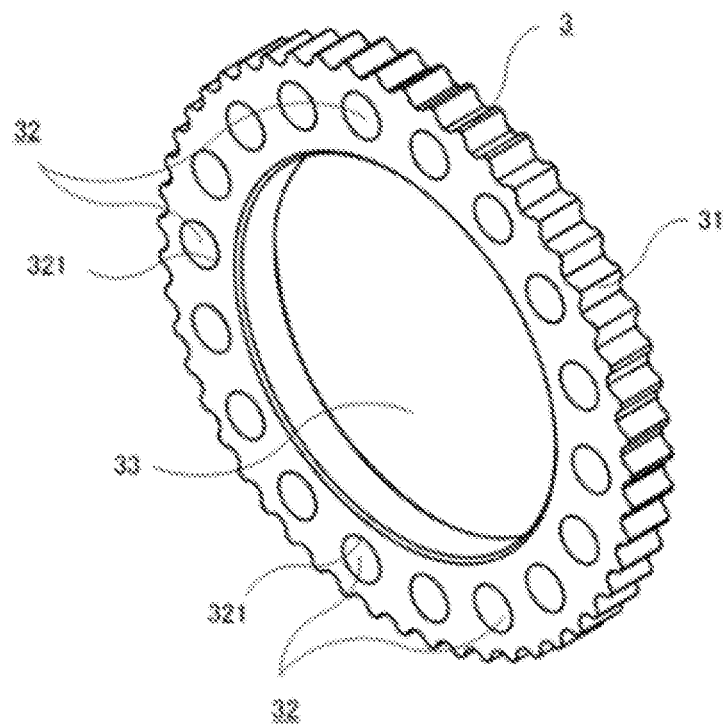
FIG. 5A is a perspective view showing a planetary gear of the above internal-meshing planetary gear device by way of monomer.
Figure 5B:
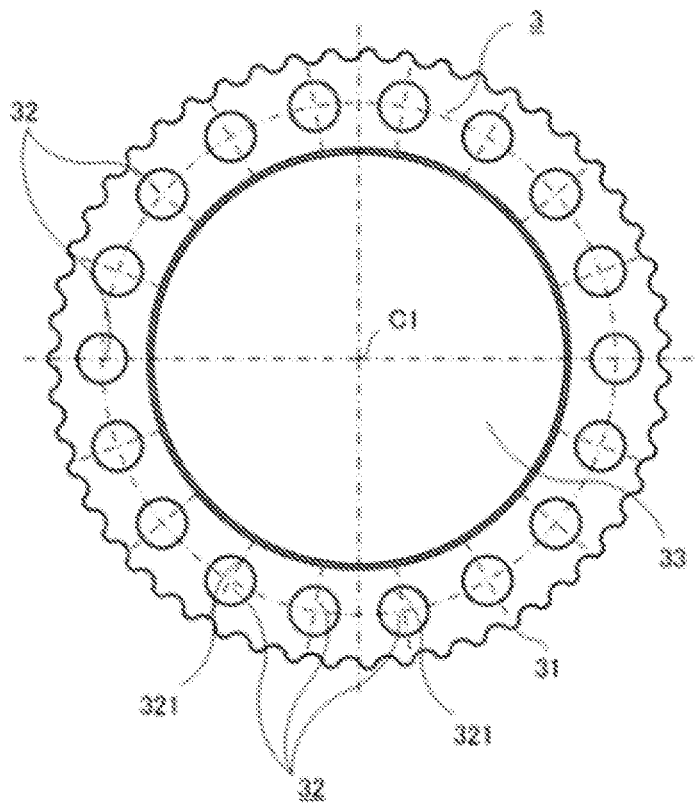
FIG. 5B is a front view showing a planetary gear of the above internal-meshing planetary gear device by way of monomer.
Figure 6A:
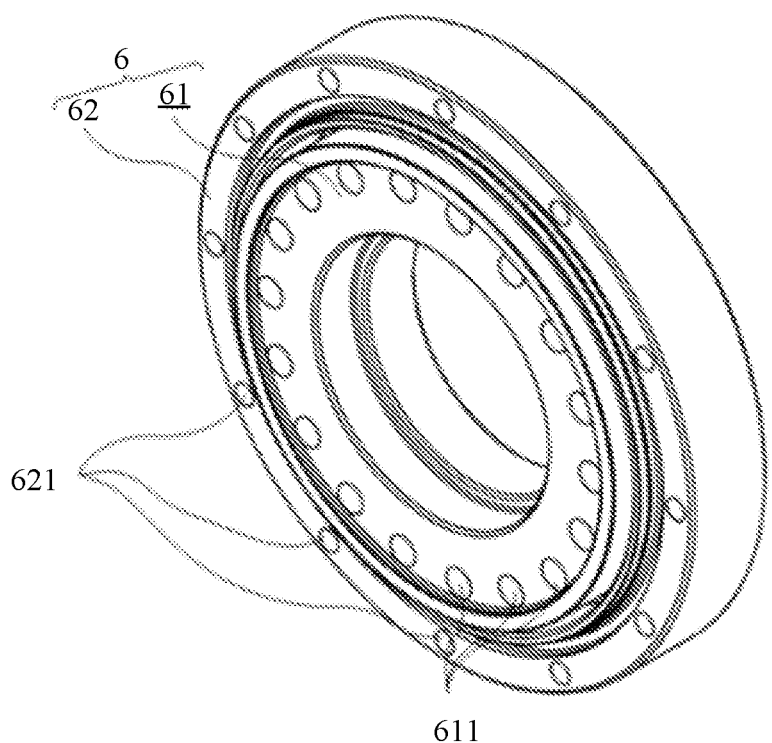
FIG. 6A is a perspective view showing a bearing member of the above internal-meshing planetary gear device by way of monomer.
Figure 6B:
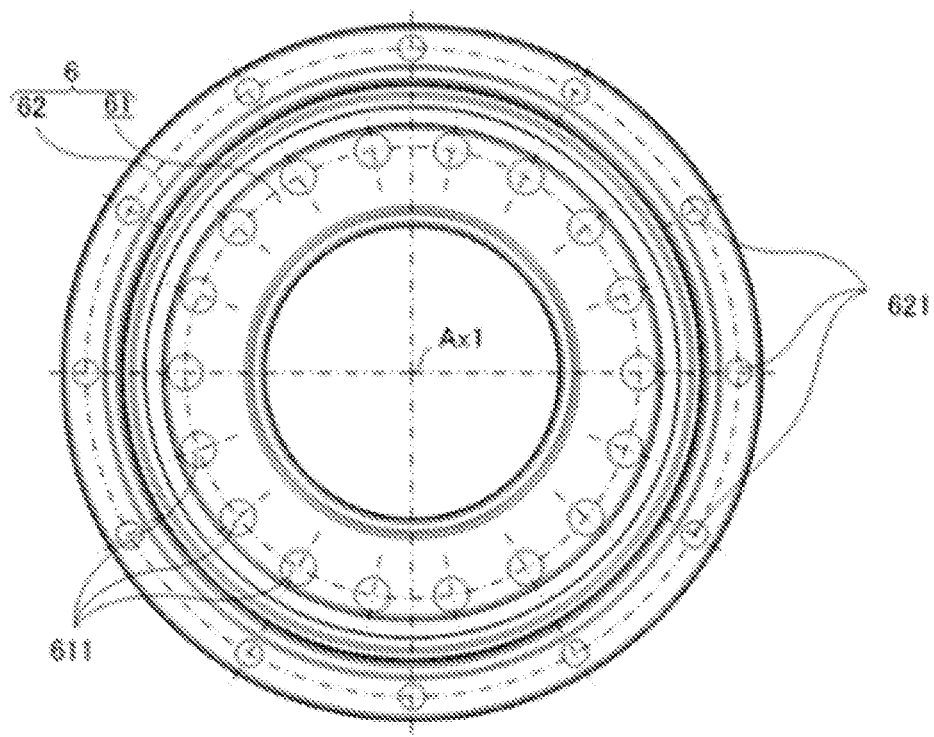
FIG. 6B is a front view showing a bearing member of the above internal-meshing planetary gear device by way of monomer.
Figure 7A:
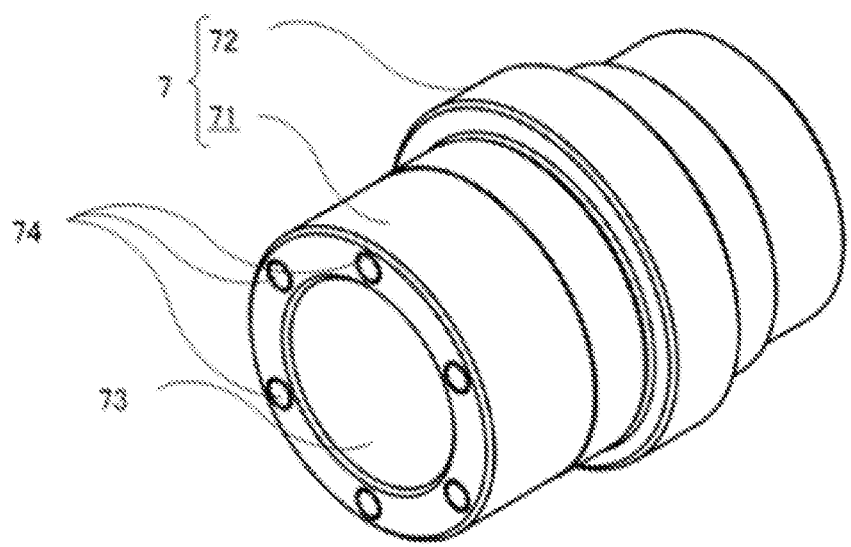
FIG. 7A is a perspective view showing an eccentric shaft of the above internal-meshing planetary gear device by way of monomer.
Figure 7B:
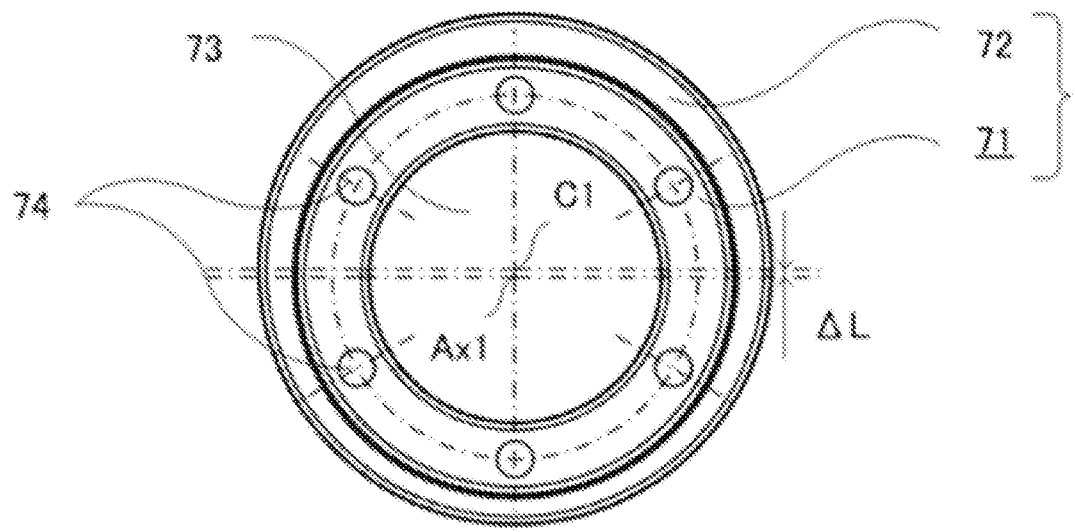
FIG. 7B is a front view showing an eccentric shaft of the above internal-meshing planetary gear device by way of monomer.
Figure 8A:
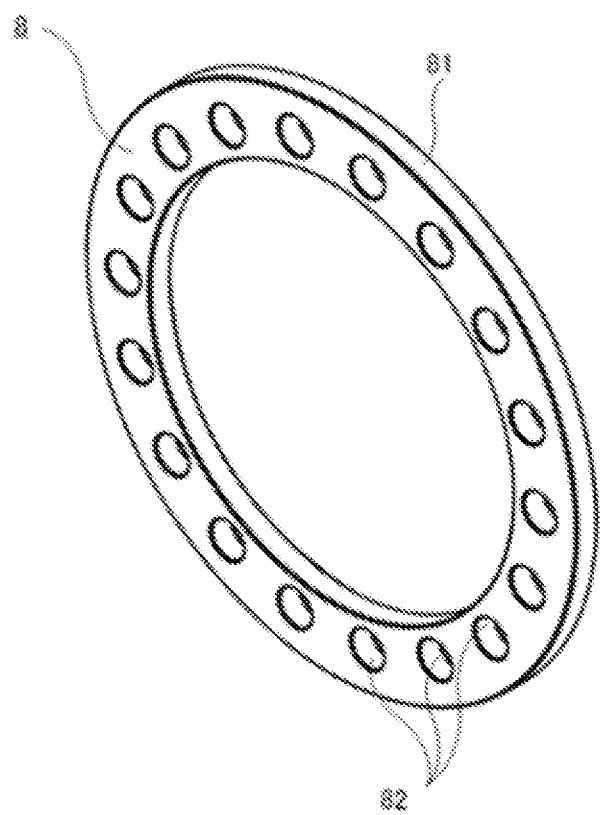
FIG. 8A is a perspective view showing a support body of the above internal-meshing planetary gear device by way of monomer.
Figure 8B:
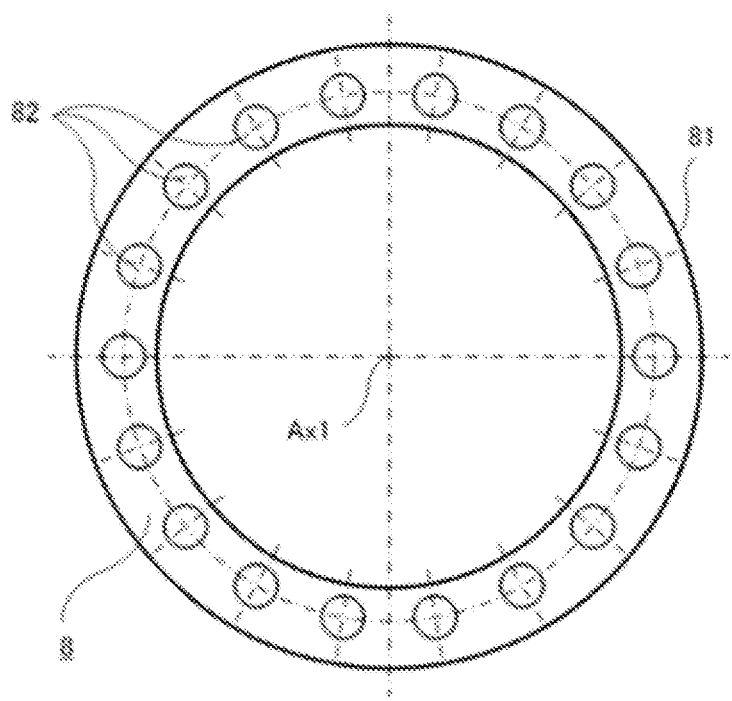
FIG. 8B is a front view showing a support body of the above internal-meshing planetary gear device by way of monomer.

FIG. 1 is a perspective view showing a diagrammatic structure of the actuator 100 including the gear device 1. In FIG. 1, the driving source 101 is shown schematically. FIG. 2 is a diagrammatic exploded perspective view of the gear device 1 observed from an output side of the rotation axis Ax1. FIG. 3 is a diagrammatic cross-sectional view of the gear device 1. FIG. 4 is a cross-sectional view of a line A1-A1 of FIG. 3. Here, in FIG. 4, components other than the eccentric shaft 7 are shown in cross-section, but cross-sectional lines are omitted. Furthermore, in FIG. 4, an illustration of the inner peripheral surface 221 of the gear body 22 is omitted. FIG. 5A and FIG. 5B are a perspective view and a front view showing the planetary gear 3 by way of monomer respectively. FIG. 6A and FIG. 6B are a perspective view and a front view showing the bearing member 6 by way of monomer respectively. FIG. 7A and FIG. 7B are a perspective view and a front view showing the eccentric shaft 7 by way of monomer respectively. FIG. 8A and FIG. 8B are a perspective view and a front view showing the support body 8 by way of monomer respectively.

(3.1) Overall Structure

As shown in FIG. 1 to FIG. 3, the gear device 1 with the basic structure includes an internally toothed gear 2, a planetary gear 3, multiple inner pins 4, an eccentric body bearing 5, a bearing member 6, an eccentric shaft 7 and a support body 8. Furthermore, in the basic structure, the gear device 1 further includes a first bearing 91, a second bearing 92 and a housing 10. In the basic structure, the internally toothed gear 2, the planetary gear 3, multiple inner pins 4, the eccentric body bearing 5, the bearing member 6, the eccentric shaft 7, the support body 8, or the like which are used as structural elements of the gear device 1, are made of metal materials such as stainless steel, cast iron, carbon steel for mechanical structure, chrome molybdenum steel, phosphor bronze, aluminum bronze, or the like. Metal as stated here includes a metal which is subject to surface treatments such as nitridation treatment or the like.

Furthermore, in the basic structure, an internally tangent type planetary gear device using a cycloidal tooth shape is illustrated as an example of the gear device 1. That is, the gear device 1 with the basic structure includes an internally tangent type planetary gear 3 with a curve tooth shape such as cycloid.

Furthermore, in the basic structure, as an example, the gear device 1 is used in a state where the gear body 22 of the internally toothed gear 2 and the outer ring 62 of the bearing member 6 are fixed together to a fixing member such as the housing 10 or the like. Therefore, the planetary gear 3 relatively rotates relative to the fixing member (the housing 10 or the like) along with relative rotation of the internally toothed gear 2 and the planetary gear 3.

Furthermore, in the basic structure, when the gear device 1 is used in the actuator 100, a rotation force as output is taken out from an output shaft integrated with the inner ring 61 of the bearing member 6 by applying a rotation force as input to the eccentric shaft 7. That is, the gear device 1 acts with rotation of the eccentric shaft 7 as input rotation and with rotation of the output shaft integrated with the inner ring 61 as output rotation. Therefore, in the gear device 1, output rotation which is decelerated at a relatively high reduction ratio with respect to input rotation may be obtained.

The driving source 101 is a power generation source such as an electric machine (motor) or the like. Power generated by the driving source 101 is transmitted to the eccentric shaft 7 in the gear device 1. Specifically, the driving source 101 is connected to the eccentric shaft 7 via an input shaft, and the power generated by the driving source 101 is transmitted to the eccentric shaft 7 via the input shaft. Therefore, the driving source 101 may rotate the eccentric shaft 7.

Furthermore, in the gear device 1 with the basic structure, as shown in FIG. 3, the rotation axis Ax1 on the input side and the rotation axis Ax1 on the output side are on the same line. In other words, the rotation axis Ax1 on the input side is coaxial to the rotation axis Ax1 on the output side. Here the rotation axis Ax1 on the input side is center of rotation of the eccentric shaft 7 to which input rotation is given, and the rotation axis Ax1 on the output side is center of rotation of the inner ring 61 (and the output shaft) for generating output rotation. That is, in the gear device 1, output rotation which is decelerated at a relatively high reduction ratio with respect to input rotation may be obtained on the same axis.

As shown in FIG. 4, the internally toothed gear 2 is an annular component having internal teeth 21. In the basic structure, the internally toothed gear 2 has a circular ring shape of which at least an inner peripheral surface is a perfect circle when it is observed in a top view. In the inner peripheral surface of the internally toothed gear 2 with the circular ring shape, the internal teeth 21 are formed along the circumferential direction of the internally toothed gear 2. Multiple teeth constituting the internal teeth 21 are all in the same shape, and are arranged at equal intervals in the whole area along the circumferential direction of the inner peripheral surface of the internally toothed gear 2. That is, a pitch circle of the internal tooth 21 is a perfect circle when it is observed in a top view. Center of the pitch circle of the internal tooth 21 is on the rotation axis Ax1. Furthermore, the internally toothed gear 2 has a predetermined thickness in a direction of the rotation axis Ax1. Tooth directions of the internal teeth 21 are all parallel to the rotation axis Ax1. Size in the tooth direction of the internal tooth 21 is slightly smaller than that in a thickness direction of the internally toothed gear 2.

Here, as described above, the internally toothed gear 2 has a gear body 22 with an annular shape (circular ring shape) and multiple pins 23. Multiple pins 23 are held in an inner peripheral surface 221 of the gear body 22 in a self-rotatable state, and constitute the internal teeth 21. In other words, multiple pins 23 function as multiple teeth constituting the internal teeth 21, respectively. Specifically, in the inner peripheral surface 221 of the gear body 22, multiple grooves are formed in the whole area along a circumferential direction as shown in FIG. 2. Multiple grooves are all in the same shape and are arranged at equal intervals. Multiple grooves are all parallel to the rotation axis Ax1 and are formed throughout the entire length along a thickness direction of the gear body 22. Multiple pins 23 are embedded into multiple grooves, to be combined in the gear body 22. Each of multiple pins 23 is held in a state of being self-rotatable within the groove. Furthermore, the gear body 22 (together with the outer ring 62) is fixed to the housing 10. Therefore, multiple fixing holes 222 for fixing are formed in the gear body 22.

As shown in FIG. 4, the planetary gear 3 is an annular component having external teeth 31. In the basic structure, the planetary gear 3 has a circular ring shape of which at least an outer peripheral surface is a perfect circle when it is observed in a top view. In the outer peripheral surface of the planetary gear 3 with the circular ring shape, the external teeth 31 are formed along a circumferential direction of the planetary gear 3. Multiple teeth constituting the external teeth 31 are all in the same shape, and are arranged at equal intervals in the whole area along a circumferential direction of the outer peripheral surface of the planetary gear 3. That is, a pitch circle of the external tooth 31 is a perfect circle when it is observed in a top view. Center C1 of the pitch circle of the external tooth 31 is at a position offset from the rotation axis Ax1 by ΔL (referring to FIG. 4). Furthermore, the planetary gear 3 has a predetermined thickness in the direction of the rotation axis Ax1. The external teeth 31 are all formed throughout the entire length along a thickness direction of the planetary gear 3. Tooth directions of the external teeth 31 are all parallel to the rotation axis Ax1. In the planetary gear 3, unlike the internally toothed gear 2, the external teeth 31 and main body of the planetary gear 3 are integrally formed by a metal member.

Here the eccentric body bearing 5 and the eccentric shaft 7 are combined for the planetary gear 3. That is, an opened portion 33 in a form of a circular opening is formed in the planetary gear 3. The opened portion 33 is a hole penetrating the planetary gear 3 in a thickness direction. When it is observed in a top view, center of the opened portion 33 is consistent with center of the planetary gear 3, and an inner peripheral surface of the opened portion 33 (an inner peripheral surface of the planetary gear 3) and the pitch circle of the external tooth 31 are concentric circles. The eccentric body bearing 5 is received in the opened portion 33 of the planetary gear 3. Furthermore, the eccentric body bearing 5 and the eccentric shaft 7 are combined in the planetary gear 3 by inserting the eccentric shaft 7 into the eccentric body bearing 5 (the eccentric body inner ring 51 of the eccentric body bearing). In a state where the eccentric body bearing 5 and the eccentric shaft 7 are combined in the planetary gear 3, the planetary gear 3 swings around the rotation axis Ax1 when the eccentric shaft 7 rotates.

The planetary gear 3 as configured is arranged on the inner side of the internally toothed gear 2. When it is observed in a top view, the planetary gear 3 is formed smaller than the internally toothed gear 2, and the planetary gear 3 may swing on the inner side of the internally toothed gear 2 in a state where the planetary gear is combined with the internally toothed gear 2. Here the external teeth 31 are formed on the outer peripheral surface of the planetary gear 3, and the internal teeth 21 are formed on the inner peripheral surface of the internally toothed gear 2. Therefore, the external tooth 31 and the internal tooth 21 are opposite to each other, in a state where the planetary gear 3 is arranged on the inner side of the internally toothed gear 2.

Furthermore, the pitch circle of the external tooth 31 is smaller than the pitch circle of the internal tooth 21. Furthermore, in a state where the planetary gear 3 is internally tangent to the internally toothed gear 2, center C1 of the pitch circle of the external tooth 31 is at a position offset from center of the pitch circle of the internal tooth 21 (the rotation axis Ax1) by ΔL (referring to FIG. 4). Therefore, at least a part of the external teeth 31 faces the internal teeth 21 with a gap there-between, there is no situation where all the external teeth and the internal teeth are meshed with each other in a circumferential direction. However, the planetary gear 3 swings (revolves) around the rotation axis Ax1 on the inner side of the internally toothed gear 2, so that the external teeth 31 are partially meshed with the internal teeth 21. That is, as shown in FIG. 4, a part of multiple teeth constituting the external teeth 31 are meshed with a part of multiple teeth constituting the internal teeth 21, by the planetary gear 3 swinging around the rotation axis Ax1. As a result, in the gear device 1, a part of the external teeth 31 may be meshed with a part of the internal teeth 21.

Here the tooth number of the internal teeth 21 in the internally toothed gear 2 is greater than the tooth number of the external teeth 31 of the planetary gear 3 by N (N is a positive integer). In the basic structure, as an example, N is "1", so that the tooth number (of the external teeth 31) of the planetary gear 3 is greater than the tooth number (of the internal teeth 21) of the internally toothed gear 2 by "1". In this way, a difference between tooth numbers of the planetary gear 3 and the internally toothed gear 2 specifies a reduction ratio of output rotation relative to input rotation in the gear device 1.

Furthermore, in the basic structure, as an example, thickness of the planetary gear 3 is smaller than that of the gear body 22 in the internally toothed gear 2. Furthermore, size in a tooth direction (a direction parallel to the rotation axis Ax1) of the external tooth 31 is smaller than that in a tooth direction (a direction parallel to the rotation axis Ax1) of the internal tooth 21. In other words, in the direction parallel to the rotation axis Ax1, the external tooth 31 is received in a range of the tooth direction of the internal tooth 21.

In the basic structure, as described above, rotation of the planetary gear 3 corresponding to a self-rotation component is taken out, as rotation (output rotation) of an output shaft integrated with the inner ring 61 of the bearing member 6. Therefore, the planetary gear 3 is connected to the inner ring 61 by multiple inner pins 4. As shown in FIG. 5A and FIG. 5B, multiple inner pin holes 32 for inserting multiple inner pins 4 are formed in the planetary gear 3. The inner pin holes 32 are configured to have the same number as that of the inner pins 4. In the basic structure, as an example, the inner pin holes 32 and the inner pins 4 are configured to 18 inner pin holes and 18 inner pins respectively. Each of multiple inner pin holes 32 is a hole opened in a circular shape and penetrating the planetary gear 3 in a thickness direction. Multiple (here, 18) inner pin holes 32 are arranged at equal intervals along a circumferential direction on a virtual circle concentric with the opened portion 33.

Multiple inner pins 4 are components connecting the planetary gear 3 to the inner ring 61 of the bearing member 6. Each of multiple inner pins 4 is formed in a cylindrical shape. Diameters and lengths of multiple inner pins 4 are the same in multiple inner pins 4. The diameter of the inner pin 4 is smaller than that of the inner pin hole 32. Therefore, the inner pin 4 is inserted into the inner pin hole 32 in a state of ensuring a margin of space (gap) between the inner pin and the inner peripheral surface 321 of the inner pin hole 32 (referring to FIG. 4).

The bearing member 6 is a component having an outer ring 62 and an inner ring 61 and taking output of the gear device 1 out as rotation of the inner ring 61 relative to the outer ring 62. Besides the outer ring 62 and the inner ring 61, the bearing member 6 has multiple rolling bodies 63 (referring to FIG. 3).

As shown in FIG. 6A and FIG. 6B, each of the outer ring 62 and the inner ring 61 is an annular component. Each of the outer ring 62 and the inner ring 61 has a circular ring shape which is a perfect circle when it is observed in a top view. The inner ring 61 is smaller than the outer ring 62 and is arranged on the inner side of the outer ring 62. Here an inner diameter of the outer ring 62 is greater than an outer diameter of the inner ring 61, and thus a gap is generated between an inner peripheral surface of the outer ring 62 and an outer peripheral surface of the inner ring 61.

The inner ring 61 has multiple holding holes 611 into which multiple inner pins 4 are inserted respectively. The holding holes 611 are configured to have the same number as that of the inner pins 4. In the basic structure, as an example, the holding holes 611 are configured to 18 holding holes. As shown in FIG. 6A and FIG. 6B, each of multiple holding holes 611 is a hole opened in a circular shape and penetrating the inner ring 61 in a thickness direction. Multiple (here, 18) holding holes 611 are arranged at equal intervals along a circumferential direction on a virtual circle concentric with an outer periphery of the inner ring 61. Diameter of the holding hole 611 is greater than that of the inner pin 4 and smaller than that of the inner pin hole 32.

Furthermore, the inner ring 61 is integrated with the output shaft, and rotation of the inner ring 61 is taken out, as rotation of the output shaft. Therefore, multiple output-side mounting holes 612 (referring to FIG. 2) for mounting the output shaft are formed in the inner ring 61. In the basic structure, multiple output-side mounting holes 612 are arranged on a virtual circle which is at an inner side with respect to multiple holding holes 611 and concentric with periphery of the inner ring 61.

The outer ring 62 and the gear body 22 of the internally toothed gear 2 are fixed together to a fixing member such as the housing 10 or the like. Therefore, multiple through-holes 621 for fixing are formed in the outer ring 62. Specifically, as shown in FIG. 3, the outer ring 62 is fixed to the housing 10 by fixing screws (bolts) 60 passing through the through-holes 621 and the fixing holes 222 of the gear body 22, in a state where the gear body 22 is sandwiched between the outer ring and the housing 10.

Multiple rolling bodies 63 are arranged in a gap between the outer ring 62 and the inner ring 61. Multiple rolling bodies 63 are arranged in parallel along a circumferential direction of the outer ring 62. Multiple rolling bodies 63 are all metal components with the same shape, and are arranged at equal intervals in the whole area along the circumferential direction of the outer ring 62.

In the basic structure, as an example, the bearing member 6 is a cross roller bearing. That is, the bearing member 6 has a cylindrical roller as the rolling body 63. Furthermore, an axis of the rolling body 63 with a cylindrical shape has an inclination of 45 degrees with respect to a plane orthogonal to the rotation axis Ax1, and is orthogonal to periphery of the inner ring 61. Furthermore, a pair of rolling bodies 63 adjacent to each other in a circumferential direction of the inner ring 61 is configured to be oriented orthogonal to each other axially. In such bearing member 6 composed of the cross roller bearing, a radial load, load in a thrust direction (in the direction of the rotation axis Ax1) and a bending force (bending moment load) for the rotation axis Ax1 are all easily born. Furthermore, these three loads may be tolerated by one bearing member 6, thereby ensuring required rigidity.

As shown in FIG. 7A and FIG. 7B, the eccentric shaft 7 is a cylindrical component. The eccentric shaft 7 has an axis portion 71 and an eccentric portion 72. The axis portion 71 has a cylindrical shape of which at least an outer peripheral surface is a perfect circle when it is observed in a top view. Center (central axis) of the axis portion 71 is consistent with the rotation axis Ax1. The eccentric portion 72 has a disc shape of which at least an outer peripheral surface is a perfect circle when it is observed in a top view. Center (central axis) of the eccentric portion 72 is consistent with the center C1 offset from the rotation axis Ax1. Here a distance ΔL between the rotation axis Ax1 and the center C1 (referring to FIG. 7B) becomes an eccentric amount of the eccentric portion 72 relative to the axis portion 71. The eccentric portion 72 has a flange shape protruding from an outer peripheral surface of the axis portion 71 at a central portion in a length direction (axial direction) of the axis portion 71, over the entire circumference. According to the above structure, as to the eccentric shaft 7, the eccentric part 72 is eccentrically moved by the axis portion 71 rotating (self-rotation) with the rotation axis Ax1 as the center.

In the basic structure, the axis portion 71 and the eccentric portion 72 are integrally formed by one metal member, so that a seamless eccentric shaft 7 is obtained. The eccentric shaft 7 with such a shape and the eccentric body bearing 5 is combined together in the planetary gear 3. Therefore, when the eccentric shaft 7 rotates in a state where the eccentric body bearing 5 and the eccentric shaft 7 are combined in the planetary gear 3, the planetary gear 3 swings around the rotation axis Ax1.

Furthermore, the eccentric shaft 7 has a through-hole 73 penetrating the axis portion 71 in an axial direction (length direction). The through-hole 73 is opened in a circular shape on both end surfaces of the axis portion 71 in the axial direction. Center (central axis) of the through-hole 73 is consistent with the rotation axis Ax1. Cables such as a power line, a signal line, or the like may pass through the through-hole 73.

Furthermore, in the basic structure, a rotation force as input is applied from the driving source 101 to the eccentric shaft 7. Therefore, multiple input-side mounting holes 74 for mounting an input shaft connected to the driving source 101 are formed in the eccentric shaft 7 (referring to FIG. 7A and FIG. 7B). In the basic structure, multiple input-side mounting holes 74 are arranged around the through-hole 73 on one end surface of the axis portion 71 in the axial direction and are arranged on a virtual circle concentric with the through-hole 73.

The eccentric body bearing 5 is a component which has the eccentric body outer ring 52 and the eccentric body inner ring 51, absorbs a self-rotation component in rotation of the eccentric shaft 7 and transmits rotation of the eccentric shaft 7 other than the self-rotation component of the eccentric shaft 7, that is, only a swinging component (revolution component) of the eccentric shaft 7 to the planetary gear 3. Besides the eccentric body outer ring 52 and the eccentric body inner ring 51, the eccentric body bearing 5 further has multiple rolling bodies 53 (referring to FIG. 3).

Each of the eccentric body outer ring 52 and the eccentric body inner ring 51 is an annular component. Each of the eccentric body outer ring 52 and the eccentric body inner ring 51 has a circular ring shape which is a perfect circle when it is observed in a top view. The eccentric body inner ring 51 is smaller than the eccentric body outer ring 52 and is arranged on an inner side of the eccentric body outer ring 52. Here an inner diameter of the eccentric body outer ring 52 is greater than an outer diameter of the eccentric body inner ring 51, and thus a gap is generated between an inner peripheral surface of the eccentric body outer ring 52 and an outer peripheral surface of the eccentric body inner ring 51.

Multiple rolling bodies 53 are arranged in the gap between the eccentric body outer ring 52 and the eccentric body inner ring 51. Multiple rolling bodies 53 are arranged in parallel along a circumferential direction of the eccentric body outer ring 52. Multiple rolling bodies 53 are all metal components with the same shape, and are arranged at equal intervals in the whole area along the circumferential direction of the eccentric body outer ring 52. In the basic structure, as an example, the eccentric body bearing 5 is composed of a deep groove ball bearing using balls as the rolling bodies 53.

Here an inner diameter of the eccentric body inner ring 51 is consistent with an outer diameter of the eccentric portion 72 of the eccentric shaft 7. The eccentric body bearing 5 is combined with the eccentric shaft 7 in a state where the eccentric portion 72 of the eccentric shaft 7 is inserted into the eccentric body inner ring 51. Furthermore, an outer diameter of the eccentric body outer ring 52 is consistent with an inner diameter (diameter) of the opened portion 33 of the planetary gear 3. The eccentric body bearing 5 is combined with the planetary gear 3 in a state where the eccentric body outer ring 52 is embedded in the opened portion 33 of the planetary gear 3. In other words, the eccentric body bearing 5 in a state of being assembled on the eccentric portion 72 of the eccentric shaft 7 is received in the opened portion 33 of the planetary gear 3.

Furthermore, in the basic structure, as an example, size of the eccentric body inner ring 51 of the eccentric body bearing 5 in a width direction (a direction parallel to the rotation axis Ax1) is substantially the same as thickness of the eccentric portion 72 of the eccentric shaft 7. Size of the eccentric body outer ring 52 in a width direction (a direction parallel to the rotation axis Ax1) is slightly smaller than the size of the eccentric body inner ring 51 in the width direction. Furthermore, the size of the eccentric body outer ring 52 in the width direction is greater than thickness of the planetary gear 3. Therefore, in the direction parallel to the rotation axis Ax1, the planetary gear 3 is received in a range of the eccentric body bearing 5. On the other hand, the size of the eccentric body outer ring 52 in the width direction is smaller than that in the tooth direction (a direction parallel to the rotation axis Ax1) of the internal tooth 21. Therefore, in the direction parallel to the rotation axis Ax1, the eccentric body bearing 5 is received in a range of the internally toothed gear 2.

When the eccentric shaft 7 rotates in a state where the eccentric body bearing 5 and the eccentric shaft 7 are combined in the planetary gear 3, the eccentric body inner ring 51 in the eccentric body bearing 5 rotates (eccentrically moves) around the rotation axis Ax1 offset from center C1 of the eccentric body inner ring 51. At this time, the self-rotation component of the eccentric shaft 7 is absorbed by the eccentric body bearing 5. Therefore, rotation of the eccentric shaft 7 other than the self-rotation component of the eccentric shaft 7, that is, only a swinging component (revolution component) of the eccentric shaft 7 is transmitted to the planetary gear 3 through the eccentric body bearing 5. Therefore, when the eccentric shaft 7 rotates in a state where the eccentric body bearing 5 and the eccentric shaft 7 are combined in the planetary gear 3, the planetary gear 3 swings around the rotation axis Ax1.

As shown in FIG. 8A and FIG. 8B, the support body 8 is a component formed in a ring shape and supporting multiple inner pins 4. The support body 8 has multiple support holes 82 into which multiple inner pins 4 are inserted respectively. The support holes 82 are configured to have the same number as that of the inner pins 4. In the basic structure, as an example, the support holes 82 are configured to 18 support holes. As shown in FIG. 8A and FIG. 8B, each of multiple support holes 82 is a hole opened in a circular shape and penetrating the support body 8 in a thickness direction. Multiple (here, 18) support holes 82 are arranged at equal intervals along a circumferential direction on a virtual circle concentric with an outer periphery surface 81 of the support body 8. Diameter of the support hole 82 is greater than that of the inner pin 4 and smaller than that of the inner pin hole 32. In the basic structure, as an example, the diameter of the support hole 82 is equal to that of the holding hole 611 formed in the inner ring 61.

As shown in FIG. 3, the support body 8 is arranged opposite to the planetary gear 3 from one side (input side) of the rotation axis Ax1. Furthermore, the support body 8 achieves a function of constraining multiple inner pins 4 by inserting multiple inner pins 4 into multiple support holes 82. Furthermore, position of the support body 8 is limited by contacting the outer peripheral surface 81 with multiple pins 23. Therefore, centering of the support body 8 is performed by multiple pins 23, as a result, centering of multiple inner pins 4 supported by the support body 8 is also performed by multiple pins 23. With respect to the support body 8, a detailed description is made thereto in a "(3.3) Support Body" column.

The first bearing 91 and the second bearing 92 are assembled on the axis portion 71 of the eccentric shaft 7 respectively. Specifically, as shown in FIG. 3, the first bearing 91 and the second bearing 92 are assembled on both sides of the eccentric portion 72 of the axis portion 71 in a manner of sandwiching the eccentric portion 72 therebetween in a direction parallel to the rotation axis Ax1. As viewed from the eccentric portion 72, the first bearing 91 is arranged on an input side of the rotation axis Ax1. As viewed from the eccentric portion 72, the second bearing 92 is arranged on an output side of the rotation axis Ax1. The first bearing 91 holds the eccentric shaft 7 to be rotatable relative to the housing 10. The second bearing 92 holds the eccentric shaft 7 to be rotatable relative to the inner ring 61 of the bearing member 6. Therefore, the axis portion 71 of the eccentric shaft 7 is held to be rotatable at two sites on both sides of the eccentric portion 72 in the direction parallel to the rotation axis Ax1.

The housing 10 is cylindrical, and has a flange portion 11 at the output side of the rotation axis Ax1. The flange portion 11 is formed with multiple setting holes 111 for fixing the housing 10 itself. Furthermore, an end surface of the housing 10 at the output side of the rotation axis Ax1 is formed with a bearing hole 12. The bearing hole 12 is opened in a circular shape. The first bearing 91 is mounted to the housing 10 by embedding the first bearing 91 into the bearing bore 12.

Furthermore, the end surface of the housing 10 at the output side of the rotation axis Ax1 is formed with multiple threaded holes 13 around the produced bearing hole 12. Multiple threaded holes 13 are used to fix the gear body 22 of the internally toothed gear 2 and the outer ring 62 of the bearing member 6 to the housing 10. Specifically, the fixing screw 60 is screwed into the threaded hole 13 by passing through the through-hole 621 of the outer ring 62 and the fixing hole 222 of the gear body 22, thereby fixing the gear body 22 and the outer ring 62 to the housing 10.

Furthermore, as shown in FIG. 3, the gear device 1 with the basic structure further includes multiple oil seals 14, 15, 16, etc. The oil seal 14 is assembled to an end of the eccentric shaft 7 at the input side of the rotation axis Ax1, to fill a gap between the housing 10 and the eccentric shaft 7 (the axis portion 71). The oil seal 15 is assembled to an end of the eccentric shaft 7 at the output side of the rotation axis Ax1, to fill a gap between the inner ring 61 and the eccentric shaft 7 (the axis portion 71). The oil seal 16 is assembled to an end surface of the bearing member 6 at the output side of the rotation axis Ax1, to fill a gap between the inner ring 61 and the outer ring 62. A space enclosed by multiple oil seals 14, 15, 16 constitutes a lubricant holding space 17 (referring to FIG. 9). The lubricant holding space 17 includes a space between the inner ring 61 and the outer ring 62 of the bearing member 6. Furthermore, multiple pins 23, a planetary gear 3, an eccentric body bearing 5, a support body 8, a first bearing 91, a second bearing 92, or the like are received in the lubricant holding space 17.

Furthermore, a lubricant is enclosed in the lubricant holding space 17. The lubricant is liquid and may flow in the lubricant holding space 17. Therefore, when the gear device 1 is used, the lubricant enters for example meshing portions of the internal teeth 21 composed of multiple pins 23 and the external teeth 31 of the planetary gear 3. "liquid" stated in the embodiments of the disclosure includes a liquid or gel-like substance. "gel-like" as stated here refers to a state with an intermediate property of liquid and solid, including a state of a colloid composed of two phases, i.e., a liquid phase and a solid phase. For example, an emulsion where a dispersant is in a liquid phase and a dispersion substance is in a liquid phase, a suspension where a dispersion substance is in a solid phase, or the like, are referred to as a state of gel or sol which is included in "gel-like". Furthermore, a state where a dispersant is in a solid phase and a dispersion substance is in a liquid phase is also included in "gel-like". In the basic structure, as an example, the lubricant is a liquid lubrication oil (oil liquid).

In the gear device 1 with the above structure, a rotation force as input is applied to the eccentric shaft 7, and the eccentric shaft 7 rotates with the rotation axis Ax1 as the center, so that the planetary gear 3 swings (revolves) around the rotation axis Ax1. At this time, the planetary gear 3 is internally tangent to the internally toothed gear 2 on the inner side of the internally toothed gear 2, and swings in a state of a part of the external teeth 31 meshing with a part of the internal teeth 21, so that a meshing position of the internal tooth 21 and the external tooth 31 moves in a circumferential direction of the internally toothed gear 2. Therefore, relative rotation corresponding to a difference between tooth numbers of the planetary gear 3 and the internally toothed gear 2 is generated between the two gears (the internally toothed gear 2 and the planetary gear 3). Furthermore, rotation (self-rotation component) of the planetary gear 3, except the swinging component (revolution component) of the planetary gear 3, is transmitted to the inner ring 61 of the bearing member 6 through multiple inner pins 4. As a result, a rotational output which is decelerated at a relatively high reduction ratio corresponding to the difference between tooth numbers of the two gears may be obtained from an output shaft integrated with the inner ring 61.

However, in the gear device 1 of some embodiments, as described above, the difference between tooth numbers of the internally toothed gear 2 and the planetary gear 3 specifies a reduction ratio of output rotation with respect to input rotation in the gear device 1. That is, in case that the tooth number of the internally toothed gear 2 is set to "V1" and the tooth number of the planetary gear 3 is set to "V2", a reduction ratio R1 is represented by Formula 1 below.

$$R1 = V2/(V1-V2) \qquad \text{(Formula 1)}$$

In summary, the smaller the difference (V1−V2) between tooth numbers of the internally toothed gear 2 and the planetary gear 3, the larger the reduction ratio R1. As an example, the tooth number V1 of the internally toothed gear 2 is "52", the tooth number V2 of the planetary gear 3 is "51", and the difference (V1−V2) between tooth numbers thereof is "1", and thus the reduction ratio R1 is "51" according to the above Formula 1. In this case, when it is observed from the input side of the rotation axis Ax1, the eccentric shaft 7 rotates clockwise by a circle (360 degrees) with the rotation axis Ax1 as the center, then the inner ring 61 rotates counterclockwise by an amount equal to the difference "1" between tooth numbers (i.e., about 7.06 degrees) with the rotation axis Ax1 as the center.

According to the gear device 1 with the basic structure, such high reduction ratio R1 may be achieved by a combination of primary gears (the internally toothed gear 2 and the planetary gear 3).

Furthermore, it is feasible as long as the gear device 1 includes at least the internally toothed gear 2, the planetary gear 3, multiple inner pins 4, the bearing member 6 and the support body 8, the gear device 1 may further include for example a spline, bushing or the like as structural elements.

However, in case that input rotation of the high-speed rotation side such as the gear device 1 with the basic structure is accompanied by eccentric motion, when weight balance of rotation bodies rotating at a high speed is not obtained, vibration or the like may occur, and thus, sometimes a balance weight or the like is used to obtain weight balance. That is, a rotation body composed of at least one of the eccentric body inner ring 51 or a member (the eccentric shaft 7) rotating together with the eccentric body inner ring 51 performs eccentric motion at a high speed, and thus it is preferable to obtain weight balance of the rotation body with respect to the rotation axis Ax1. In the basic structure, as shown in FIG. 3 and FIG. 4, weight balance of the rotation body with respect to the rotation axis Ax1 is obtained by providing a void 75 in a part of the eccentric portion 72 of the eccentric shaft 7.

In summary, in the basic structure, weight balance of the rotation body with respect to the rotation axis Ax1 is obtained by lightweight based on thinning a part of the rotation body (here, the eccentric shaft 7) without adding a balance weight or the like. That is, the gear device 1 with the basic structure includes the eccentric body bearing 5 which is received in the opened portion 33 formed in the planetary gear 3 and allows the planetary gear 3 to swing. The eccentric body bearing 5 has an eccentric body outer ring 52 and an eccentric body inner ring 51 arranged on an inner side of the eccentric body outer ring 52. When a rotation body composed of at least one of the eccentric body inner ring 51 or a member rotating together with the eccentric body inner ring 51 is observed from the rotation axis Ax1 of the eccentric body inner ring 51, a part of the rotation body on a center C1 side of the eccentric body outer ring 52 has a void 75. In the basic structure, the eccentric shaft 7 is "a component rotating together with the eccentric body inner ring 51", which is equivalent to a "rotation body". Therefore, the void 75 formed in the eccentric portion 72 of the eccentric shaft 7 is equivalent to a void 75 of the rotation body. As shown in FIG. 3 and FIG. 4, the void 75 is located at a position on the center C1 side when it is observed from the rotation axis Ax1, and thus achieves a function of obtaining an almost equal weight balance of the eccentric shaft 7 from the rotation axis Ax1 to the circumferential direction.

More specifically, the void 75 includes a recess formed in an inner peripheral surface of a through-hole 73 penetrating the rotation body along the rotation axis Ax1 of the eccentric body inner ring 51. That is, in the basic structure, the rotation body is the eccentric shaft 7, so that the recess formed in the inner peripheral surface of the through-hole 73 penetrating the eccentric shaft 7 along the rotation axis Ax1 functions as the void 75. In this way, weight balance of the rotation body may be obtained without changing its appearance, by using the recess formed in the inner peripheral surface of the through-hole 73 as the void 75.

(3.2) Self-Rotation Structure of Inner Pin

Figure 9:
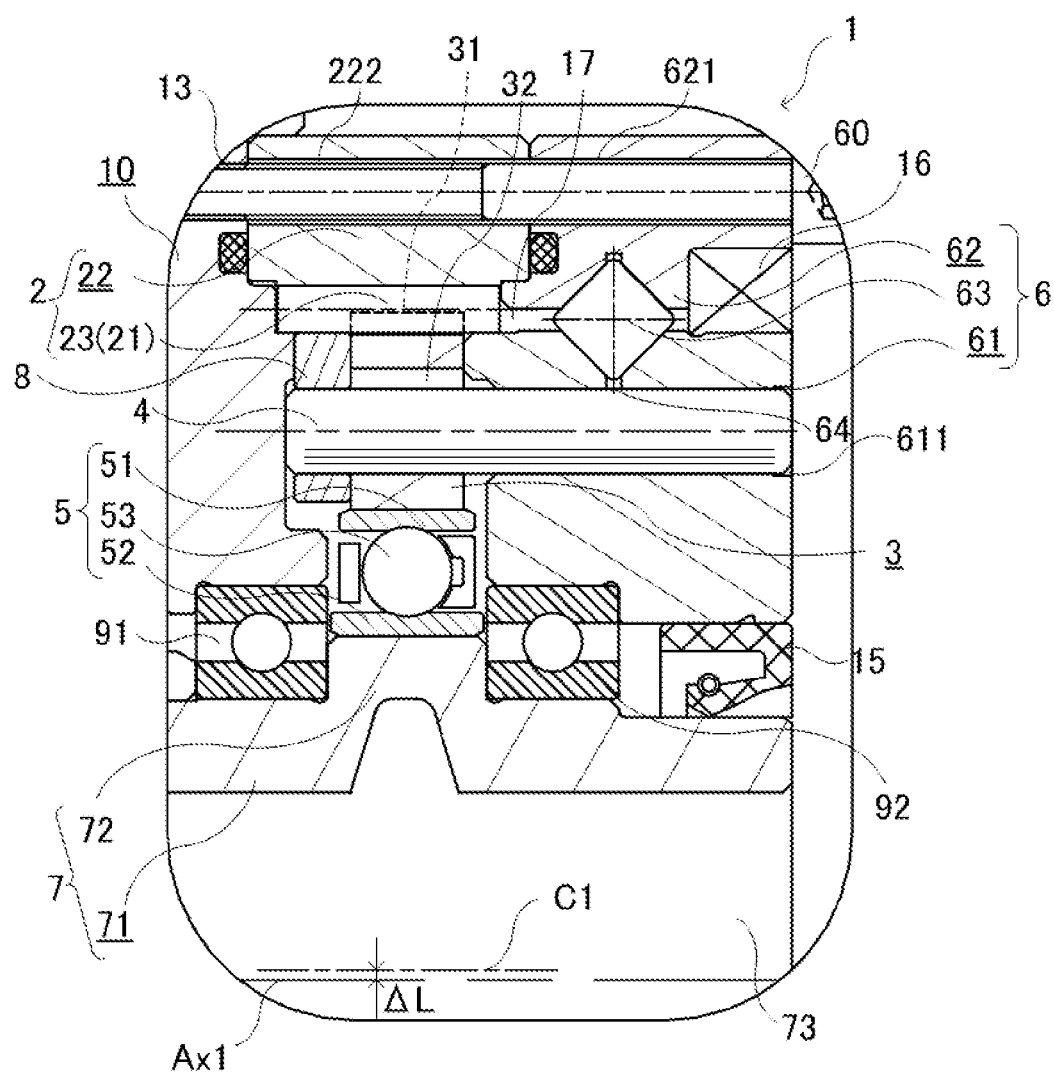
FIG. 9 is an enlarged view of a region Z1 of FIG. 3, showing the above internal-meshing planetary gear device.

Next, a self-rotation structure of the inner pin 4 of the gear device 1 with the basic structure is described in more detail with reference to FIG. 9. FIG. 9 is an enlarged view of a region Z1 of FIG. 3.

Firstly, as a prerequisite, multiple inner pins 4 are components connecting the planetary gear 3 to the inner ring 61 of the bearing member 6, as described above. Specifically, one end portion of the inner pin 4 in a length direction (in the basic structure, an end portion at the input side of the rotation axis Ax1) is inserted into the inner pin hole 32 of the planetary gear 3, and the other end portion of the inner pin 4 in the length direction (in the basic structure, an end portion at the output side of the rotation axis Ax1) is inserted into the holding hole 611 of the inner ring 61.

Here diameter of the inner pin 4 is smaller than that of the inner pin hole 32, so that a gap may be ensured between the inner pin 4 and the inner peripheral surface 321 of the inner pin hole 32, and the inner pin 4 may move in the inner pin hole 32, that is, the inner pin 4 may relatively move relative to center of the inner pin hole 32. On the other hand, although diameter of the holding hole 611 is greater than that of the inner pin 4, diameter of the holding hole 611 is smaller than that of the inner pin hole 32. In the basic structure, diameter of the holding hole 611 is approximately the same as that of the inner pin 4, and is slightly greater than that of the inner pin 4. Therefore, movement of the inner pin 4 in the holding hole 611 is limited, that is, relative movement of the inner pin 4 relative to center of the holding hole 611 is inhibited. Therefore, the inner pin 4 is held in the planetary gear 3 in a state where it is able to revolve in the inner pin hole 32 and is held in a state where it is unable to revolve in the holding hole 611 relative to the inner ring 61. Therefore, the swinging component of the planetary gear 3, i.e., the revolution component of the planetary gear 3, is absorbed by play-embedding of the inner pin hole 32 to the inner pin 4, and rotation (self-rotation component) of the planetary gear 3, except the swinging component (revolution component) of the planetary gear 3, is transmitted to the inner ring 61 through multiple inner pins 4.

However, in the basic structure, diameter of the inner pin 4 is slightly greater than that of the holding hole 611, therefore in a state where the inner pin 4 is inserted into the holding hole 611, the inner pin 4 may self-rotate in the holding hole 611 although revolution of the inner pin 4 in the holding hole 611 is inhibited. That is, although the inner pin 4 is in a state of being inserted into the holding hole 611, the inner pin 4 is not pressed into the holding hole 611, and thus the inner pin 4 may self-rotate in the holding hole 611. In this way, in the gear device 1 with the basic structure, each of multiple inner pins 4 is held by the inner ring 61 in a self-rotatable state, and thus when the inner pin 4 revolves in the inner pin hole 32, the inner pin 4 itself may self-rotate.

In summary, in the basic structure, the inner pin 4 is held in a state of self-rotation and revolving in the inner pin hole 32 relative to the planetary gear 3, and is held in a state of only self-rotation in the holding hole 611 relative to the inner ring 61. That is, multiple inner pins 4 may rotate (revolve) with the rotation axis Ax1 as the center and may revolve in multiple inner pin holes 32 in a state where self-rotation of multiple inner pins 4 are not constrained (in a self-rotatable state). Therefore, when rotation (self-rotation component) of the planetary gear 3 is transmitted to the inner ring 61 by multiple inner pins 4, the inner pin 4 may revolve and self-rotate in the inner pin hole 32, while self-rotate in the holding hole 611. Therefore, when the inner pin 4 revolves in the inner pin hole 32, the inner pin 4 is in a self-rotatable state, so that the inner pin 4 rolls relative to the inner peripheral surface 321 of the inner pin hole 32. In other words, the inner pin 4 revolves in the inner pin hole 32 in a manner of rolling on the inner peripheral surface 321 of the inner pin hole 32, so that it is difficult to generate loss caused by a frictional resistance between the inner peripheral surface 321 of the inner pin hole 32 and the inner pin 4.

In this way, in this structure with the basic structure, since it is originally difficult to generate loss caused by a frictional resistance between the inner peripheral surface 321 of the inner pin hole 32 and the inner pin 4, inner rollers may be omitted. Therefore, in the basic structure, each of multiple inner pins 4 adopts a structure in direct contact with the inner peripheral surface 321 of the inner pin hole 32. That is, in the basic structure, the inner pin 4 in a state of not equipping inner rollers is inserted into the inner pin hole 32, and the inner pin 4 is in direct contact with the inner peripheral surface 321 of the inner pin hole 32. Therefore, inner rollers may be omitted, and diameter of the inner pin hole 32 may be suppressed to be small, so that the planetary gear 3 may be miniaturized (especially with a small diameter), and the whole gear device 1 is also easy to be miniaturized. When size of the planetary gear 3 is fixed, compared with the first related art for example, the number (amount) of inner pins 4 may also be increased to smooth transmission of the rotation, or the inner pin 4 becomes thicker to improve strength. Furthermore, the number of components may be suppressed to reduce the amount corresponding to inner rollers, thereby contributing to low cost of the gear device 1.

Furthermore, in the gear device 1 with the basic structure, at least a part of each of multiple inner pins 4 is arranged at the same position as the bearing member 6 in an axial direction of the bearing member 6. That is, as shown in FIG. 9, at least a part of the inner pin 4 is arranged at the same position as the bearing member 6 in a direction parallel to the rotation axis Ax1. In other words, at least a part of the inner pin 4 is located between two end surfaces of the bearing member 6 in the direction parallel to the rotation axis Ax1. Furthermore, in other words, at least a part of each of multiple inner pins 4 is arranged on the inner side of the outer ring 62 of the bearing member 6. In the basic structure, an end portion of the inner pin 4 at the output side of the rotation axis Ax1 is at the same position as the bearing member 6 in the direction parallel to the rotation axis Ax1. In summary, the end portion of the inner pin 4 at the output side of the rotation axis Ax1 is inserted into the holding hole 611 formed in the inner ring 61 of the bearing member 6, so that at least the end portion is arranged at the same position as the bearing member 6 in the axial direction of the bearing member 6.

In this way, at least a part of each of multiple inner pins 4 is arranged at the same position as the bearing member 6 in the axial direction of the bearing member 6, so that size of the gear device 1 in the direction parallel to the rotation axis Ax1 may be suppressed to be small. That is, compared with a structure where the bearing member 6 is in parallel with (opposite to) the inner pin 4 along the axial direction of the bearing member 6, in the gear device 1 with the basic structure, size of the gear device 1 in the direction parallel to the rotation axis Ax1 may be reduced, thereby contributing to further miniaturization (thinning) of the gear device 1.

Here an opened surface of the holding hole 611 at the output side of the rotation axis Ax1 is closed for example by an output shaft integrated with the inner ring 61 or the like. As a result, movement of the inner pin 4 toward the output side of the rotation axis Ax1 (right side of FIG. 9) is limited by the output shaft integrated with the inner ring 61 or the like.

Furthermore, in the basic structure, in order for the inner pin 4 to self-rotate relative to the inner ring 61 smoothly, the following structure is used. That is, a lubricant (lubrication oil) is interposed between an inner peripheral surface of the holding hole 611 formed in the inner ring 61 and the inner pin 4, so that self-rotation of the inner pin 4 is smooth. Especially in the basic structure, there is a lubricant holding space 17 for injecting the lubricant between the inner ring 61 and the outer ring 62, so that the lubricant in the lubricant holding space 17 is used to achieve smooth self-rotation of the inner pin 4.

In the basic structure, as shown in FIG. 9, the inner ring 61 has multiple holding holes 611 into which multiple inner pins 4 are inserted respectively, and multiple link paths 64. Multiple link paths 64 connect the lubricant holding space 17 between the inner ring 61 and the outer ring 62 to multiple holding holes 611. Specifically, the inner ring 61 is formed with the link path 64 extending radially from a part of the inner peripheral surface of the holding hole 611, that is, a part corresponding to the rolling body 63. The link path 64 is a hole penetrating between a bottom surface of a recess (groove) receiving the rolling body 63 in an opposite surface of the inner ring 61 opposite to the outer ring 62 and the inner peripheral surface of the holding hole 611. In other words, an opened surface of the link path 64 on the lubricant holding space 17 side is arranged at a position facing (opposite to) the rolling body 63 of the bearing member 6. The lubricant holding space 17 and the holding hole 611 are spatially connected via such link path 64.

According to the above structure, since the lubricant holding space 17 is connected to the holding hole 611 by the link path 64, the lubricant in the lubricant holding space 17 is supplied to the holding hole 611 through the link path 64. That is, the rolling body 63 functions as a pump when the bearing member 6 operates and the rolling body 63 rotates, to supply the lubricant in the lubricant holding space 17 to the holding hole 611 through the link path 64. In particular, the opened surface of the link path 64 on the lubricant holding space 17 side is at the position facing (opposite to) the rolling body 63 of the bearing member 6, therefore the rolling body 63 effectively functions as a pump when the rolling body 63 rotates. As a result, the lubricant is interposed between the inner peripheral surface of the holding hole 611 and the inner pin 4, which may achieve smooth self-rotation of the inner pin 4 relative to the inner ring 61.

(3.3) Support Body

Figure 10:
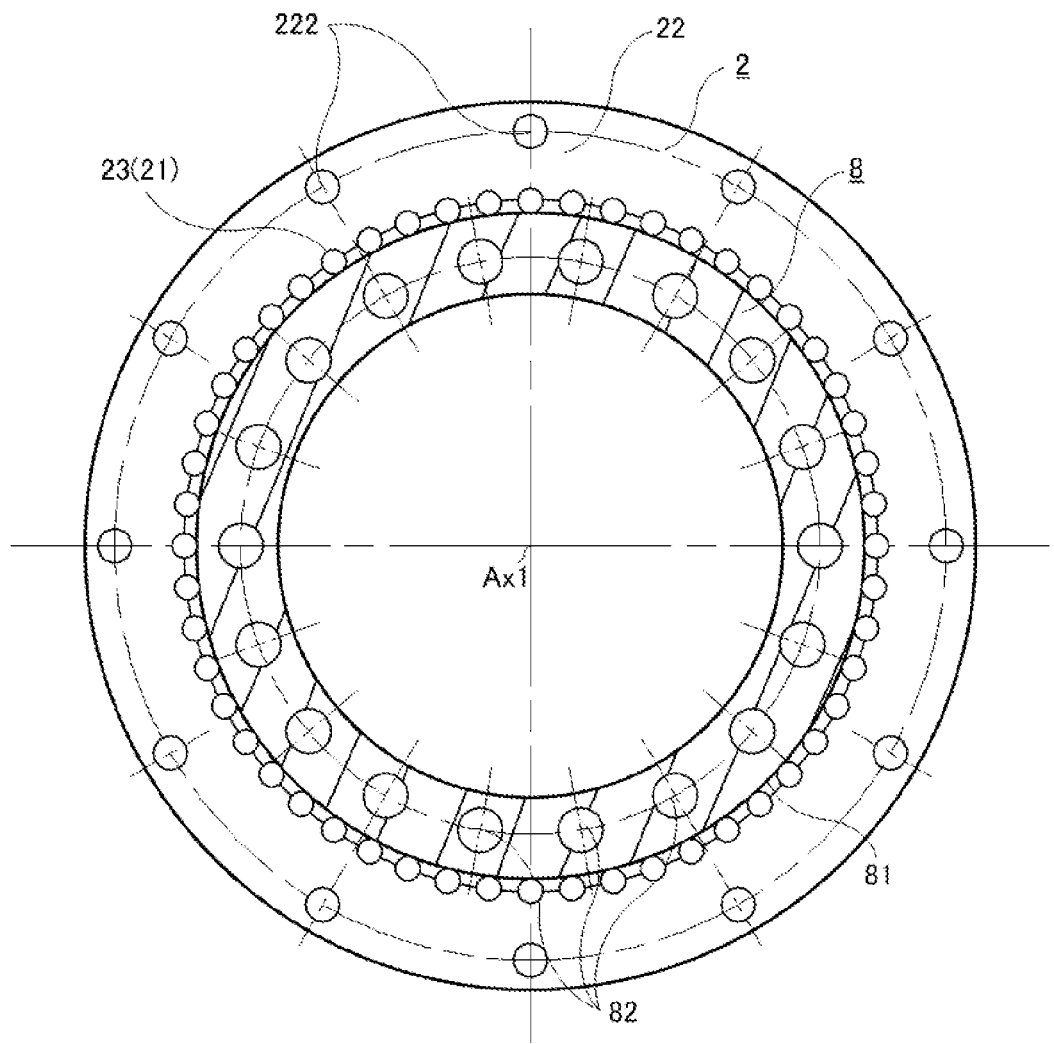
FIG. 10 is a cross-sectional view of a line B1-B1 of FIG. 3, showing the above internal-meshing planetary gear device.

Next, a structure of the support body 8 of the gear device 1 with the basic structure is described in more detail with reference to FIG. 10. FIG. 10 is a cross-sectional view of a line B1-B1 of FIG. 3. However, in FIG. 10, cross-sectional lines are omitted with respect to components other than the support body 8, even though they are shown in cross-section. Furthermore, in FIG. 10, only the internally toothed gear 2 and the support body 8 are shown, and illustration of other components (inner pins 4, or the like) are omitted. Furthermore, in FIG. 10, illustration of the inner peripheral surface 221 of the gear body 22 is omitted.

Firstly, as a prerequisite, the support body 8 is a component supporting multiple inner pins 4, as described above. That is, the support body 8 disperses load acting on multiple inner pins 4 when rotation (self-rotation component) of the planetary gear 3 is transmitted to the inner ring 61, by constraining multiple inner pins 4. Specifically, there are multiple support holes 82 into which multiple inner pins 4 are inserted respectively. In the basic structure, as an example, diameter of the support hole 82 is equal to that of the holding hole 611 formed in the inner ring 61. Therefore, the support body 8 supports multiple inner pins 4 in a state where each of multiple inner pins 4 is self-rotatable. That is, each of multiple inner pins 4 is held in a state where it is self-rotatable relative to the support body 8 and the inner ring 61 of the bearing member 6.

In this way, the support body 8 performs positioning of multiple inner pins 4 relative to the support body 8 in both circumferential and radial directions. That is, movement of the inner pin 4 is limited with respect to all directions in a plane orthogonal to the rotation axis Ax1 by inserting into the support hole 82 of the support body 8. Therefore, the inner pin 4 is positioned not only in the circumferential direction but also in the radial direction (radially) by the support body 8.

Here the support body 8 has a circular ring shape of which at least the outer peripheral surface 81 is a perfect circle when it is observed in a top view. Furthermore, position of the support body 8 is limited by contacting the outer peripheral surface 81 with multiple pins 23 in the internally toothed gear 2. In other words, since multiple pins 23 constitute the internal teeth 21 of the internally toothed gear 2, position of the support body 8 is limited by contacting the outer peripheral surface 81 with the internal teeth 21. Here diameter of the outer peripheral surface 81 of the support body 8 is the same as that of a virtual circle (addendum circle) passing through a front end of the internal tooth 21 of the internally toothed gear 2. Therefore, multiple pins 23 are all in contact with the outer peripheral surface 81 of the support body 8. Therefore, in a state where position of the support body 8 is limited by multiple pins 23, position of center of the support body 8 is limited in a manner that it overlaps with center of the internally toothed gear 2 (the rotation axis Ax1). Therefore, centering of the support body 8 is achieved, and as a result, centering of multiple inner pins 4 supported by the support body 8 is also achieved by multiple pins 23.

Furthermore, multiple inner pins 4 rotate (revolve) with the rotation axis Ax1 as the center, thereby transmitting rotation (self-rotation component) of the planetary gear 3 to the inner ring 61. Therefore, the support body 8 supporting multiple inner pins 4 rotates with the rotation axis Ax1 as the center, together with multiple inner pins 4 and the inner ring 61. At this time, centering of the support body 8 is achieved by multiple pins 23, so that the support body 8 rotates smoothly in a state where center of the support body 8 is maintained on the rotation axis Ax1. Furthermore, the support body 8 rotates in a state where the outer peripheral surface 81 thereof is in contact with multiple pins 23, so that each of multiple pins 23 rotates (self-rotates) along with rotation of the support body 8. Therefore, the support body 8 and the internally toothed gear 2 together constitute a needle bearing (acicular roller bearing) and rotate smoothly.

That is, the outer peripheral surface 81 of the support body 8 relatively rotates relative to the gear body 22 together with multiple inner pins 4, in a state where it is tangent to multiple pins 23. Therefore, when the gear body 22 of the internally toothed gear 2 is considered as an "outer ring", the support body 8 is considered as an "inner ring", then multiple pins 23 between the gear body and the support body function as "rolling bodies (rollers)". In this way, the support body 8 and the internal toothed gear 2 (the gear body 22 and multiple pins 23) together constitute a needle bearing, and may rotate smoothly.

Furthermore, since multiple pins 23 are sandwiched between the support body 8 and the gear body 22, the support body 8 also functions as a "limiter" which suppresses movement of the pin 23 in a direction separated from the inner peripheral surface 221 of the gear body 22. That is, multiple pins 23 are sandwiched between the outer peripheral surface 81 of the support body 8 and the inner peripheral surface 221 of the gear body 22, thereby suppressing floating of multiple pins 23 from the inner peripheral surface 221 of the gear body 22. In summary, in the basic structure, movement of each of multiple pins 23 in a direction separated from the gear body 22 is limited by contacting each of multiple pins with the outer peripheral surface 81 of the support body 8.

However, in the basic structure, as shown in FIG. 9, the support body 8 is located on an opposite side of the inner ring 61 of the bearing member 6 across the planetary gear 3. That is, the support body 8, the planetary gear 3 and the inner ring 61 are arranged in parallel in the direction parallel to the rotation axis Ax1. In the basic structure, as an example, the support body 8 is located on the input side of the rotation axis Ax1 when it is observed from the planetary gear 3, and the inner ring 61 is located on the output side of the rotation axis Ax1 when it is observed from the planetary gear 3. Furthermore, the support body 8 and the inner ring 61 together support both end portions of the inner pin 4 in a length direction (a direction parallel to the rotation axis Ax1), and a central portion of the inner pin 4 in the length direction is inserted into the inner pin hole 32 of the planetary gear 3 by penetrating it. In summary, the gear device 1 with the basic structure includes a bearing member 6, the bearing member 6 has an outer ring 62 and an inner ring 61, the inner ring 61 is arranged on an inner side of the outer ring 62 and is supported to be rotatable relative to the outer ring 62. Furthermore, the gear body 22 is fixed to the outer ring 62. Here the planetary gear 3 is located between the support body 8 and the inner ring 61 in an axial direction of the support body 8.

According to this structure, the support body 8 and the inner ring 61 support both end portions of the inner pin 4 in the length direction, so that it is difficult to generate inclination of the inner pin 4. In particular, it is also easy to bear a bending force (bending moment load) for the rotation axis Ax1 acting on multiple inner pins 4. Furthermore, in the basic structure, the support body 8 is sandwiched between the planetary gear 3 and the housing 10 in the direction parallel to the rotation axis Ax1. Therefore, movement of the support body 8 toward the input side of the rotation axis Ax1 (left side of FIG. 9) is limited by the housing 10. Movement of the inner pin 4 protruding from the support body 8 to the input side of the rotation axis Ax1 by penetrating the support hole 82 of the support body 8, toward the input side (left side of FIG. 9) of the rotation axis Ax1 is also limited by the housing 10.

In the basic structure, the support body 8 and the inner ring 61 are also in contact with both end portions of each of multiple pins 23 respectively. That is, as shown in FIG. 9, the support body 8 is in contact with one end portion (an end portion at the input side of the rotation axis Ax1) of the pin 23 in a length direction (a direction parallel to the rotation axis Ax1). The inner ring 61 is in contact with the other end portion (an end portion at the output side of the rotation axis Ax1) of the pin 23 in the length direction (a direction parallel to the rotation axis Ax1). According to this structure, centering of the support body 8 and the inner ring 61 are achieved at both end portions of the pin 23 in the length direction, so that it is difficult to generate inclination of the inner pin 4. In particular, it is also easy to bear the bending force (bending moment load) for the rotation axis Ax1 acting on multiple inner pins 4.

Furthermore, lengths of multiple pins 23 are greater than thickness of the support body 8. In other words, in the direction parallel to the rotation axis Ax1, the support body 8 is received in a range of the tooth direction of the internal tooth 21. Therefore, the outer peripheral surface 81 of the support body 8 is in contact with multiple pins 23 throughout the entire length in the tooth direction (a direction parallel to the rotation axis Ax1) of the internal tooth 21. Therefore, it is difficult to generate a bad condition such as "unilateral wear", that is, the outer peripheral surface 81 of the support body 8 is partially worn.

Furthermore, in the basic structure, surface roughness of the outer peripheral surface 81 of the support body 8 is smaller than that of a surface of the support body 8 adjacent to the outer peripheral surface 81. That is, surface roughness of the outer peripheral surface 81 is smaller than that of both end surfaces of the support body 8 in an axial direction (thickness direction). "surface roughness" stated in the embodiments of the disclosure refers to roughness degree of a surface of an object, the smaller a value thereof, the smaller (the less) a concave-convex degree of the surface, the smoother the surface. In the basic structure, as an example, surface roughness is set to an arithmetic mean roughness (Ra). For example, by grinding or other processes, surface roughness of the outer peripheral surface 81 is smaller than that of surfaces other than the outer peripheral surface 81 of the support body 8. In this structure, rotation of the support body 8 becomes smoother.

Furthermore, in the basic structure, hardness of the outer peripheral surface 81 of the support body 8 is lower than that of a peripheral surface of each of multiple pins 23 and is higher than that of the inner peripheral surface 221 of the gear body 22. "hardness" stated in the embodiments of the disclosure refers to a hard degree of an object, and hardness of a metal is represented for example by size of an indentation formed by pushing and pressing a steel ball at a certain pressure. Specifically, as an example of hardness of the metal, there are Rockwell hardness (HRC), Brinell hardness (FIB), Vickers hardness (HV), or Shore hardness (HS), or the like. As a means of increasing hardness (hardening) of a metal part, there are for example alloying, or heat treatment, or the like. In the basic structure, as an example, hardness of the outer peripheral surface 81 of the support body 8 is increased by carburizing and quenching, or other processes. In this structure, even though the support body 8 rotates, it is difficult to generate wear powder or the like, so that smooth rotation of the support body 8 is easily maintained for a long period of time.

(4) Application Example

Next, an application example of the gear device 1 and the actuator 100 with the basic structures is described.

The gear device 1 and the actuator 100 with the basic structures are applicable to for example a horizontal multi joint robot, i.e., a robot such as so-called Selective Compliance Assembly Robot Arm (SCARA) type robot.

Furthermore, the application example of the gear device 1 and the actuator 100 with the basic structures is not limited to the above horizontal multi joint robot, for example, may also be applicable to industrial robots other than the horizontal multi-joint robot, or robots other than industrial robots, or the like. As an example, in industrial robots other than the horizontal multi joint robot, there is a vertical multi joint robot, or a parallel link-type robot, or the like. As an example, in robots other than industrial robots, there is a home robot, a nursing robot, or a medical robot, or the like.

An internal-meshing planetary gear device 1A (hereinafter, referred to as "gear device 1A" for abbreviation) according to some embodiments is shown in FIG. 11 to FIG. 14 or other figures, in which mainly structures around the bearing member 6A are different from those of the gear device 1 with the basic structure. Hereinafter, the same structure as that described in the basic structure is marked with the same reference numeral, and descriptions thereof are omitted appropriately.

Figure 11:
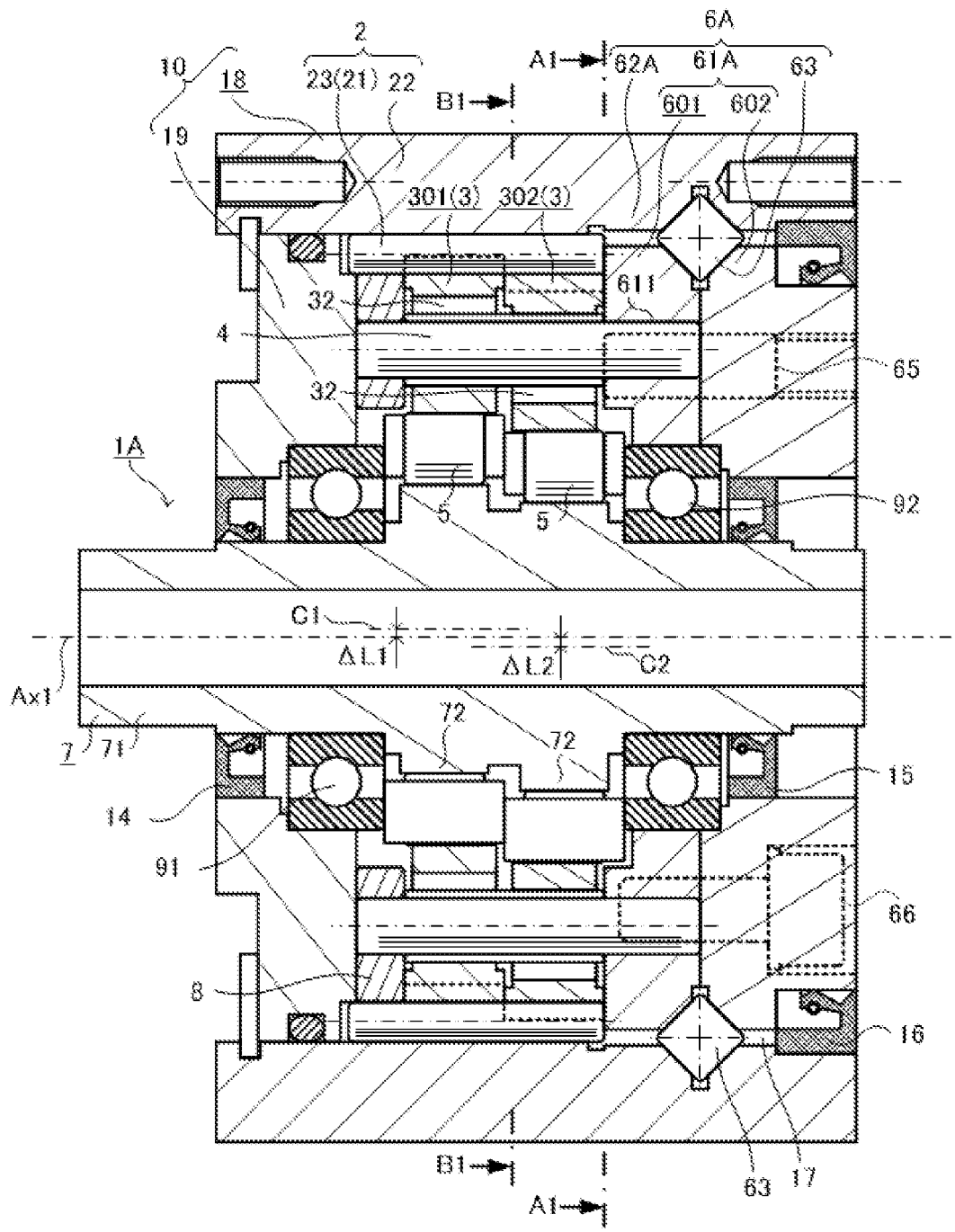
FIG. 11 is a diagrammatic cross-sectional view of an internal-meshing planetary gear device according to some embodiments.
Figure 12:
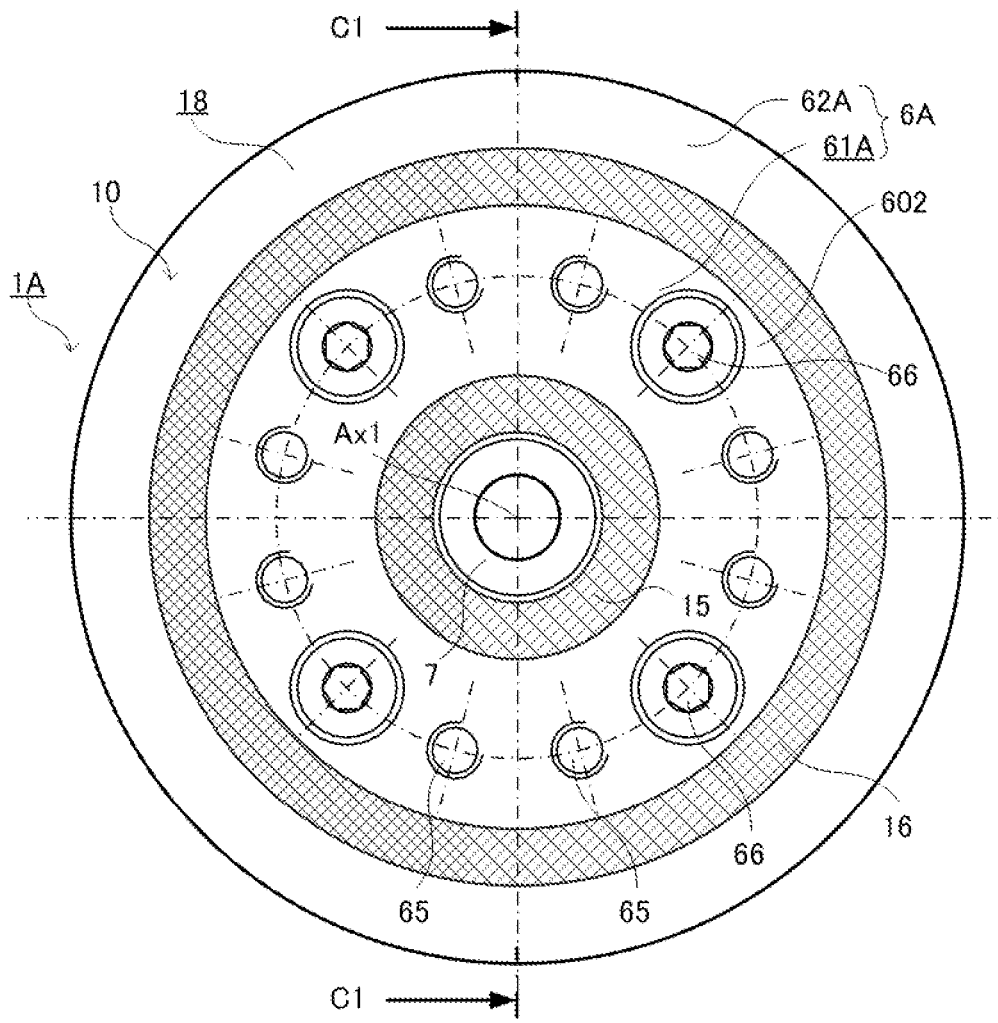
FIG. 12 is a side view of the above internal-meshing planetary gear device observed from an output side of a rotation axis.
Figure 13:
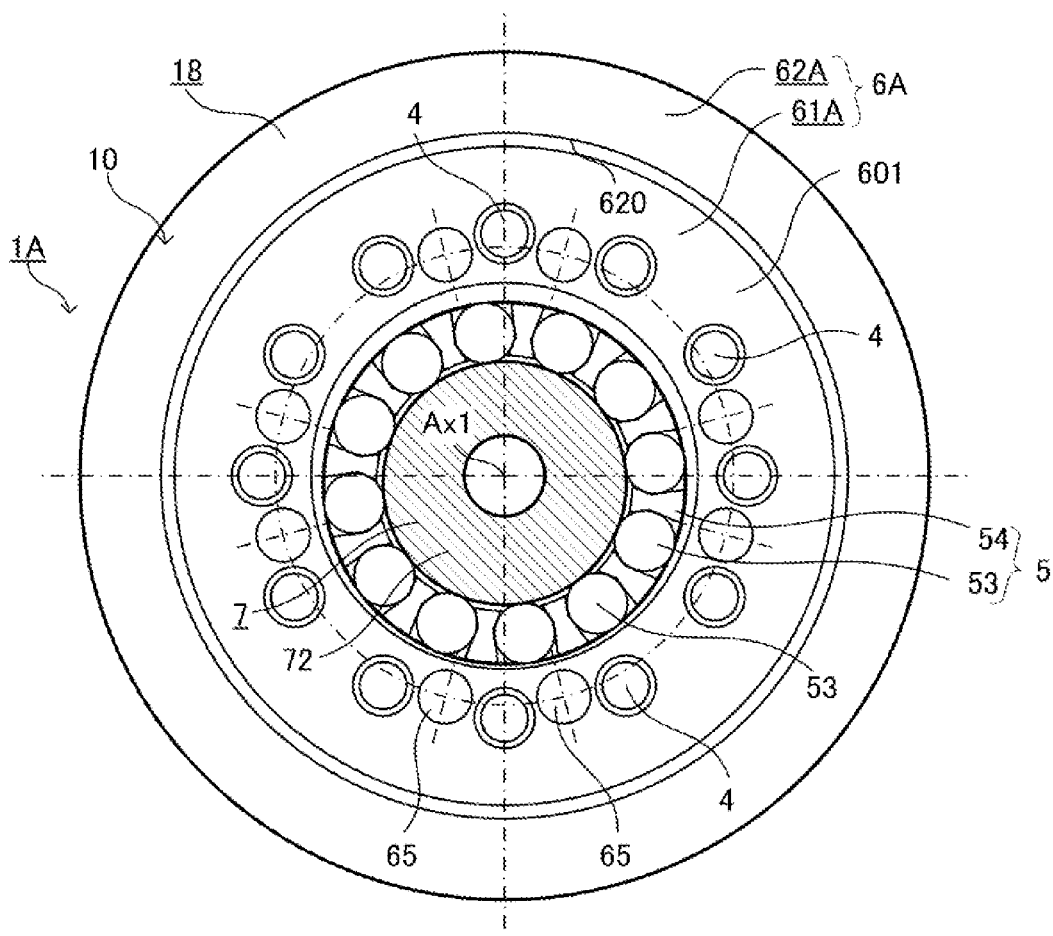
FIG. 13 is a cross-sectional view of a line A1-A1 of FIG. 11, showing the above internal-meshing planetary gear device.
Figure 14:
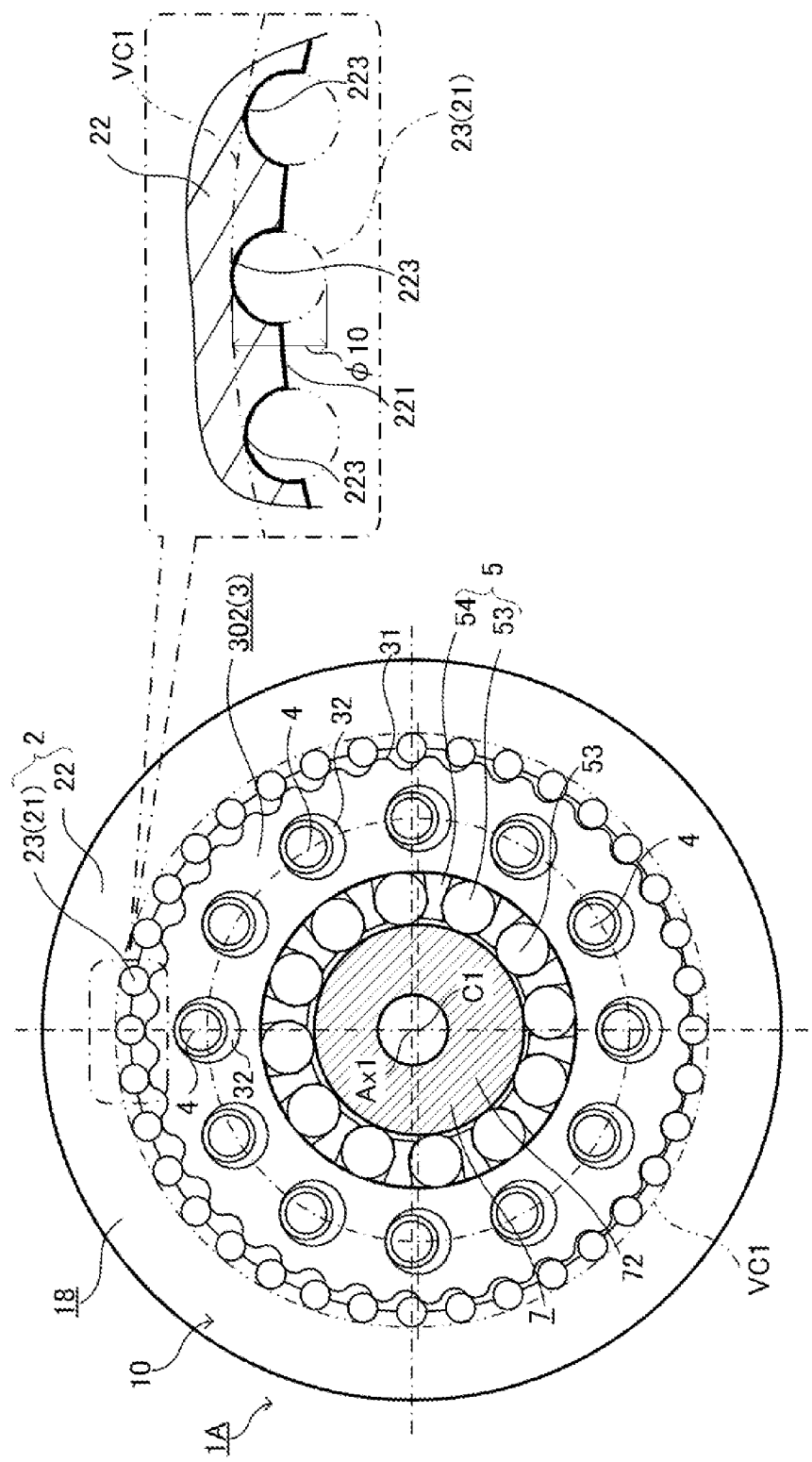
FIG. 14 is a cross-sectional view of a line B1-B1 of FIG. 11 and a partially enlarged view thereof, showing the above internal-meshing planetary gear device.

FIG. 11 is a diagrammatic cross-sectional view of the gear device 1A. FIG. 12 is a side view of the gear device 1A observed from an output side (right side of FIG. 11) of a rotation axis Ax1, and FIG. 11 is equivalent to a cross-sectional view of a line C1-C1 of FIG. 12. FIG. 13 is a cross-sectional view of a line A1-A1 of FIG. 11, and FIG. 14 is a cross-sectional view of a line B1-B1 of FIG. 11 and a partially enlarged view thereof. Here, in FIG. 13 and FIG. 14, components other than the eccentric shaft 7 are shown in cross-section, but cross-sectional lines are omitted.

In some embodiments, a bearing member 6 has an outer ring 62A, an inner ring 61A arranged on an inner side of the outer ring 62A, and multiple rolling bodies 63 arranged between the outer ring 62A and the inner ring 61A. Furthermore, the inner ring 61A is supported to be rotatable relative to the outer ring 62A with the rotation axis Ax1 as the center. In this regard, it is the same as the basic structure.

A first major difference point of the gear device 1A of some embodiments with respect to the basic structure lies in that the inner ring 61A of the bearing member 6A is not composed of one component, instead, it includes two components, i.e., a first inner ring 601 and a second inner ring 602. That is, as shown in FIG. 11, in the gear device 1A, the inner ring 61A includes a first inner ring 601 and a second inner ring 602 which are opposite to each other in a direction parallel to the rotation axis Ax1 and have opposite surfaces 601A, 602A in contact with each other respectively (referring to FIG. 15)

Furthermore, a second major difference point of the gear device 1A of some embodiments with respect to the basic structure lies in that the outer ring 62A of the bearing member 6A is not formed separately from the gear body 22 of the internally toothed gear 2, instead, it is seamlessly and integrally formed with the gear body 22. That is, as shown in FIG. 11, in the gear device 1A, the outer ring 62A is seamlessly and continuously arranged with the gear body 22 in the direction parallel to the rotation axis Ax1 (the tooth direction of the internal tooth 21).

In summary, as major difference points of the gear device 1A of some embodiments with respect to the basic structure, study of the inner ring 61A of the bearing member 6A and study of the outer ring 62A of the bearing member 6A are newly adopted. Study of the inner ring 61A includes that the inner ring 61A has a first inner ring 601 and a second inner ring 602, and study of the outer ring 62A includes that the outer ring 62A is seamlessly and continuously arranged with the gear body 22.

Other Different Points

In the gear device 1A of some embodiments, besides the above major difference points (study of the inner ring 61A and study of the outer ring 62A), there are multiple different points with respect to the basic structure, as described below.

As a first one of other points of differences, the gear device 1A of some embodiments is used in such a way that rotation of the planetary gear 3 corresponding to a self-rotation component is taken out, as rotation of an output shaft integrated with the outer ring 62A of the bearing member 6A, or the like. That is, in the basic structure, relative rotation between the planetary gear 3 and the internally toothed gear 2 is taken out from the inner ring 61 connected to the planetary gear 3 by multiple inner pins 4, as the self-rotation component of the planetary gear 3. In comparison, in some embodiments, the relative rotation between the planetary gear 3 and the internally toothed gear 2 is taken out from the outer ring 62A integrated with the gear body 22 of the internally toothed gear 2. In some embodiments, as an example, the gear device 1A is used in a state where inner rings 61A of multiple inner pins 4 are kept to be fixed to a fixing member (a hub member 104 as described below, or the like) and outer rings 62A of multiple inner pins are kept to be fixed to the housing 10 which becomes a rotation member. That is, the planetary gear 3 is connected to the fixing member by multiple inner pins 4, and the gear body 22 is fixed to the rotation member, therefore the relative rotation between the planetary gear 3 and the internally toothed gear 2 is taken out from the internally toothed gear 2 (the gear body 22). In other words, in some embodiments, the gear device 1A is configured to take a rotation force of the gear body 22 out as output when multiple inner pins 4 relatively rotate relative to the gear body 22.

Figure 17:
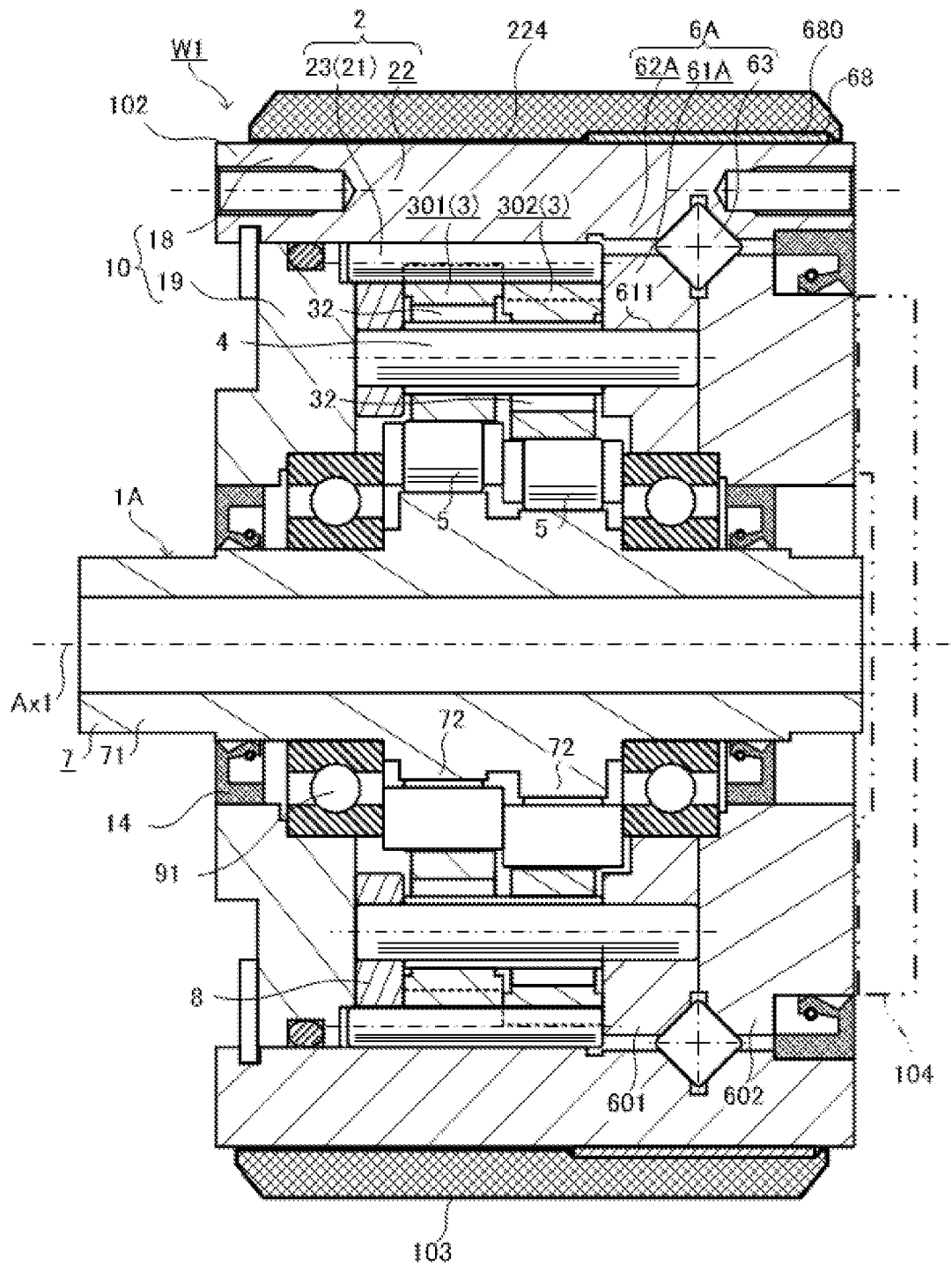
FIG. 17 is a diagrammatic cross-sectional view of a wheel device using the above internal-meshing planetary gear device.

Furthermore, the gear device 1A taking the rotation force of the gear body 22 out as output in this way, is used as an example for a wheel device W1 (referring to FIG. 17). In this case, the rotation member (the housing 10) functions as a wheel body 102 (referring to FIG. 17), so that the wheel body 102 may rotate along with the relative rotation between the planetary gear 3 and the internally toothed gear 2. In this way, in some embodiments, the wheel body 102 may be driven in a way that the wheel body 102 rolls on a traveling surface by using the gear device 1A to the wheel device W1 and using a rotational output when multiple inner pins 4 relatively rotate relative to the gear body 22. In summary, in case that the gear device 1A is used as the wheel device W1, the gear device 1A applies a rotation force as input to the eccentric shaft 7, thereby taking, from the rotation member used as the wheel body 102, a rotation force out as output. That is, the gear device 1A acts with rotation of the eccentric shaft 7 as input rotation, and with rotation of the rotation member fixed with the gear body 22 as output rotation. Therefore, in the gear device 1A, output rotation which is decelerated at a relatively high reduction ratio with respect to input rotation may be obtained as rotation of the wheel body 102.

As a second one of other points of differences, the gear device 1A of some embodiments includes multiple planetary gears 3. Specifically, the gear device 1A includes two planetary gears 3, i.e., a first planetary gear 301 and a second planetary gear 302. The two planetary gears 3 are configured to be opposite to each other in the direction parallel to the rotation axis Ax1. That is, the planetary gear 3 includes a first planetary gear 301 and a second planetary gear 302 which are opposite to each other in the direction parallel to the rotation axis Ax1.

The two planetary gears 3 (the first planetary gear 301 and the second planetary gear 302) are arranged at a phase difference of 180 degrees about the rotation axis Ax1. In the example of FIG. 11, center C1 of the first planetary gear 301, at an input side (left side of FIG. 11) of the rotation axis Ax1, of the first planetary gear 301 and the second planetary gear 302 is in a state offset (deviating) toward top of the figure relative to the rotation axis Ax1. On the other hand, center C2 of the second planetary gear 302 at an output side (right side of FIG. 11) of the rotation axis Ax1 is in a state offset (deviating) toward bottom of the figure relative to the rotation axis Ax1. In this way, weight balance between multiple planetary gears 3 may be obtained by multiple planetary gears 3 equally arranged in a circumferential direction with the rotation axis Ax1 as the center. In the gear device 1A of some embodiments, the void 75 (referring to FIG. 3) of the eccentric shaft 7 is omitted, since weight balance is obtained among multiple planetary gears 3 in this way.

More specifically, the eccentric shaft 7 has two eccentric portions 72 with respect to one axis portion 71. Centers (central axes) of the two eccentric portions 72 are consistent with centers C1, C2 offset from the rotation axis Ax1, respectively. Furthermore, shapes of the first planetary gear 301 and the second planetary gear 302 themselves are the same. Furthermore, an eccentric body bearing 5 in a state of being assembled in the eccentric portion 72 with center C1 as the center, is received in an opened portion 33 of the first planetary gear 301. An eccentric body bearing 5 in a state of being assembled in the eccentric portion 72 with center C2 as the center, is received in an opened portion 33 of the second planetary gear 302. Here a distance ΔL1 between the rotation axis Ax1 and center C1 is an eccentric amount of the first planetary gear 301 relative to the rotation axis Ax1, and a distance ΔL2 between the rotation axis Ax1 and center C2 is an eccentric amount of the second planetary gear 302 relative to the rotation axis Ax1. In some embodiments, although the eccentric amount ΔL1 and the eccentric amount ΔL2 are oriented oppositely when they are observed from the rotation axis Ax1, absolute values thereof are the same. According to the above structure, the axis portion 71 rotates (self-rotation) with the rotation axis Ax1 as the center, therefore the first planetary gear 301 and the second planetary gear 302 rotate (eccentric motion) around the rotation axis Ax1 at a phase difference of 180 degrees about the rotation axis Ax1.

As a third one of other different points, in some embodiments, as shown in FIG. 13 and FIG. 14, the eccentric body bearing 5 is composed of a roller bearing, instead of a deep groove ball bearing as described in the basic structure. That is, in the gear device 1A of some embodiments, the eccentric body bearing 5 uses cylinder (cylindrical) rollers as the rolling bodies 53. Furthermore, in some embodiments, the eccentric body inner ring 51 (referring to FIG. 3) and the eccentric body outer ring 52 (referring to FIG. 3) are omitted. Therefore, an inner peripheral surface (of the opened portion 33) of the planetary gear 3 is composed of rolling surfaces of multiple rolling bodies 53, instead of the eccentric body outer ring 52, and an outer peripheral surface of the eccentric portion 72 is composed of rolling surfaces of multiple rolling bodies 53, instead of the eccentric body inner ring 51. In some embodiments, the eccentric body bearing 5 has a cage (retainer) 54, multiple rolling bodies 53 are held by the cage 54 in a self-rotatable state respectively. The cage 54 holds multiple rolling bodies 53 at equal intervals along a circumferential direction of the eccentric portion 72. Furthermore, the cage 54 is not fixed relative to the planetary gear 3 and the eccentric shaft 7, and may relatively rotate relative to the planetary gear 3 and the eccentric shaft 7 respectively. As a result, multiple rolling bodies 53 held by the cage 54 are moved in the circumferential direction of the eccentric portion 72 along with rotation of the cage 54.

As a fourth one of other different points, in some embodiments, the housing 10 is seamlessly integrated with the gear body 22 of the internally toothed gear 2 and the outer ring 62A of the bearing member 6A. That is, in the basic structure, the gear body 22 of the internally toothed gear 2 is used in a state of being fixed to the housing 10 together with the outer ring 62 of the bearing member 6. In comparison, in some embodiments, the outer ring 62A seamlessly and continuously arranged with the gear body 22 in the direction parallel to the rotation axis Ax1 is also seamlessly and continuously arranged with the housing 10 used as the rotation member by study of the outer ring 62A.

More specifically, the housing 10 has a cylindrical shape to constitute outline of the gear device 1A. In some embodiments, for example, since the housing 10 used as the rotation member functions as the wheel body 102, a central axis of the housing 10 with a cylindrical shape is configured to be consistent with the rotation axis Ax1. That is, at least an outer peripheral surface of the housing 10 is a perfect circle with the rotation axis Ax1 as the center when it is observed in a top view (observed from one side in a direction of the rotation axis Ax1). As shown in FIG. 11, the housing 10 has a body portion 18 and a cover 19. The body portion 18 is a cylindrical component of which both end surfaces in the direction of the rotation axis Ax1 are opened. The cover 19 is a disc-shaped component mounted in an end surface of the body portion 18 at the input side (left side of FIG. 11) of the rotation axis Ax1 and closing an opened surface of the body portion 18 at the input side of the rotation axis Ax1. Furthermore, in some embodiments, the gear body 22 of the internally toothed gear 2 and the outer ring 62A of the bearing member 6A are seamlessly integrated into the body portion 18 of the housing 10. Therefore, the gear body 22 and the outer ring 62A are treated as a component (the body portion 18). Accordingly, an inner peripheral surface of the body portion 18 includes the inner peripheral surface 221 of the gear body 22 (referring to FIG. 14) and an inner peripheral surface 620 of the outer ring 62A (referring to FIG. 13).

Furthermore, besides the above points, some embodiments are also appropriately different from the basic structure in for example tooth numbers of the internally toothed gear 2 and the planetary gear 3, the reduction ratio, the number of inner pin holes 32 and inner pins 4, specific shape and size of each component, or the like. For example, the inner pin holes 32 and the inner pins 4 are configured to 18 inner pin holes and 18 inner pins in the basic structure respectively, while in comparison, as an example, the inner pin holes 32 and the inner pins 4 are configured to 12 inner pin holes and 12 inner pins in some embodiments respectively.

Study of Inner Ring

Next, study of the inner ring 61A of the bearing member 6A of the gear device 1A of some embodiments is described in detail with reference to FIG. 11 to FIG. 16.

In some embodiments, as described above, the inner ring 61A of the bearing member 6A is configured to include two components, i.e., a first inner ring 601 and a second inner ring 602 which are opposite to each other in a direction parallel to the rotation axis Ax1. The first inner ring 601 and the second inner ring 602 are combined in a state where opposite surfaces 601A, 602A thereof are in contact with each other. In other words, the inner ring 61A is divided into two components, i.e., the first inner ring 601 and the second inner ring 602 arranged in parallel in the direction parallel to the rotation axis Ax1.

Each of the first inner ring 601 and the second inner ring 602 is an annular component. Each of the first inner ring 601 and the second inner ring 602 has a circular ring shape which is a perfect circle when it is observed in a top view. In the first inner ring 601 and the second inner ring 602, outer diameters $\varphi 1$ (referring to FIG. 15) thereof are the same, inner diameters thereof are also substantially the same. In some embodiments, as an example, size of the second inner ring 602 in the direction parallel to the rotation axis Ax1 is greater than that of the first inner ring 601 in the direction parallel to the rotation axis Ax1, however, the first and second inner rings are not limited to this size relationship.

Each of the first inner ring 601 and the second inner ring 602 is smaller than the outer ring 62A and are arranged on the inner side of the outer ring 62A. Here inner diameter $\varphi 3$ of the outer ring 62A (referring to FIG. 15) is greater than outer diameters $\varphi 1$ of the first inner ring 601 and the second inner ring 602, and thus a gap is generated between the inner peripheral surface 620 of the outer ring 62A and outer peripheral surfaces of the first inner ring 601 and the second inner ring 602. Furthermore, although details are described below, outer diameters $\varphi 1$ of the first inner ring 601 and the second inner ring 602 are smaller than diameter $\varphi 2$ (referring to FIG. 15) of a virtual circle VC1 (referring to FIG. 14) passing through bottom of multiple pin holding grooves 223 (referring to FIG. 14) in the inner peripheral surface 221 of the gear body 22.

Here the first inner ring 601 and the second inner ring 602 are configured such that in the direction parallel to the rotation axis Ax1, the first inner ring 601 is at the planetary gear 3 side, and the second inner ring 602 is at an opposite side of the planetary gear 3. In other words, the first inner ring 601 and the second inner ring 602 are configured such that the first inner ring 601 is at the input side of the rotation axis Ax1 (left side of FIG. 11), and the second inner ring 602 is at the output side of the rotation axis Ax1 (right side of FIG. 11). Therefore, the opposite surface 601A of the first inner ring 601 opposite to the second inner ring 602 is composed of a surface of the first inner ring 601 facing the output side of the rotation axis Ax1 (right side of FIG. 11). On the contrary, the opposite surface 602A of the second inner ring 602 opposite to the first inner ring 601 is composed of a surface of the second inner ring 602 facing the input side of the rotation axis Ax1 (left side of FIG. 11). The first inner ring 601 and the second inner ring 602 are combined with each other by opposite surfaces 601A, 602A thereof contacting with each other, to constitute the inner ring 61A.

As shown in FIG. 12, the first inner ring 601 and the second inner ring 602 are combined through multiple positioning pins 65 and multiple bolts 66 in a state of being combined as described above. Multiple positioning pins 65 are pressed into multiple holes penetrating the inner ring 61A in the direction parallel to the rotation axis Ax1, from the first inner ring 601 to the second inner ring 602. Furthermore, multiple bolts 66 are screwed to the first inner ring 601 by passing through the second inner ring 602. Therefore, the first inner ring 601 and the second inner ring 602 are combined by multiple bolts 66 in a state where opposite positions in a plane orthogonal to the rotation axis Ax1 are positioned by multiple positioning pins 65.

Figure 15:
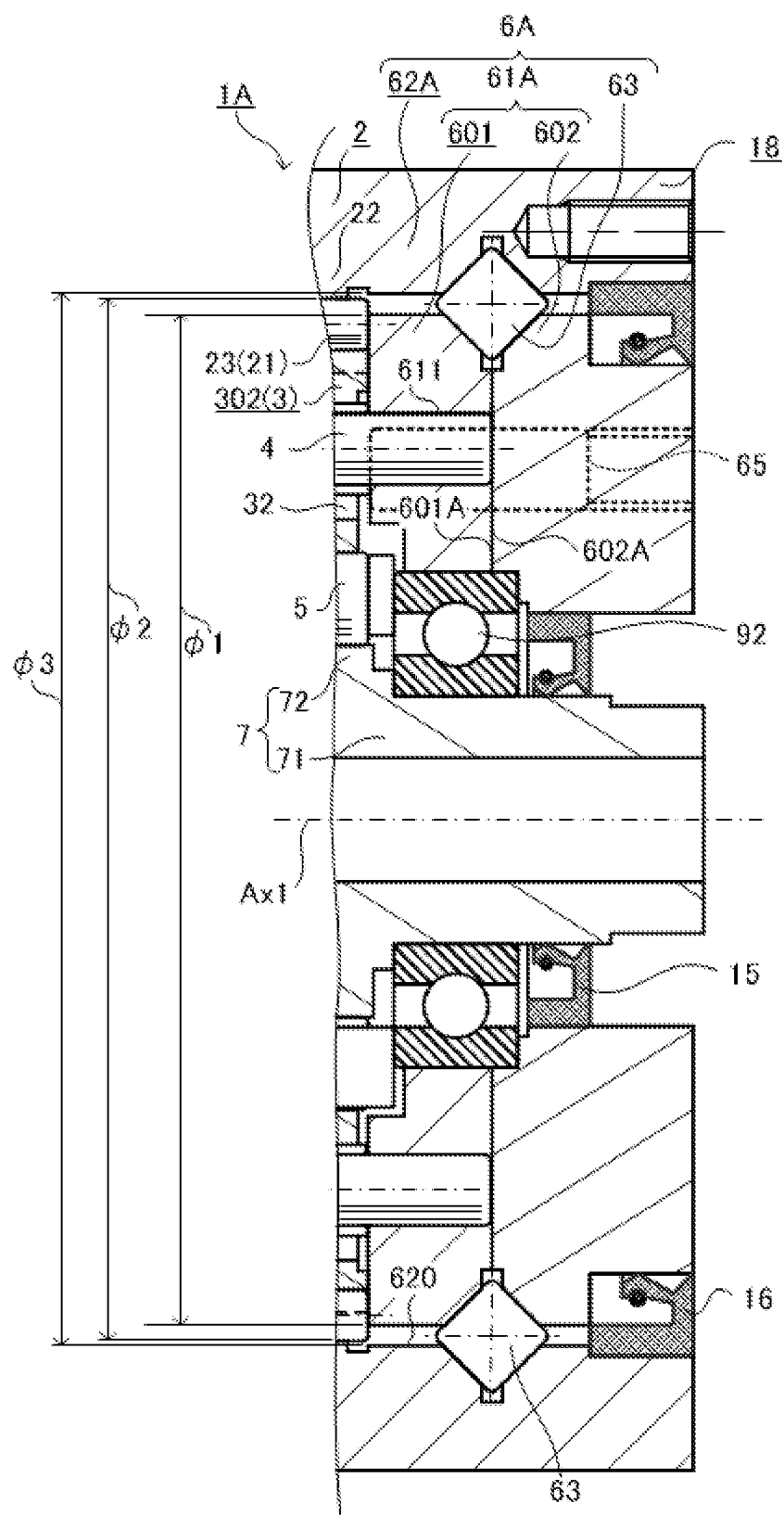
FIG. 15 is a diagrammatic cross-sectional view of major portions of the above internal-meshing planetary gear device.

Here, as shown in FIG. 15, in the bearing member 6A, multiple rolling bodies 63 are located in a division surface between the first inner ring 601 and the second inner ring 602 of the inner ring 61A. In some embodiments, the opposite surface 601A of the first inner ring 601 opposite to the second inner ring 602 is the division surface between the first inner ring 601 and the second inner ring 602, so that multiple rolling bodies 63 are located in a plane including the opposite surface 601A of the first inner ring 601 opposite to the second inner ring 602. In some embodiments, the bearing member 6A is a cross roller bearing which bears a radial load, load in a thrust direction (in the direction of the rotation axis Ax1) and a bending force (bending moment load) for the rotation axis Ax1. Therefore, each of multiple rolling bodies 63 of the bearing member 6 is composed of a cylindrical roller having an inclination of 45 degrees with respect to the plane orthogonal to the rotation axis Ax1. Such multiple rolling bodies 63 are located in the same plane of the opposite surface 601A of the first inner ring 601 opposite to the second inner ring 602.

In some embodiments, especially center of each of multiple rolling bodies 63 in the direction parallel to the rotation axis Ax1 is located in the same plane of the opposite surface 601A of the first inner ring 601 opposite to the second inner ring 602. In other words, when a plane including centers of multiple rolling bodies 63 in the direction parallel to the rotation axis Ax1 is taken as the division surface, the inner ring 61A is divided into the first inner ring 601 and the second inner ring 602. With such structure, when the bearing member 6A is assembled, multiple rolling bodies 63 arranged in the outer ring 62A are sandwiched through the first inner ring 601 and the second inner ring 602 from both sides in the direction parallel to the rotation axis Ax1, thereby simply assembling the bearing member 6A.

In some embodiments, the oil seal 15 fills a gap between the second inner ring 602 and the eccentric shaft 7 (the axis portion 71). Similarly, the oil seal 16 fills a gap between the second inner ring 602 and the outer ring 62. A space enclosed by multiple oil seals 14, 15, 16 also constitutes a lubricant holding space 17 (referring to FIG. 11), like the basic structure.

In this way, the inner ring 61A is divided into two components, i.e., the first inner ring 601 and the second inner ring 602, thereby generating a gap between the first inner ring 601 and the second inner ring 602 even though it is small. For example, by generating such gap, a lubricant is easy to circulate in the lubricant holding space 17 through the gap. Especially when the gap between the first inner ring 601 and the second inner ring 602 is small, the lubricant in the lubricant holding space 17 is expected to expand through the gap due to a capillary phenomenon for example. Therefore, compared with a situation where the inner ring 61A is not divided into two components, i.e., the first inner ring 601 and the second inner ring 602, the lubricant is easily distributed throughout the lubricant holding space 17 even for example when the gear device 1A is used for a long period of time, and thus it is difficult to generate, in the gear device 1A, bad conditions such as reduction of transmission efficiency or the like.

Furthermore, when the inner ring 61A is divided into two components, i.e., the first inner ring 601 and the second inner ring 602, the bearing member 6A may be easily assembled without greatly complicating machining of the inner ring 61A. Furthermore, size of the inner ring 61 is suppressed to be small without complicating machining of the inner ring 61A, and a relatively compact bearing member 6A may be achieved by a cross roller bearing.

However, in some embodiments, multiple inner pins 4 connect the planetary gear 3 to the inner ring 61A of the bearing member 6A, like the basic structure. Specifically, one end portion of the inner pin 4 in a length direction (an end portion at the input side of the rotation axis Ax1) is inserted into the inner pin hole 32 of the planetary gear 3 (the first planetary gear 301 and the second planetary gear 302), and the other end portion of the inner pin 4 in the length direction (an end portion at the output side of the rotation axis Ax1) is inserted into the holding hole 611 of the inner ring 61A.

Furthermore, diameter of the inner pin 4 is slightly greater than that of the holding hole 611, therefore in a state where the inner pin 4 is inserted into the holding hole 611 of the bearing member 6A, the inner pin 4 may self-rotate in the holding hole 611 although revolution of the inner pin 4 in the holding hole 611 is inhibited. That is, although the inner pin 4 is in a state of being inserted into the holding hole 611, the inner pin 4 is not pressed into the holding hole 611, and thus the inner pin 4 may self-rotate in the holding hole 611. In this way, in the gear device 1A of some embodiments, each of multiple inner pins 4 is held in the inner ring 61A in a self-rotatable state, and thus when the inner pin 4 revolves in the inner pin hole 32, the inner pin 4 itself may self-rotate.

Here, in some embodiments, what different from the basic structure is that each of multiple holding holes 611 is configured to penetrate only the first inner ring 601 of the inner ring 61A without penetrating the whole inner ring 61A. That is, the first inner ring 601 has multiple holding holes 611 through which multiple inner pins 4 pass respectively in the direction parallel to the rotation axis Ax1. Furthermore, the inner pin 4 is held in the inner ring 61A by inserting the other end portion of the inner pin 4 in the length direction (an end portion at the output side of the rotation axis Ax1) into the holding hole 611.

In some embodiments, the inner pin 4 is not inserted into the second inner ring 602, therefore the holding hole 611 is not provided in the second inner ring 602. Therefore, an end surface of each of multiple inner pins 4 is abutted against the opposite surface 602A of the second inner ring 602 opposite to the first inner ring 601. That is, an end surface of the inner pin 4 at an opposite side of the planetary gear 3 (the output side of the rotation axis Ax1) in the length direction is abutted against a surface (the opposite surface 602A) of the second inner ring 602. The end surface of the inner pin 4 in the length direction may be gently in contact with the opposite surface 602A of the second inner ring 602 without hindering self-rotation of the inner pin 4, or may be separated from the opposite surface 602A of the second inner ring 602. Therefore, movement of the inner pin 4 toward the output side of the rotation axis Ax1 is limited by the second inner ring 602, and the lubricant in the lubricant holding space 17 may be suppressed from leaking through the holding hole 611.

Furthermore, diameter of the inner pin 4 is slightly greater than that of the holding hole 611, therefore a gap is formed between an inner peripheral surface of each of multiple holding holes 611 of the first inner ring 601 and an outer peripheral surface of each of multiple inner pins 4. That is, the holding hole 611 is a hole for play-embedding the inner pin 4, and the inner pin 4 is inserted into the holding hole 611 in a state of ensuring a margin of space (gap) between the inner pin and the inner peripheral surface of the holding hole 611. However, it is feasible as long as the inner pin 4 may self-rotate in the holding hole 611, therefore the gap between the inner peripheral surface of the holding hole 611 and the inner pin 4 is smaller than the gap between the inner peripheral surface 321 of the inner pin hole 32 and the inner pin 4. Furthermore, it is unnecessary to ensure a gap between the inner peripheral surface of the holding hole 611 and the inner pin 4 to be used as a cavity, for example, fluid such as a liquid or the like may also be filled into the gap. Specifically, a lubricant is filled into the gap between the inner peripheral surface of the holding hole 611 and the inner pin 4. Therefore, self-rotation of the inner pin 4 in the holding hole 611 becomes smooth due to the lubricant.

Figure 16:
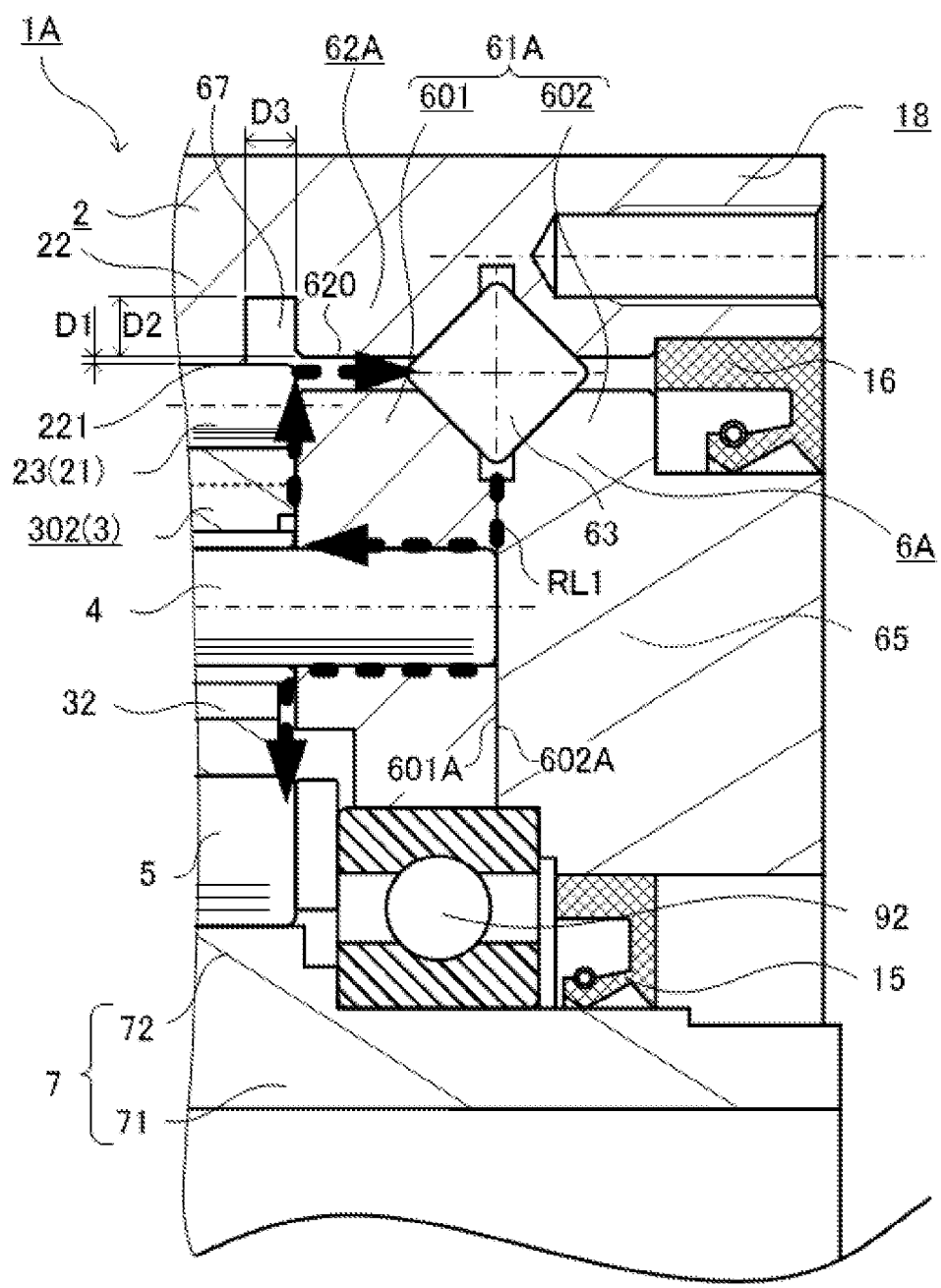
FIG. 16 is a diagrammatic cross-sectional view of major portions of the above internal-meshing planetary gear device, schematically showing a view of a lubricant path.

Furthermore, as shown in FIG. 16, the gear device 1A of some embodiments further includes a lubricant circulation path RL1. In FIG. 16, flow of a lubricant passing through the circulation path RL1 is schematically represented by dotted arrows. The circulation path RL1 is a path (loop path) for the lubricant to circulate by passing through at least a gap between the first inner ring 601 and the second inner ring 602, a space for receiving each of multiple rolling bodies 603 respectively, and each of multiple holding holes 611. That is, the circulation path RL1 includes the gap between the first inner ring 601 and the second inner ring 602, the space for receiving the rolling body 603, and the holding hole 611, and is formed as an annular shape as shown in FIG. 16. Therefore, for example a lubricant injected into the space for receiving the rolling body 63 passes through the gap between the first inner ring 601 and the second inner ring 602, and the holding hole 611 (the gap between the inner peripheral surface of the holding hole and the inner pin 4) along the circulation path RL1, and easily circulates to the space for receiving the rolling body 63 again. However, movement orientation of the lubricant passing through the circulation path RL1 is not limited to an orientation shown by arrows in FIG. 16, or may be an orientation opposite thereto.

Furthermore, the gear device 1A of some embodiments satisfies the following conditions with respect to surface hardness of each component.

That is, each of multiple inner pins 4 uses the same degree of surface hardness as the first inner ring 601. Specifically, a difference between surface hardness of each of multiple inner pins 4 and surface hardness of the first inner ring 601 is less than HRC3. That is, surface hardness of the inner pin 4 is set to be in a range based on surface hardness of the first inner ring 601±3 in terms of Rockwell hardness (HRC). Here the difference between surface hardness of the inner pin 4 and surface hardness of the first inner ring 601 is preferably less than HRC2, and more preferably less than HRC1. "surface hardness of the first inner ring 601" as stated here refers to at least hardness of the inner peripheral surface of the holding hole 611 in the first inner ring 601. The inner pin 4 is held in the holding hole 611 of the first inner ring 601 in a self-rotatable state, therefore when the inner pin 4 has the same degree of surface hardness as the first inner ring 601 (the difference there-between is less than HRC3) as in some embodiments, it is expected to have an effect of suppressing wear of the inner pin 4 and the first inner ring 601. As a result, even though the inner pin 4 self-rotates in the holding hole 611, it is difficult to generate wear powder or the like, so that smooth rotation of the inner pin 4 is easily maintained for a long period of time.

Furthermore, surface hardness of each of multiple inner pins 4 is about HRC60. More strictly, surface hardness of each of multiple inner pins 4 is in a range of HRC60±3. In some embodiments, the inner pin 4 has the same degree of surface hardness as the first inner ring 601 (the difference there-between is less than HRC3), therefore surface hardness of the first inner ring 601 is in a range of HRC60±6. Here surface hardness of the inner pin 4 is preferably in a range of HRC60±2, more preferably in a range of HRC60±1. As a result, even though the inner pin 4 self-rotates in the holding hole 611, it is difficult to generate wear powder or the like, so that smooth rotation of the inner pin 4 is easily maintained for a long period of time.

Furthermore, in some embodiments, the second inner ring 602 also uses the same degree of surface hardness as the first inner ring 601 (and the inner pin 4). Specifically, a difference between surface hardness of the second inner ring 602 and surface hardness of the first inner ring 601 is less than HRC3. As a means of increasing hardness (hardening) of a metal part, there are for example alloying, or heat treatment, or the like.

Study of Outer Ring

Next, study of the outer ring 62A of the bearing member 6A of the gear device 1A of some embodiments is described in detail with reference to FIG. 11 to FIG. 16.

In some embodiments, as described above, the outer ring 62A of the bearing member 6A is seamlessly and continuously arranged with the gear body 22 in the direction parallel to the rotation axis Ax1 (the tooth direction of the internal tooth 21). "seamless" stated in the embodiments of the disclosure refers to a structure where multiple components (parts) are connected without seams there-between, and refer to a state where multiple components (parts) cannot be separated without breaking them. That is, in some embodiments, the outer ring 62A is seamlessly and continuously integrated with the gear body 22, rather than the outer ring 62A and the gear body 22 which are prepared as different components, are combined for example by fasteners (bolts or the like), or adhesives, or the like.

Specifically, for example, the outer ring 62A and the gear body 22 are integrally formed by machining such as cutting, machining, or the like of a base material made of a metal block, to reflect seamless and continuous outer ring 62A and gear body 22. Or, in case of casting or the like, the outer ring 62A and the gear body 22 are integrally formed by a base material made of a melted metal flowing into a molding mold, to reflect seamless and continuous outer ring 62A and gear body 22. In this way, in the gear device 1A of some embodiments, the outer ring 62A and the gear body 22 are integrally formed for example by machining a base material, to achieve the outer ring 62A arranged seamlessly and continuously with the gear body 22 in the direction parallel to the rotation axis Ax1. In other words, a method for manufacturing the gear device 1A has a process of integrally forming the outer ring 62A and the gear body 22 by machining a base material.

In this way, in the gear device 1A of some embodiments, by seamlessly and continuously arranging the outer ring 62A with the gear body 22 in the direction parallel to the rotation axis Ax1, it is easy to improve centering precision of the internally toothed gear 2 and the bearing member 6A. That is, center of the gear body 22 of the internally toothed gear 2 and center of the outer ring 62A of the bearing member 6A are easily maintained on the rotation axis Ax1 with high precision. As a result, in the gear device 1A, there are advantages of being difficult to generate vibration due to poor centering, being difficult to generate bad conditions such as reduction of transmission efficiency, or the like.

Each of the gear body 22 and the outer ring 62A has a circular ring shape which is a perfect circle when it is observed in a top view. In some embodiments, especially the gear body 22 and the outer ring 62A are seamlessly integrated with the body portion 18 of the housing 10. In other words, a part of the body portion 18 of the housing 10 functions as the gear body 22 and the outer ring 62A. Therefore, as shown in FIG. 15, outer diameter of the gear body 22 is the same as that of the outer ring 62A. On the other hand, inner diameter of the gear body 22 is different from that of the outer ring 62A.

Specifically, as shown in FIG. 14, multiple grooves are formed in the whole area along a circumferential direction of the inner peripheral surface 221 of the gear body 22. Multiple grooves are multiple pin holding grooves 223 used as holding structures of multiple pins 23 respectively. In other words, the holding structures of multiple pins 23 include multiple pin holding grooves 223 formed in the inner peripheral surface 221 of the gear body 22. Multiple pin holding grooves 223 are all in the same shape, and are arranged at equal intervals. Each of multiple pin holding grooves 223 is parallel to the rotation axis Ax1 and is formed throughout the entire width of the gear body 22. However, in some embodiments, the gear body 22 is a part of the body portion 18 as described above, and thus multiple pin holding grooves 223 are formed only in positions of the body portion 18 corresponding to the gear body 22 (referring to FIG. 11). Multiple pins 23 are combined in the gear body 22 (the body portion 18) by embedding in multiple pin holding grooves 223. Each of multiple pins 23 is held in the pin holding groove 223 in a self-rotatable state, and movement thereof in the circumferential direction of the gear body 22 is limited by the pin holding groove 223.

By forming multiple pin holding grooves 223 as such, inner diameter of the gear body 22 is maximized at bottom of the pin holding groove 223, and is minimized outside the pin holding groove 223. In some embodiments, diameter $\varphi 2$ of a virtual circle VC1 passing through bottom of multiple pin holding grooves 223, i.e., a maximum value of inner diameter of the gear body 22, is defined as the inner diameter of the gear body 22. Furthermore, as shown in FIG. 15, inner diameter ($\varphi 2$) of the gear body 22 is different from inner diameter $\varphi 3$ of the outer ring 62A of the bearing member 6A. In summary, inner diameter $\varphi 3$ of the outer ring 62A is different from diameter $\varphi 2$ of a virtual circle VC1 passing through bottom of multiple pin holding grooves 223 for holding multiple pins 23 in the inner peripheral surface 221 of the gear body 22. Therefore, even though the gear body 22 is seamlessly continuous with the outer ring 62A, functions of the gear body 22 and the outer ring 62A may be easily and clearly distinguished according to a difference between inner diameters thereof.

Furthermore, in some embodiments, as shown in FIG. 15, inner diameter $\varphi 3$ of the outer ring 62A is greater than diameter $\varphi 2$ of the virtual circle VC1 ($\varphi 3 > \varphi 2$) That is, diameter $\varphi 2$ of the virtual circle VC1 used as (maximum value of) inner diameter of the gear body 22 is smaller than inner diameter $\varphi 3$ of the outer ring 62A. Therefore, as shown in FIG. 16, at the inner peripheral surface of the body portion 18, a height difference represented by height D1 is generated between the outer ring 62A and bottom of multiple pin holding grooves 223 in the inner peripheral surface 221 of the gear body 22. For example, height D1 of the height difference is preferably greater than one twelfth of diameter $\varphi 10$ (referring to FIG. 14) of the pin 23 ($\varphi 10 * 1/12$) and smaller than two tenth times of diameter $\varphi 10$ ($\varphi 10 * 0.2$). As an example, in case that diameter $\varphi 10$ of the pin 23 is about 2.5 mm, height D1 of the height difference is preferably greater than 0.2 mm and smaller than 0.5 mm. Interference between the pin 23 held by the pin holding groove 223 and the inner peripheral surface 620 of the outer ring 62A may be avoided by the height difference.

Furthermore, in some embodiments, outer diameter $\varphi 1$ of the inner ring 61A (the first inner ring 601 and the second inner ring 602) is smaller than diameter $\varphi 2$ of the virtual circle VC1. That is, diameter $\varphi 2$ of the virtual circle VC1 is greater than outer diameter $\varphi 1$ of the inner ring 61A, and inner diameter $\varphi 3$ of the outer ring 62A is greater than diameter $\varphi 2$ of the virtual circle VC1. In other words, diameter $\varphi 2$ of the virtual circle VC1 has a value between outer diameter $\varphi 1$ of the inner ring 61A and inner diameter $\varphi 3$ of the outer ring 62A ($\varphi 1 < \varphi 2 < \varphi 3$).

Furthermore, as shown in FIG. 16, a holding recess 67 is arranged between the inner peripheral surface 620 of the outer ring 62A and the inner peripheral surface 221 of the gear body 22. The holding recess 67 is composed of a groove arranged throughout the entire circumference along a circumferential direction of the outer ring 62A. The holding recess 67 is formed with a size and shape capable of holding the lubricant for example by surface tension. That is, the holding recess 67 functions as an "oil accumulation place" for accumulating the lubricant (lubrication oil). In some embodiments, the gear body 22 and the outer ring 62A are configured such that the gear body 22 is at the input side of the rotation axis Ax1 (left side of FIG. 16), and the outer ring 62A is at the output side of the rotation axis Ax1 (right side of FIG. 16). Therefore, the inner peripheral surface 221 of the gear body 22, the holding recess 67, and the inner peripheral surface 620 of the outer ring 62A are arranged in an order of the inner peripheral surface 221 of the gear body 22, the holding recess 67, and the inner peripheral surface 620 of the outer ring 62A from the input side of the rotation axis Ax1.

In some embodiments, as an example, as shown in FIG. 16, a cross-sectional shape of the holding recess 67 orthogonal to the circumferential direction of the outer ring 62A is a rectangular shape. Both depth D2 of the holding recess 67 (from the inner peripheral surface 620 of the outer ring 62A) and width D3 of the holding recess 67 are greater than height D1 of the height difference. Each of depth D2 and width D3 of the holding recess 67 is preferably greater than one tenth of diameter $\varphi 10$ of the pin 23 ($\varphi 10 * 1/10$) and smaller than two times of diameter $\varphi 10$ ($\varphi 10 * 2$). As an example, in case that diameter $\varphi 10$ of the pin 23 is about 2.5 mm, each of depth D2 and width D3 of the holding recess 67 is preferably greater than 0.25 mm and smaller than 5.0 mm. In the example of FIG. 16, depth D2 of the holding recess 67 is greater than width D3 of the holding recess 67, but is not limited to the example, and depth D2 of the holding recess 67 may also be smaller than width D3. Furthermore, the cross-sectional shape of the holding recess 67 is not limited to a rectangular shape, or may be a semi-circular shape, a triangular shape, or another polygonal shape, or the like.

Here the gear device 1A of some embodiments further includes a lubricant path connected from the holding recess 67 to each of multiple inner pins 4, each of multiple pins 23, and at least one of multiple rolling bodies 63. That is, the holding recess 67 used as the "oil accumulation place" is connected to each of multiple inner pins 4, each of multiple pins 23, and at least one of multiple rolling bodies 63 by the lubricant path. Therefore, each of multiple inner pins 4, each of multiple pins 23, and at least one of multiple rolling bodies 63 are supplied by the lubricant held in the holding recess 67, so that action of at least one of the inner pin 4, the pin 23, or the rolling body 63 is smooth. In some embodiments, the holding recess 67 is located on the lubricant circulation path RL1, therefore a part of the circulation path RL1 is used as a path of "lubricant", and the lubricant in the holding recess 67 is supplied to at least one of the inner pin 4, the pin 23, or the rolling body 63. Especially in some embodiments, as shown in FIG. 16, the inner pin 4, the pin 23 and the rolling body 63 are all located on the circulation path RL1, therefore the lubricant held in the holding recess 67 may be supplied to all of the inner pin 4, the pin 23 and the rolling body 63.

Especially in some embodiments, the rolling body 63 is located on the circulation path RL1. Therefore the bearing member 6 operates and the rolling body 63 rotates, thereby the rolling body 63 functioning as a pump, so that the lubricant in the lubricant holding space 17 may actively circulate via the circulation path RL1. In particular, the division surface between the first inner ring 601 and the second inner ring 602 is at the position facing (opposite to) the rolling body 63, therefore the rolling body 63 effectively functions as a pump when the rolling body 63 rotates. As a result, the lubricant in the lubricant holding space 17 is easy to circulate, and the lubricant is easily distributed throughout the lubricant holding space 17 even when the gear device 1A is used for a long period of time, and thus it is difficult to generate, in the gear device 1A, bad conditions such as reduction of transmission efficiency or the like.

Application Example

As shown in FIG. 17, the gear device 1A of some embodiments constitutes the wheel device W1 together with the wheel body 102. In other words, the wheel device W1 of some embodiments includes the gear device 1A and the wheel body 102. The wheel body 102 rolls on a traveling surface by a rotational output when multiple inner pins 4 relatively rotate relative to the gear body 22. In some embodiments, the body portion 18 used as "rotation member" and the cover 19 in the housing 10 constituting outline of the gear device 1 constitute the wheel body 102. That is, in the wheel device W1 of some embodiments, the gear device 1A acts with rotation of the eccentric shaft 7 as input rotation, and with rotation of the rotation member (the body portion 18 or the like) fixed with the gear body 22 as output rotation, thereby rotating the wheel body 102 to roll on the traveling surface. Here a contact surface of the wheel body 102 in contact with the traveling surface, i.e., an outer peripheral surface of the body portion 18 forming a ground surface, is for example equipped with a rubber tire 103.

The wheel device W1 configured as such is used in a state where the inner ring 61A is fixed to a hub member 104 used as a fixing member. Therefore the rotation member (the wheel body 102) relatively rotates relative to the fixing member (the hub member 104) with rotation of the eccentric shaft 7, thereby rotating the wheel body 102. In some embodiments, as an example, the wheel device W1 fixes the inner ring 61A (the first inner ring 601 and the second inner ring 602) to the hub member 104 by multiple bolts 66. At this time, the second inner ring 602 of the inner ring 61A is preferably fixed to the hub member 104, or the like.

Here, in case that the gear device 1A is used in the wheel device W1, the gear device 1A is used in a posture where the rotation axis Ax1 is along a horizontal plane basically. Therefore the lubricant circulating through the circulation path RL1 (referring to FIG. 16) is also easily supplied to periphery of the eccentric shaft 7 such as (the rolling body 53 of) the eccentric body bearing 5, the second bearing 92, or the like. That is, a part of the lubricant circulating through the circulation path RL1 is easily supplied to the eccentric body bearing 5, the second bearing 92, or the like by passing through a gap between the planetary gear 3 (the second planetary gear 302) and the first inner ring 601 under action of gravity. Therefore, even though the lubricant splashes to the peripheral side due to a centrifugal force when the eccentric shaft 7 rotates at a high speed, the lubricant may be supplied to periphery of the eccentric shaft 7 through the circulation path RL1, thereby easily maintaining smooth rotation of the eccentric shaft 7.

Furthermore, the wheel device W1 using the gear device 1A is suitable for a vehicle such as an automated guided vehicle (AGV) or the like. That is, the wheel device W1 is assembled to the hub member 104 arranged in a vehicle body of the vehicle, and the wheel body 102 rotates to roll on the traveling surface, thereby the vehicle traveling on a flat traveling surface composed of a bottom surface or the like. As an example, multiple (e.g., 4) gear devices 1A are assembled on the vehicle body, and eccentric shafts 7 of the gear devices 1A are driven by different driving sources respectively, thereby using a "hub motor" layout. Therefore the driving source rotates the eccentric shaft 7 of the wheel device W1 with the rotation axis Ax1 as the center, to swing the planetary gear 3. Therefore rotation (input rotation) generated by the driving source is decelerated at a relatively high reduction ratio in the gear device 1A, thereby rotating the wheel body 102 at a relatively high torque.

However, in some embodiments, an outer peripheral surface 680 of the outer ring 62A constitutes a pressed surface which bears a greater stress compared with an outer peripheral surface 224 of the gear body 22. In other words, the greater stress compared with the outer peripheral surface 224 of the gear body 22 acts on the outer peripheral surface 680 (the pressed surface) of the outer ring 62A from outside. Especially in case that the gear device 1A is used in the wheel device W1 or the like, the outer peripheral surface 680 of the outer ring 62A is preferably configured to be subject to a greater stress compared with the outer peripheral surface 224 of the gear body 22. There is a relatively large gap between the gear body 22 and the planetary gear 3, so that the planetary gear 3 may revolve (swing) on an inner side of the gear body 22. In comparison, it is feasible as long as the inner ring 61A may self-rotate on the inner side of the outer ring 62A, and thus a small gap exists between the outer ring 62A and the inner ring 61A. That is, compared with the gear body 22, the outer ring 62A is a solid structure of which an inner side is close to be blocked, so that it has high rigidity to an external force acting in a radial direction. Therefore, by providing the outer peripheral surface 680 of the outer ring 62A as the pressed surface, the high-rigidity outer ring 62A side may be used to bear an external stress, thereby improving stress resistance of the whole gear device 1A.

More specifically, a stress from an externally mounted body embedded to periphery of the outer ring 62A acts on the pressed surface (the outer peripheral surface 680 of the outer ring 62A). Here the tire 103 is an example of the externally mounted body embedded to periphery of the outer ring 62A. That is, when the tire 103 is assembled to be embedded to periphery of the body portion 18, a stress (embedding pressure) acting from the tire 103 onto the body portion 18 at outer ring 62A is greater than that at the gear body 22. Specifically, as shown in FIG. 17, for example a spacer 68 is arranged at a position, corresponding to the outer ring 62A, of the outer peripheral surface of the body portion 18, so that outer diameter of the body portion 18 at the outer ring 62A is greater than that at the gear body 22. As a result, when the body portion 18 is assembled with the tire 103 used as the externally mounted body, stress from the tire 103 at the outer ring 62A side is greater than that at the gear body 22 side. However, the disclosure is not limited to a structure of providing the spacer 68, for example, the same effect may also be achieved by reducing outer diameter of the gear body 22, or allowing inner diameter of the externally mounted body (the tire 103 or the like) at the outer ring 62A side to be smaller than that at the gear body 22 side.

Or, the gear device 1A may also be configured such that even when stress from the externally mounted body at the outer peripheral surface 680 of the outer ring 62A is the same as that at the outer peripheral surface 224 of the gear body 22, a reaction force from the ground surface such as the traveling surface or the like increases at the outer peripheral surface 680 side of the outer ring 62A used as the pressed surface. Specifically, for example by configuration, in case that the gear device 1A is used as the wheel device W1, the reaction force from the ground surface such as the traveling surface or the like increases at the outer ring 62A side compared with the gear body 22 side, by adjustment of a camber angle. In this case, a ground pressure from the ground surface acts on the pressed surface (the outer peripheral surface 680 of the outer ring 62A).

Furthermore, the gear device 1A of the embodiment is not limited to the wheel device W1, for example, the gear device 1A may also be applicable to a robot such as a horizontal multi joint robot (SCARA type robot) or the like, as described in the basic structure.

Deformation Example

The first embodiment is merely one of various implementations of the embodiments of the disclosure. As long as the first embodiment may achieve the purpose of the embodiments of the disclosure, various changes may be made thereto according to design or the like. Furthermore, drawings referred by the embodiments of the disclosure are schematic diagrams, and respective ratios of sizes and thicknesses of structural elements in the drawings do not necessarily reflect actual size ratios. Deformation examples of the first embodiment are listed below. The deformation examples described below may be applicable with proper combination.

Figure 18A:
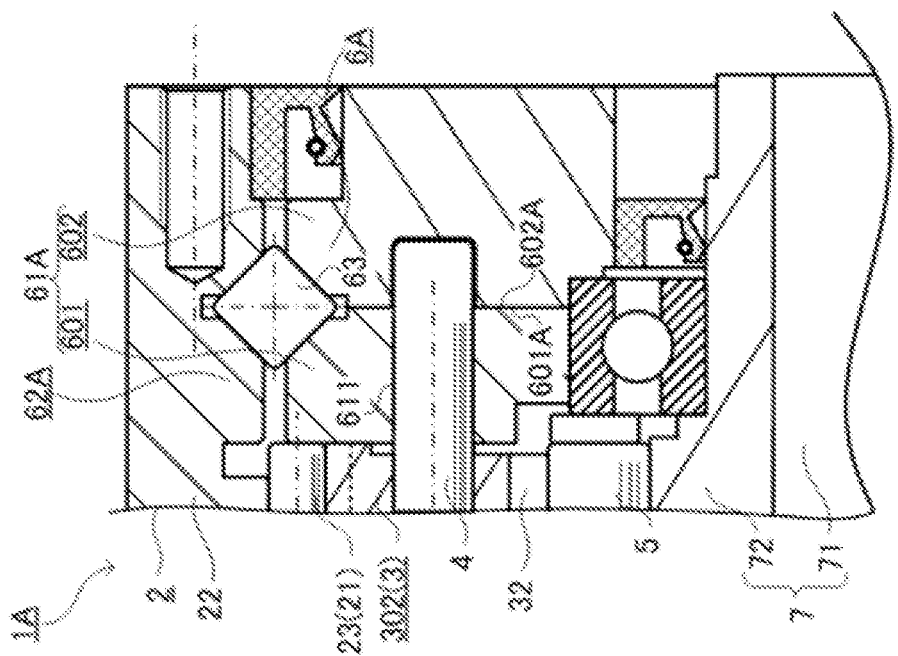
FIG. 18A is a diagrammatic cross-sectional view of major portions of an internal-meshing planetary gear device according to a deformation example of some embodiments.
Figure 18B:
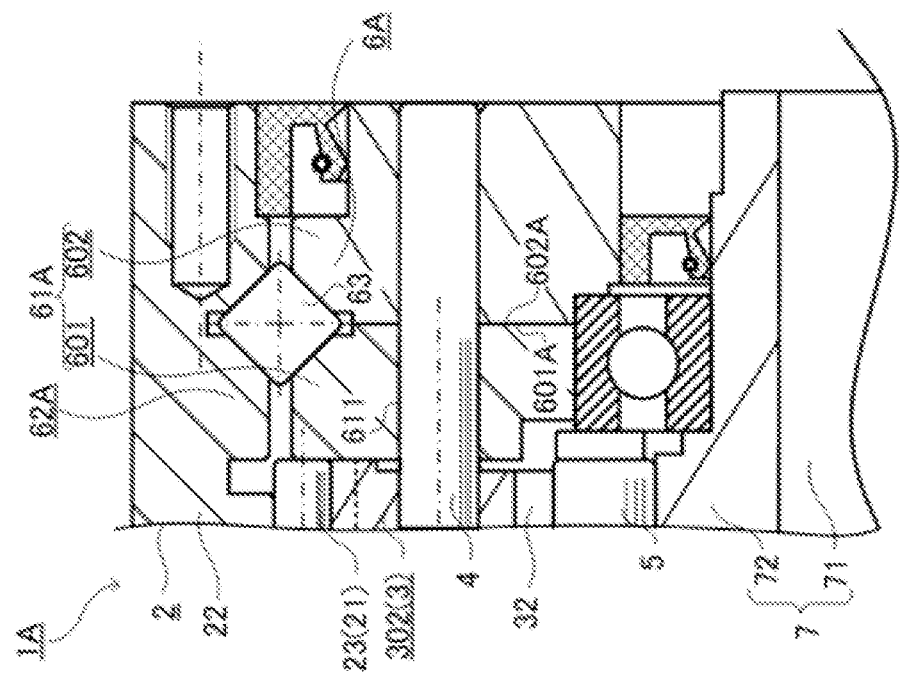
FIG. 18B is a diagrammatic cross-sectional view of major portions of an internal-meshing planetary gear device according to a deformation example of the some embodiments.

It is feasible as long as the inner pin 4 penetrates the first inner ring 601 of the first inner ring 601 and the second inner ring 602 constituting the inner ring 61A. Or, as shown in FIG. 18A and FIG. 18B, the inner pin 4 is inserted into a part or all of the second inner ring 602. In the example of FIG. 18A, the holding hole 611 extends to a part of the second inner ring 602 in the direction parallel to the rotation axis Ax1, and an end portion of the inner pin 4 penetrating the first inner ring 601 is inserted into middle of the second inner ring 602. In the example of FIG. 18B, the holding hole 611 is formed to penetrate both the first inner ring 601 and the second inner ring 602 in the direction parallel to the rotation axis Ax1, and the inner pin 4 penetrating the first inner ring 601 also penetrates the second inner ring 602.

In some embodiments, a type of gear device 1A with two planetary gears 3 is exemplified, however, the gear device 1A may include three or more planetary gears 3. For example, in case that the gear device 1A includes three planetary gears 3, the three planetary gears 3 are preferably arranged at a phase difference of 120 degrees about the rotation axis Ax1. Furthermore, the gear device 1A may also include only one planetary gear 3.

Furthermore, at least a part of each of multiple inner pins 4 is arranged at the same position as the bearing member 6A in an axial direction of the bearing member 6A, which is not a structure necessarily provided in the gear device 1A. That is, it is feasible as long as the gear device 1A includes the bearing member 6A, the internally toothed gear 2, the planetary gear 3, and multiple inner pins 4. The bearing member 6A has an outer ring 62A, and an inner ring 61A arranged on an inner side of the outer ring 62A. The inner ring 61A is supported to be rotatable relative to the outer ring 62A. The gear body 22 of the internally toothed gear 2 is fixed to the outer ring 62A. Each of multiple inner pins 4 is held in the inner ring 61A in a self-rotatable state. Here each of multiple inner pins 4 may be arranged in parallel with (opposite to) the bearing member 6A in the axial direction of the bearing member 6A.

Furthermore, the number of inner pins 4, the number of pins 23 (the tooth number of internal teeth 21), the tooth number of external teeth 31, or the like described in the first embodiment are merely one example, and may be appropriately changed.

Furthermore, the bearing member 6A is not limited to a cross roller bearing, and may be a deep groove ball bearing, or an angular contact ball bearing, or the like. However, the bearing member 6A is preferably for example a four-point contact ball bearing or the like, so that a radial load, load in a thrust direction (in the direction of the rotation axis Ax1) and a bending force (bending moment load) for the rotation axis Ax1 may be all born.

Furthermore, the eccentric body bearing 5 is not limited to a roller bearing, for example, it may be a deep groove ball bearing, or an angular contact ball bearing, or the like.

Furthermore, materials of structural elements of the gear device 1A are not limited to metal, for example, they may be resins such as an engineering plastic or the like.

Furthermore, it is feasible as long as the gear device 1A is able to take relative rotation between the inner ring 61A and the outer ring 62A of the bearing member 6A out as output, and is not limited to a structure of taking a rotation force of the outer ring 62A out as output. For example, a rotation force of the inner ring 61A relatively rotating relative to the outer ring 62A may also be taken out as output.

Furthermore, the lubricant is not limited to a liquid substance such as lubrication oil (oil liquid) or the like, and may be a gel-like substance such as a lubrication grease or the like.

Furthermore, the gear device 1A may include an inner roller. That is, in the gear device 1A, it is unnecessary to make each of multiple inner pins 4 in direct contact with the inner peripheral surface 321 of the inner pin hole 32, and it may also be that an inner roller is interposed between each of multiple inner pins 4 and the inner pin hole 32. In this case, the inner roller is assembled to the inner pin 4 and may rotate with the inner pin 4 as a shaft.

Furthermore, it is feasible as long as each of multiple inner pins 4 is held in the inner ring 61A in a self-rotatable state, and it is unnecessary to provide, in the gear device 1A, a case where each of multiple inner pins 4 is directly held by the inner ring 61A. For example, each of multiple inner pins 4 may be indirectly held by the inner ring 61A by inserting into a holding hole formed in an output shaft, or a bracket, or the like integrated with the inner ring 61A.

Furthermore, it is unnecessary to provide, in the gear device 1A, positioning of multiple inner pins 4 relative to the support body 8 in both circumferential and radial directions performed by the support body 8. For example, the support body 8 may have a slit-shaped support hole 82 extending in a radial direction (radially), and only performs positioning of multiple inner pins 4 relative to the support body 8 in the circumferential direction. On the contrary, the support body 8 may also only perform positioning of multiple inner pins 4 relative to the support body 8 in the radial direction.

Furthermore, it is feasible as long as the gear device 1A uses at least one of study of the inner ring 61A of the bearing member 6A or study of the outer ring 62A, and it is unnecessary to use the two study. That is, the gear device 1A may only take any one of a case where the inner ring 61A has the first inner ring 601 and the second inner ring 602

(corresponding to study of the inner ring 61A) or a case where the outer ring 62A is seamlessly and continuously arranged with the gear body 22 (corresponding to study of the outer ring 62A).

Furthermore, since it is feasible as long as the gear device 1A uses at least one of study of the inner ring 61A or study of the outer ring 62A, other structures of the gear device may be appropriately omitted or changed from the basic structure. For example, in the gear device 1A, the inner pin 4 may also be kept in a state where it is pressed into the inner ring 61A (or a bracket integrated with the inner ring 61A) like the first related art, and in this case, each of multiple inner pins 4 is kept in a state where it cannot self-rotate relative to the inner ring 61A. Furthermore, each of multiple inner pins 4 may be arranged at the same position as the bearing member 6A in the axial direction of the bearing member 6A. Or, in the gear device 1A, multiple inner pins 4 may be held only by the inner ring 61A (or a bracket integrated with the inner ring 61A) like the second related art. In this case, the support 8 may be omitted. Furthermore, even in case that the support body 8 supporting (constraining) multiple inner pins 4 is provided, it is unnecessary to provide a case where the support body 8 makes the outer peripheral surface 81 thereof in contact with multiple pins 23 to achieve position limitation, and the outer peripheral surface 81 of the support body 8 may be away from multiple pins 23.

Furthermore, with respect to study of the inner ring 61A, it is also feasible as long as the inner ring 61A of the gear device 1A has the first inner ring 601 and the second inner ring 602, for example, the inner ring 61A may be divided into three or more components. That is, as an example, the inner ring 61A may have a third inner ring besides the first inner ring 601 and the second inner ring 602, so that it is divided into three components.

Furthermore, it is feasible as long as multiple holes into which multiple positioning pins 65 are pressed are formed from the first inner ring 601 to the second inner ring 602, it is unnecessary for the holes to penetrate the first inner ring 601 in the direction parallel to the rotation axis Ax1. For example, the positioning pin 65 may be pressed into a hole formed from the opposite surface 602A side of the second inner ring 602 opposite to the first inner ring 601 to the middle of thickness of the second inner ring 602. In this case, it may prevent the lubricant from leaking through the hole into which the positioning pin 65 is pressed.

Furthermore, with respect to study of the outer ring 62A, the outer ring 62A of the bearing member 6A may not be completely seamless with the gear body 22 in the direction parallel to the rotation axis Ax1. That is, it is feasible as long as the method for manufacturing the gear device 1A has a process of integrally forming the outer ring 62A and the gear body 22 by machining a base material. Specifically, for example, the outer ring 62A and the gear body 22 may be integrally formed by machining a base material which is formed by connecting (integrating) two metal blocks through press-connection, or bonding, or the like. In this case, a seam is generated at a connection position of the two metal blocks, therefore although it is not completely seamless, it may be expected to have the same effect as seamless and continuous outer ring 62A and gear body 22.

Figure 19A:
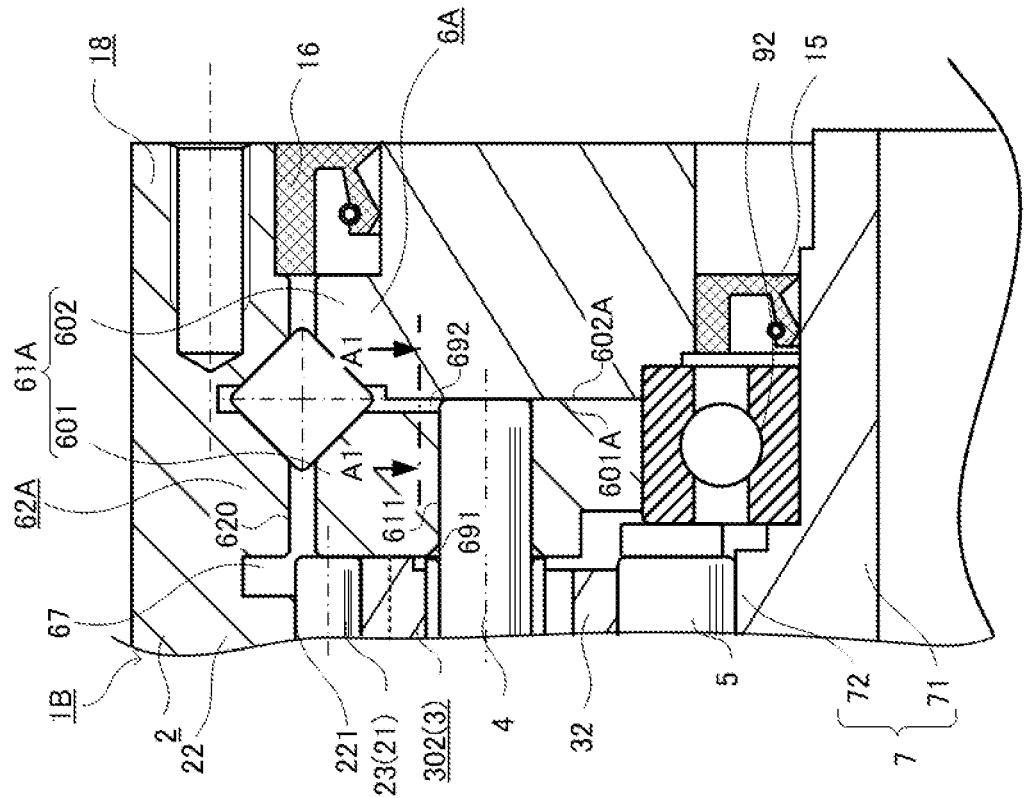
FIG. 19A is a diagrammatic cross-sectional view of major portions of an internal-meshing planetary gear device according to some embodiments.
Figure 19B:
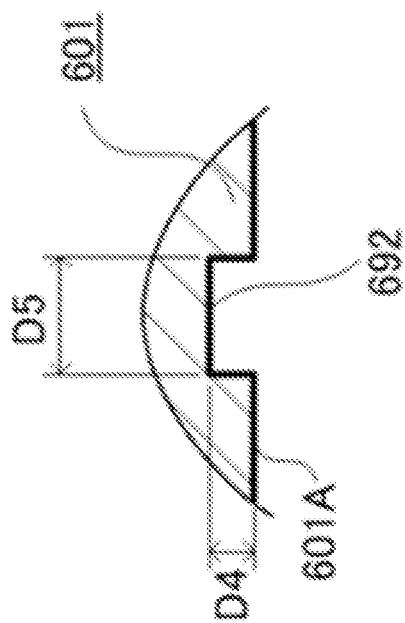
FIG. 19B is a cross-sectional view of a line A1-A1 of FIG. 19A, showing major portions of the above internal-meshing planetary gear device.

As shown in FIG. 19A and FIG. 19B, shapes of detail portions of the inner ring 61A of the bearing member 6A of the internal-meshing planetary gear device 1B (hereinafter, referred to as "gear device 1B" for abbreviation) of the embodiment are different from those of the gear device 1A of some embodiments. FIG. 19B is a view showing major portions of the first inner ring 601 only in a cross-section of a line A1-A1 of FIG. 19A. Hereinafter, the same structure as that described in the first embodiment is marked with the same reference numeral, and descriptions thereof are omitted appropriately.

In the gear device 1B of some embodiments, a diameter expansion portion 691 expanding an opened area of each of multiple holding holes 611 is formed in a surface at a side of the first inner ring 601 opposite to the second inner ring 602. Specifically, as shown in FIG. 19A, the diameter expansion portion 691 is composed of a chamfered portion, formed in an opened edge of the holding hole 611, of a surface of the first inner ring 601 at the input side (left side of FIG. 19A) of the rotation axis Ax1. Here the diameter expansion portion 691 is formed in a tapered shape (C-surface shape), so that the farther the opened area of the holding hole 611 away from the second inner ring 602, the larger the opened area of the holding hole 611. In some embodiments, such diameter expansion portion 691 is formed corresponding to all of the holding holes 611 respectively. The diameter expansion portion 691 is not limited to a tapered shape (C-surface shape), for example, it may also be a curved R-shaped surface (rounded corner), or a stepped countersink shape, or the like.

By forming such diameter expansion portion 691, at least an opened surface at a side of each of multiple holding holes 611 opposite to the second inner ring 602, has a shape of an expanded gap between it and the inner pin 4. As a result, a gap generated between the inner peripheral surface of the holding hole 611 and the inner pin 4 due to the diameter expansion portion 691 functions as "oil accumulation place" for pre-accumulation of the lubricant (lubrication oil). The diameter expansion portion 691 is continuous with the holding hole 611, so that the lubricant accumulated in the diameter expansion portion 691 is introduced into the gap between the inner peripheral surface of the holding hole 611 and the inner pin 4 due to a capillary phenomenon for example, and achieves a function of allowing smooth rotation (self-rotation) of the inner pin 4.

Figure 20:
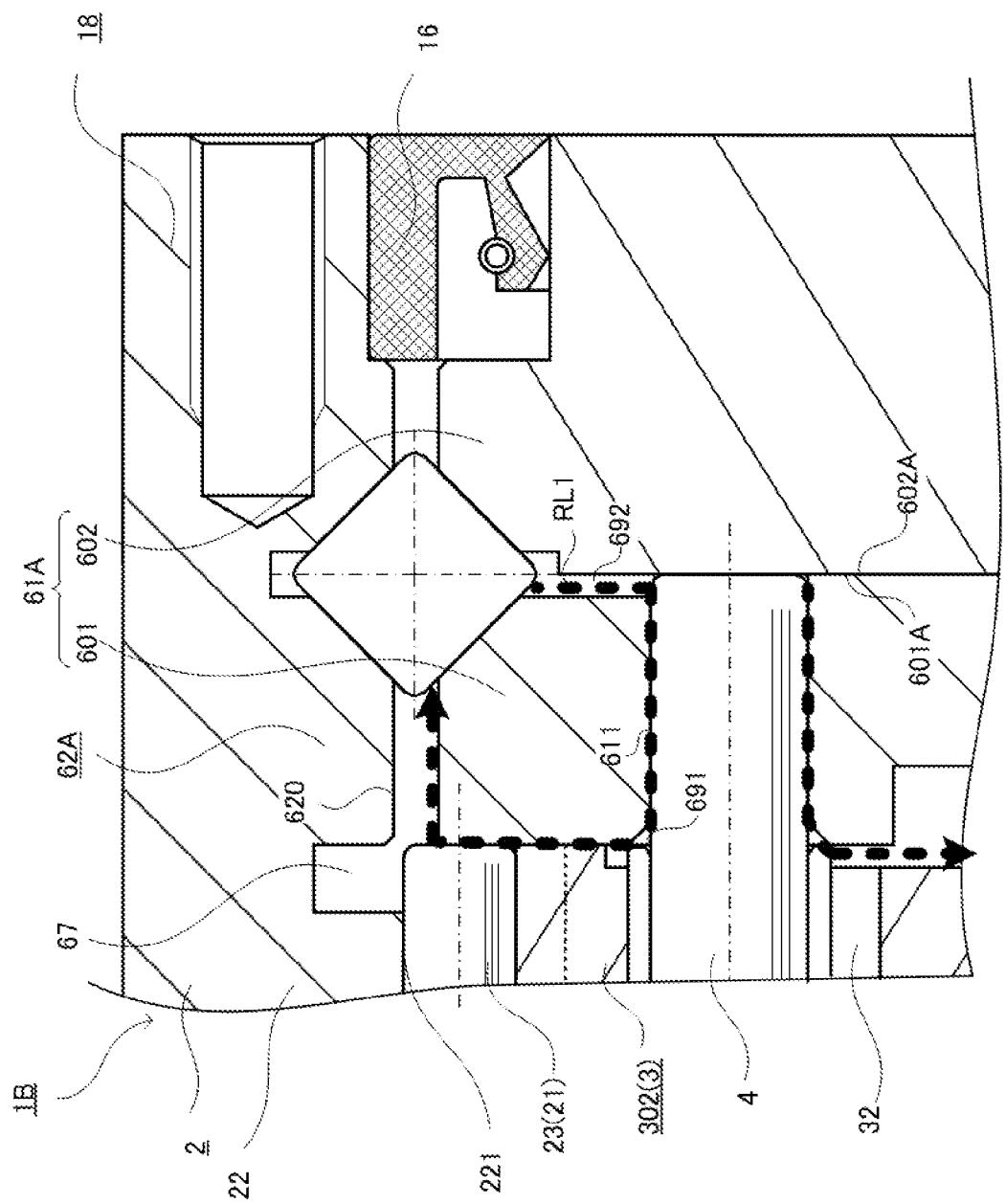
FIG. 20 is a diagrammatic cross-sectional view of major portions of the above internal-meshing planetary gear device, schematically showing a view of a lubricant path.

Furthermore, as shown in FIG. 20, the diameter expansion portion 691 used as "oil accumulation place" is located on the lubricant circulation path RL1. Therefore, a part of the circulation path RL1 is used as a path of "lubricant", so that the lubricant in the diameter expansion portion 691 may also be supplied to at least one of the pin 23 or the rolling body 63 other than the inner pin 4. Especially in some embodiments, as shown in FIG. 20, both the pin 23 and the rolling body 63 are located on the circulation path RL1, so that the lubricant held in the diameter expansion portion 691 may be supplied to both the pin 23 and the rolling body 63.

Furthermore, in some embodiments, as shown in FIG. 19A and FIG. 19B, a connection groove 692 is formed in an opposite surface 601A, 602A of at least one of the first inner ring 601 or the second inner ring 602 opposite to the other of the first inner ring or the second inner ring. The connection groove 692 connects a space for receiving each of multiple rolling bodies 63 to each of multiple holding holes 611. That is, the connection groove 692 is arranged at at least one side of opposite surfaces 601A and 602A used as the division surface between the first inner ring 601 and the second inner ring 602, and connects the space for receiving each of the rolling bodies 63 between the inner ring 61A and the outer ring 62A to the holding hole 611. In some embodiments, as an example, the connection groove 692 is formed in the opposite surface 601A of the first inner ring 601 opposite to the second inner ring 602 along a radial direction of the inner ring 61A. In some embodiments, such connection groove 692 is formed corresponding to all of the holding holes 611 respectively.

The connection groove 692 functions as a path through which the lubricant (lubrication oil) passes. In some embodiments, as shown in FIG. 20, the connection groove 692 constitutes a part of the lubricant circulation path RL1. In some embodiments, as an example, as shown in FIG. 19B, a cross-sectional shape of the connection groove 692 orthogonal to the radial direction of the inner ring 61A is a rectangular shape. Each of depth D4 of the connection groove 692 (from the opposite surface 601A) and width D5 of the connection groove 692 is preferably greater than one tenth of diameter φ10 of the pin 23 (φ10*1/10) and smaller than two times of diameter φ10 (φ10*2). As an example, in case that diameter φ10 of the pin 23 is about 2.5 mm, each of depth D4 and width D5 of the connection groove 692 is preferably greater than 0.25 mm and smaller than 5.0 mm. In the example of FIG. 20, depth D4 of the connection groove 692 is smaller than width D5 of the connection groove 692, but is not limited to the example, and depth D4 of the connection groove 692 may be greater than width D5. Furthermore, the cross-sectional shape of the connection groove 692 is not limited to a rectangular shape, or may be a semi-circular shape, a triangular shape, or another polygonal shape, or the like.

By providing such connection groove 692, the lubricant is easy to circulate in the lubricant holding space 17 through the connection groove 692. In particular, the connection groove 692 is connected to the space for receiving the rolling body 63 between the inner ring 61A and the outer ring 62A. Therefore the bearing member 6 operates and the rolling body 63 rotates, thereby the rolling body 63 functioning as a pump, so that the lubricant in the lubricant holding space 17 may actively circulate via the connection groove 692. As a result, the lubricant in the lubricant holding space 17 is easy to circulate, and the lubricant is easily distributed throughout the lubricant holding space 17 even when the gear device 1B is used for a long period of time, and thus it is difficult to generate, in the gear device 1B, bad conditions such as reduction of transmission efficiency or the like.

Furthermore, by providing the connection groove 692, an effect of reducing an internal pressure of a space between the oil seal 16 and the rolling body 63 may also be expected. That is, the space between the oil seal 16 and the rolling body 63 is connected to the holding hole 611 through the connection groove 692, so that the space between the oil seal 16 and the rolling body 63 is expanded, thereby contributing to suppress rise of the internal pressure when the rolling body 63 functions as a pump. For example, a result of suppressing rise of the internal pressure of the lubricant holding space 17 is difficult to produce the lubricant leakage due to exceeding the oil seal 16, or the like.

As a deformation example of some embodiments, the connection groove 692 may be formed on opposite surfaces 601A, 602A of both the first inner ring 601 and the second inner ring 602. Furthermore, the connection groove 692 may also be formed only in the opposite surface 602A of the second inner ring 602.

As another deformation example of some embodiments, the diameter expansion portion 691 and the connection groove 692 may be used separately. That is, the gear device 1B may have only the diameter expansion portion 691 of the diameter expansion portion 691 and the connection groove 692; on the contrary, the gear device 1B may also have only the connection groove 692.

The structure (including the deformation example) of the second embodiment may be suitable for appropriate combination with the structure (including the deformation example) described in some embodiments.

Summary

As explained above, an internal-meshing planetary gear device (1, 1A, 1B) with a first configuration includes a bearing member (6, 6A), an internally toothed gear (2), a planetary gear (3), and multiple inner pins (4). The bearing member (6, 6A) has an outer ring (62, 62A), an inner ring (61, 61A) arranged on an inner side of the outer ring (62, 62A) and supported to be rotatable relative to the outer ring (62, 62A) with a rotation axis (Ax1) as a center, and multiple rolling bodies (63) arranged between the outer ring (62, 62A) and the inner ring (61, 61A). The internally toothed gear (2) has internal teeth (21) and is fixed to the outer ring (62, 62A). The planetary gear (3) has external teeth (31) partially meshing with the internal teeth (21). Multiple inner pins (4) revolve in multiple inner pin holes (32) formed in the planetary gear (3) and relatively rotate relative to the internally toothed gear (2), in a state where multiple inner pins are inserted into multiple inner pin holes (32) respectively. The inner ring (61, 61A) includes a first inner ring (601) and a second inner ring (602) which are opposite to each other in a direction parallel to the rotation axis (Ax1) and have opposite surfaces (601A, 602A) in contact with each other respectively. The first inner ring (601) has multiple holding holes (611) through which multiple inner pins (4) pass respectively in the direction parallel to the rotation axis (Ax1). Each of multiple inner pins (4) is held in the inner ring (61, 61A) in a self-rotatable state.

According to this configuration, a gap is generated between the first inner ring (601) and the second inner ring (602) even though it is small. By generating such gap, for example a lubricant is easy to be supplied to the inner pin (4) or the like through the gap. Therefore, compared with a situation where the inner ring (61, 61A) is not divided into the first inner ring (601) and the second inner ring (602), the lubricant is easily distributed throughout the gear device even for example when the internal-meshing planetary gear device (1, 1A, 1B) is used for a long period of time, and thus it is difficult to generate, in the internal-meshing planetary gear device (1, 1A, 1B), bad conditions such as reduction of transmission efficiency or the like.

In an internal-meshing planetary gear device (1, 1A, 1B) with a second configuration, based on the first configuration, an end surface of each of multiple inner pins (4) is abutted against the opposite surface (602A) of the second inner ring (602) opposite to the first inner ring (601).

According to this configuration, movement of the inner pin (4) in the direction parallel to the rotation axis (Ax1) is limited by the second inner ring (602), and the lubricant may be suppressed from leaking through the holding hole (611).

In an internal-meshing planetary gear device (1, 1A, 1B) with a third configuration, based on the first or second configuration, a gap is formed between an inner peripheral surface of each of multiple holding holes (611) in the first inner ring (601) and an outer peripheral surface of each of multiple inner pins (4).

According to this configuration, self-rotation of the inner pin (4) in the holding hole (611) becomes smooth due to the lubricant.

In an internal-meshing planetary gear device (1, 1A, 1B) with a fourth configuration, based on any one of the first to third configurations, a diameter expansion portion (691)

expanding an opened area of each of multiple holding holes (611) is formed in a surface at a side of the first inner ring (601) opposite to the second inner ring (602).

According to this configuration, a gap generated between the inner peripheral surface of the holding hole (611) and the inner pin (4) due to the diameter expansion portion (691) functions as "oil accumulation place" for pre-accumulation of the lubricant, and achieves a function of allowing smooth rotation (self-rotation) of the inner pin (4).

An internal-meshing planetary gear device (1, 1A, 1B) with a fifth configuration, based on any one of the first to fourth configurations, a connection groove (692) is formed in the opposite surface (601A, 602A) of at least one of the first inner ring (601) or the second inner ring (602) opposite to the other of the first inner ring or the second inner ring. The connection groove (692) connects a space for receiving each of multiple rolling bodies (63) to each of multiple holding holes (611).

According to this configuration, the lubricant is easy to circulate through the connection groove (692). Especially the rolling body (63) rotates, thereby the rolling body (63) functioning as a pump, so that the lubricant may actively circulate via the connection groove (692).

In an internal-meshing planetary gear device (1, 1A, 1B) with a sixth configuration, based on any one of the first to fifth configurations, a difference between surface hardness of each of multiple inner pins (4) and surface hardness of the first inner ring (601) is less than HRC3.

According to this configuration, even though the inner pin (4) self-rotates in the holding hole (611), it is difficult to generate wear powder or the like, so that smooth rotation of the inner pin (4) is easily maintained for a long period of time.

In an internal-meshing planetary gear device (1, 1A, 1B) with a seventh configuration, based on any one of the first to sixth configurations, surface hardness of each of multiple inner pins (4) is in a range of HRC60±3.

According to this configuration, even though the inner pin (4) self-rotates in the holding hole (611), it is difficult to generate wear powder or the like, so that smooth rotation of the inner pin (4) is easily maintained for a long period of time.

In an internal-meshing planetary gear device (1, 1A, 1B) with an eighth configuration, based on any one of the first to seventh configurations, multiple rolling bodies (63) are located in a plane including the opposite surface (601A) of the first inner ring (601) opposite to the second inner ring (602).

According to this configuration, the rolling body (63) effectively functions as a pump when the rolling body (63) rotates, so that the lubricant is easy to circulate.

In an internal-meshing planetary gear device (1, 1A, 1B) with a ninth configuration, based on the eighth configuration, center of each of multiple rolling bodies (63) in the direction parallel to the rotation axis (Ax1) is located in the same plane of the opposite surface (601A) of the first inner ring (601) opposite to the second inner ring (602).

According to this configuration, the rolling body (63) effectively functions as a pump when the rolling body (63) rotates, so that the lubricant is easy to circulate.

An internal-meshing planetary gear device (1, 1A, 1B) with a tenth configuration, based on any one of the first to ninth configurations, further includes a lubricant circulation path (RL1). The lubricant circulation path (RL1) passes through at least a gap between the first inner ring (601) and the second inner ring (602), a space for receiving each of multiple rolling bodies (63), and each of multiple holding holes (611).

According to this configuration, the lubricant is easy to circulate through the rolling body (63) and the inner pin (4).

With regard to structures of the second to tenth configurations, structures which are unnecessary to be provided for the internal-meshing planetary gear device (1, 1A, 1B) may be omitted appropriately.

EXPLANATIONS OF REFERENCE NUMERALS 1, 1A, 1B Internal-meshing planetary gear device
2 Internally toothed gear
3 Planetary gear
4 Inner pin
6, 6A Bearing member
21 Internal tooth
31 External tooth
32 Inner pin hole
61, 61A Inner ring
62, 62A Outer ring
63 Rolling body
601 First inner ring
601A Opposite surface (of First inner ring)
602 Second inner ring
602A Opposite surface (of Second inner ring)
611 Holding hole
691 Diameter expansion portion
692 Connection groove
Ax1 Rotation axis
RL1 Circulation path

INDUSTRIAL APPLICABILITY

According to the embodiments of the disclosure, an internal-meshing planetary gear device which is difficult to generate bad conditions such as reduction of transmission efficiency or the like, may be provided.

What is claimed is:
1. An internal-meshing planetary gear device, comprising:
a bearing member having an outer ring, an inner ring arranged on an inner side of the outer ring and supported to be rotatable relative to the outer ring with a rotation axis as a center, and a plurality of rolling bodies arranged between the outer ring and the inner ring;
an internally toothed gear, having internal teeth and fixed to the outer ring;
a planetary gear, having external teeth partially meshing with the internal teeth; and
a plurality of inner pins configured to revolve in a plurality of inner pin holes formed in the planetary gear and rotate relative to the internally toothed gear, wherein the plurality of inner pins is inserted into the plurality of inner pin holes respectively,
wherein the inner ring comprises a first inner ring and a second inner ring which are opposite to each other in a direction parallel to the rotation axis and have opposite surfaces in contact with each other respectively,
the first inner ring having a plurality of holding holes through which respective inner pins of the plurality of inner pins passes along the direction parallel to the rotation axis, and
each of the plurality of inner pins is held in the inner ring in a self-rotatable state.

2. The internal-meshing planetary gear device of claim 1, wherein an end surface of each of the plurality of inner pins is abutted against a surface of the second inner ring opposite to the first inner ring.

3. The internal-meshing planetary gear device of claim 1, further comprising a gap between an inner peripheral surface of each of the plurality of holding holes in the first inner ring and an outer peripheral surface of each of the plurality of inner pins.

4. The internal-meshing planetary gear device of claim 1, wherein a diameter expansion portion expanding an opened area of each of the plurality of holding holes is formed in a surface at a side of the first inner ring opposite to the second inner ring.

5. The internal-meshing planetary gear device of claim 1, wherein a connection groove is formed in the opposite surface of at least one of the first inner ring or the second inner ring opposite to the other of the first inner ring or the second inner ring, and connects a space for receiving each of the plurality of rolling bodies to each of the plurality of holding holes.

6. The internal-meshing planetary gear device of claim 1, wherein a difference between a surface hardness of each of the plurality of inner pins and a surface hardness of the first inner ring is less than HRC3.

7. The internal-meshing planetary gear device of claim 1, wherein a surface hardness of each of the plurality of inner pins is in a range of HRC60±3.

8. The internal-meshing planetary gear device of claim 1, wherein the plurality of rolling bodies is located in a plane comprising the opposite surface of the first inner ring opposite to the second inner ring.

9. The internal-meshing planetary gear device of claim 8, wherein a center of each of the plurality of rolling bodies in the direction parallel to the rotation axis is located in a same plane of the opposite surface of the first inner ring opposite to the second inner ring.

10. The internal-meshing planetary gear device of claim 1, further comprising a lubricant circulation path that passes through at least a gap between the first inner ring and the second inner ring, a space for receiving each of the plurality of rolling bodies, and each of the plurality of holding holes.

11. The internal-meshing planetary gear device of claim 10, wherein the plurality of rolling bodies is disposed in a division surface between the first inner ring and the second inner ring.

12. The internal-meshing planetary gear device of claim 11, wherein the division surface is between the first inner ring and the second inner ring at the position facing the plurality of rolling bodies so that the a lubricant in the lubricant circulation path is distributed as the plurality of rolling bodies rotate.

13. A wheel device, comprising:
a wheel body, and
an internal-meshing planetary gear device, comprising:
a bearing member having an outer ring, an inner ring arranged on an inner side of the outer ring and supported to be rotatable relative to the outer ring with a rotation axis as a center, and a plurality of rolling bodies arranged between the outer ring and the inner ring;
an internally toothed gear, having internal teeth and fixed to the outer ring;
a planetary gear, having external teeth partially meshing with the internal teeth; and
a plurality of inner pins configured to revolve in a plurality of inner pin holes formed in the planetary gear and rotate relative to the internally toothed gear, in a state where the plurality of inner pins is inserted into the plurality of inner pin holes respectively,
wherein the inner ring comprises a first inner ring and a second inner ring which are opposite to each other in a direction parallel to the rotation axis and have opposite surfaces in contact with each other respectively,
the first inner ring having a plurality of holding holes through which respective inner pins in the plurality of inner pins passes along the direction parallel to the rotation axis, and
each of the plurality of inner pins is held in the inner ring in a self-rotatable state.

14. The internal-meshing planetary gear device of claim 13, further comprising a lubricant circulation path that passes through at least a gap between the first inner ring and the second inner ring, a space for receiving each of the plurality of rolling bodies, and each of the plurality of holding holes.

15. The internal-meshing planetary gear device of claim 14, wherein the plurality of rolling bodies is disposed in a division surface between the first inner ring and the second inner ring.

16. The internal-meshing planetary gear device of claim 15, wherein the division surface is between the first inner ring and the second inner ring at the position facing the plurality of rolling bodies so that the a lubricant in the lubricant circulation path is distributed as the plurality of rolling bodies rotate.

* * * * *